(12) United States Patent
Harris et al.

(10) Patent No.: US 10,498,755 B2
(45) Date of Patent: Dec. 3, 2019

(54) CYBERSECURITY RISK SCORE COMPUTATION BASED ON PEER GROUPING

(71) Applicant: SAS Institute Inc., Cary, NC (US)

(72) Inventors: Bryan C. Harris, Cary, NC (US); Glen R. Goodwin, Laurel, MD (US); Sean Riley Dyer, Leawood, KS (US); Alexius Kofi Ameyaw Boakye, Jr., Ellicott City, MD (US); Christopher Francis Smith, Clarksburg, MD (US); Pankaj Ramesh Telang, Cary, NC (US); Damian Tane Herrick, Cary, NC (US); Edwin Kenton Brown, Elkridge, MD (US); Justin Conrad Fleck, Mount Airy, MD (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 16/020,282

(22) Filed: Jun. 27, 2018

(65) Prior Publication Data
US 2018/0332064 A1    Nov. 15, 2018

Related U.S. Application Data

(63) Continuation of application No. PCT/US2017/019337, filed on Feb. 24, 2017.
(Continued)

(51) Int. Cl.
*H04L 29/06* (2006.01)
*G06F 15/16* (2006.01)
(Continued)

(52) U.S. Cl.
CPC ......... *H04L 63/1425* (2013.01); *G06F 15/16* (2013.01); *H04L 43/026* (2013.01);
(Continued)

(58) Field of Classification Search
CPC ... H04L 63/1425; H04L 43/026; H04L 43/08; H04L 61/1511
(Continued)

(56) References Cited

U.S. PATENT DOCUMENTS 8,544,727 B1 * 10/2013 Quinn ................. G06Q 40/00
235/379
9,009,084 B2    4/2015 Brandt et al.
(Continued)

*Primary Examiner* — Harunur Rashid
*Assistant Examiner* — Sakinah White Taylor
(74) *Attorney, Agent, or Firm* — Bell & Manning, LLC

(57) ABSTRACT

A computing device computes a risk score for a user using a device based on a peer group identifier. Network activity measures characterize use of the device by the user. For each unique peer group identifier included in netflow records, a mean value is computed of each network activity measure. For each unique IP address and user identifier combination included in the netflow records, the mean value of each network activity measure is selected for a peer group identifier of the user; a risk score is computed by comparing each network activity measure for the unique IP address and user identifier combination to the selected mean value for the respective network activity measure; and when the risk score exceeds a predefined alert threshold, a high risk alert indicator is set indicating that the device is being used in an anomalous manner relative to other devices monitored by the computing device.

28 Claims, 40 Drawing Sheets

Related U.S. Application Data

(60) Provisional application No. 62/434,186, filed on Dec. 14, 2016, provisional application No. 62/299,834, filed on Feb. 25, 2016.

(51) Int. Cl.
*H04L 12/26* (2006.01)
*H04L 29/08* (2006.01)
*H04L 29/12* (2006.01)

(52) U.S. Cl.
CPC .......... *H04L 43/08* (2013.01); *H04L 61/1511* (2013.01); *H04L 67/322* (2013.01)

(58) Field of Classification Search
USPC .......................................................... 726/23
See application file for complete search history.

(56) References Cited

U.S. PATENT DOCUMENTS

| | | | |
|---|---|---|---|
| 2005/0033989 A1* | 2/2005 | Poletto | H04L 63/1416 726/4 |
| 2007/0147246 A1 | 6/2007 | Hurley et al. | |
| 2007/0245420 A1 | 10/2007 | Yong et al. | |
| 2010/0125911 A1 | 5/2010 | Bhaskaran | |
| 2010/0281527 A1 | 11/2010 | John et al. | |
| 2013/0117847 A1* | 5/2013 | Friedman | H04L 63/102 726/22 |
| 2016/0080502 A1 | 3/2016 | Yadav et al. | |
| 2016/0226904 A1* | 8/2016 | Bartos | H04L 63/1433 |
| 2017/0063921 A1* | 3/2017 | Fridman | H04L 63/1466 |
| 2018/0357422 A1 | 12/2018 | Telang et al. | |

\* cited by examiner

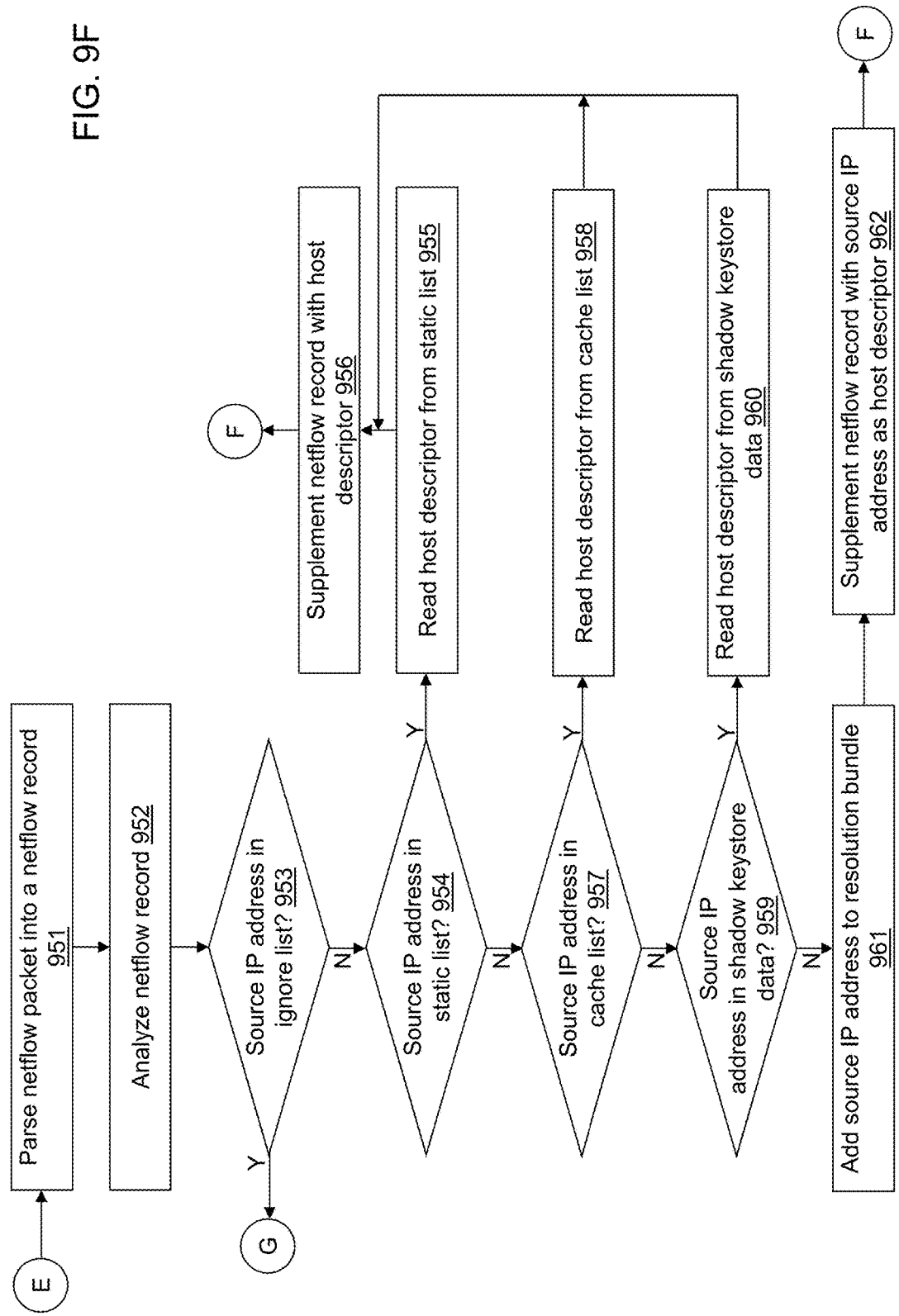

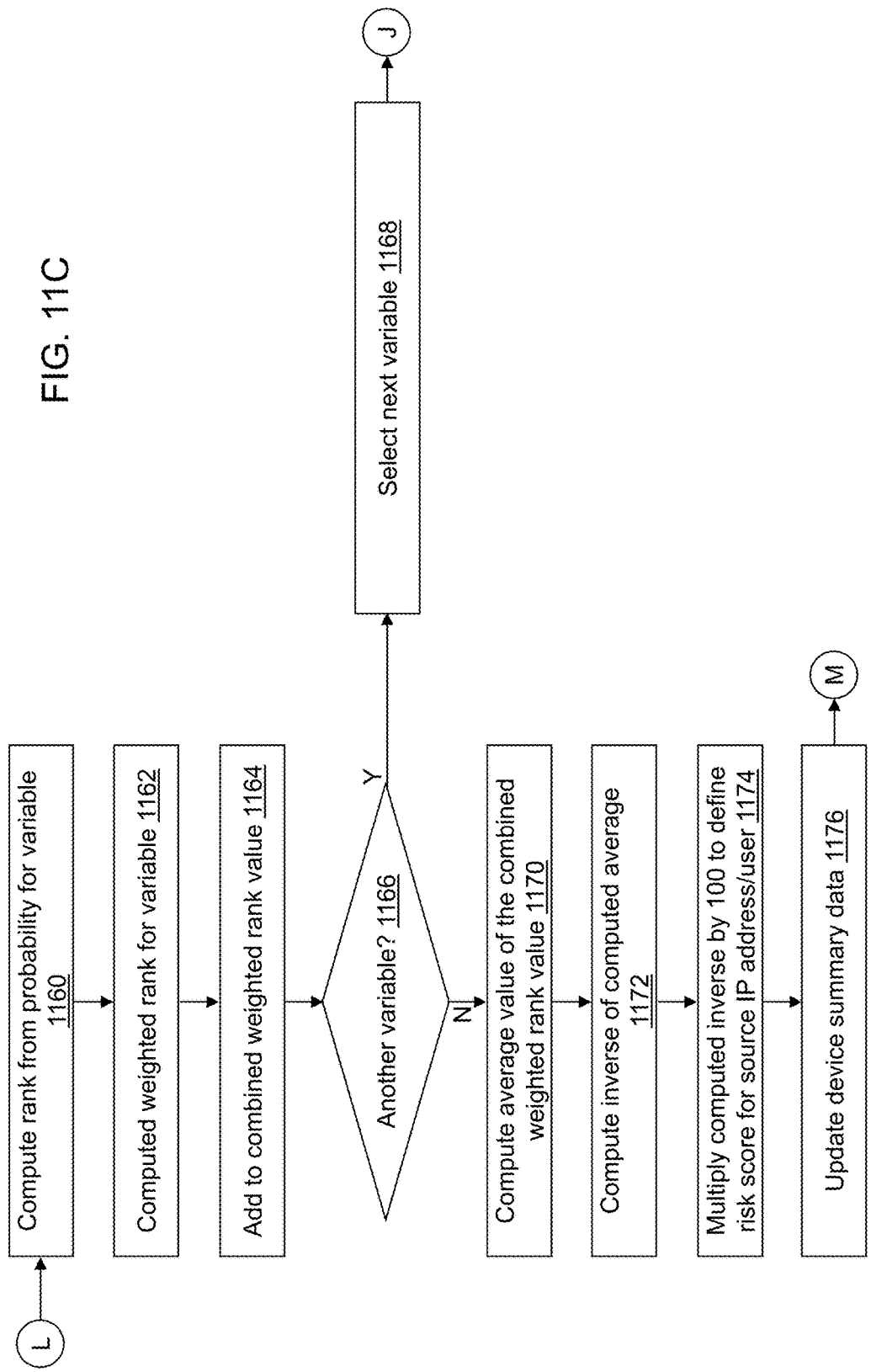

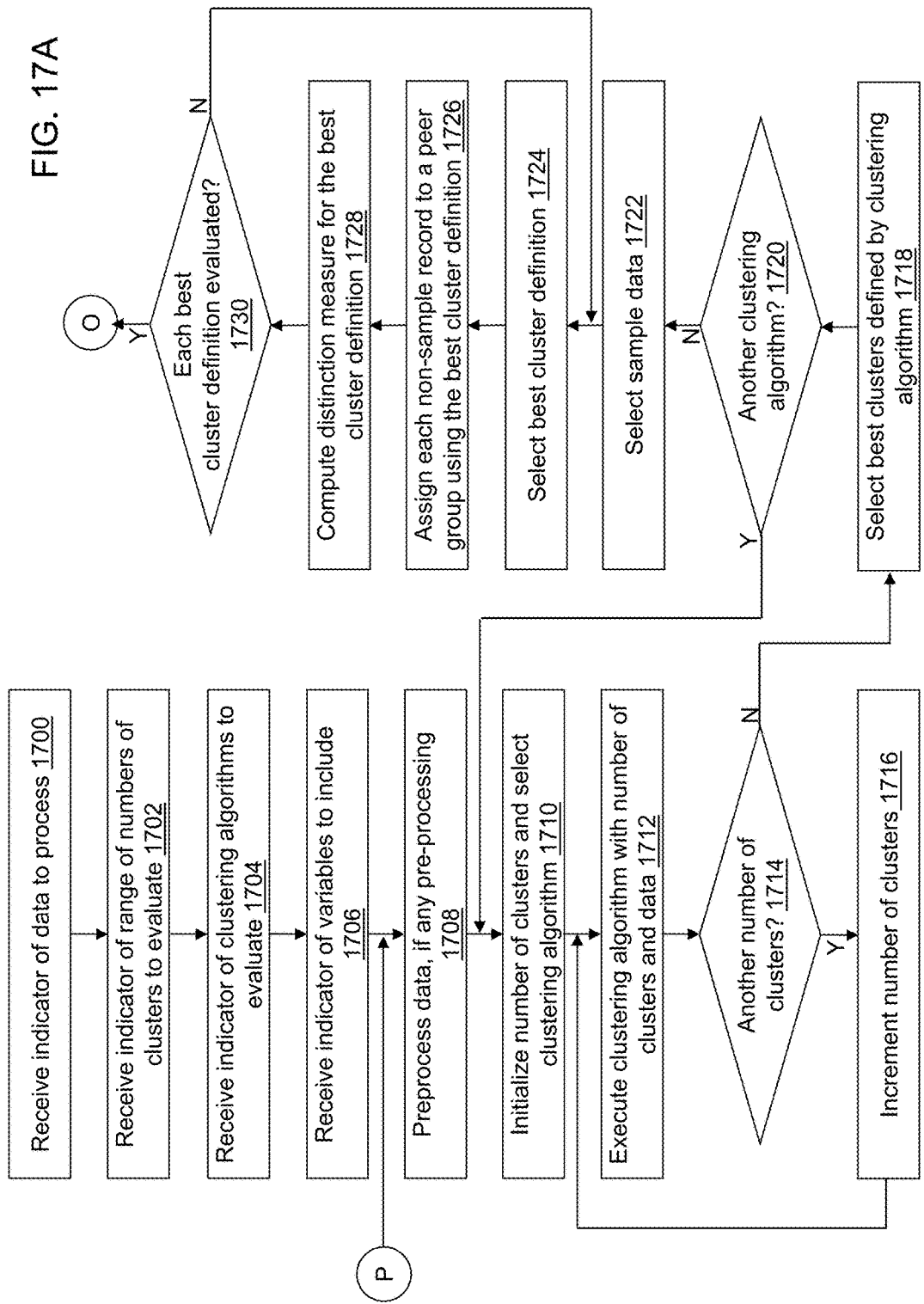

| | | | | | | |
|---|---|---|---|---|---|---|
| ⑤sas\|CYBERSECURITY | Security Overview | Risk Analysis | My Dashboards | Admin Console | | |

Security Events

[Confirmed Events]

Risk Alerts
Unconfirmed
Under Investigation
NONSEC
Alerts by Deposition

Risk Breakdown
Risk by Country
Risk by State
Risk by City  *2010*

Confirmed Events

Time Period: [All ▼] ↻                                                                                                    *1812*

| Disposition | Comments | IP | User ID | Peergroup | Date | Division/Dept | Location |
|---|---|---|---|---|---|---|---|
| ⚠ Malicious Code (robrow) | [Rob Brown on 2.2.2016] Port scanning | 248.226.11.167 f56a7537e7d8e20f.acmexyz.biz | 32f370a3a95ba63b | IT | 2016-02-02 1000Z | Australia Information Technolo Business Unit DCT - Hosting | Glasgow, V2 [🔍Analyze] |

*FIG. 18*

Top Devices: [100] Time Period: [Last 10 Days ▼] ⟳ — 1812

| IP | Alerts | User ID | Peergroup | Max Risk | Division/Dept | Location | |
|---|---|---|---|---|---|---|---|
| ▲ 248.226.167.156<br>fd670066067141cf.acmexyz.biz | 1 | c372f4be824aa583 | Executive | 90 | Australia Sales<br>Business Unit: BFI - Executive | Istanbul, Turkey | 🔍 Analyze |
| ▲ 248.226.230.188<br>58da04b961e417b3.acmexyz.biz | 1 | c78fb6240556dd1a | Executive | 90 | Australia Sales<br>Business Unit: RHZ - Executive | Zurich, Switzerland | 🔍 Analyze |
| ▲ 248.227.188.121<br>bf5d1a800a1f079a.acmexyz.biz | 1 | 0dc84400eab5df4d | Executive | 95 | Australia Sales<br>Business Unit: RHZ - Executive | Budapest, Hungary | 🔍 Analyze |
| ▲ 248.227.166.97<br>6f4c88b8f8c07bb7.acmexyz.biz | 1 | f420424b4e808ddb | Executive | 90 | Australia Admin<br>Business Unit: RHZ - Executive | Ljubljana, Slovenia | 🔍 Analyze |

FIG. 26

| 2802 Risk Breakdown | 2804 Device Interactions | 2806 Web Proxy | | 2808 User Auth |
|---|---|---|---|---|
| Risk Score Breakdown for 2016-01-14 0700Z 2800 | | | | |
| Activity 2810 | 2812 Total | 2814 Peer Mean | 2816 Peer Deviation | 2818 Peer Population |
| Ext Dest IPs | 4666 | 40.3 | 12.1 | 149 |
| UDP Packet Activity | 17643566 | 121986 | 12 | 145 |
| Ext Dest Ports | 15 | 2 | 8.2 | 149 |
| Unique Countries | 5 | 2 | 4.9 | 149 |

2820 (brace grouping data rows)

| Date (GMT) ∨ | Src User ID ∨ | Dest Hostname ∨ | Dest IP ∨ | Packets ∨ |
|---|---|---|---|---|
| 2016-01-14 1800Z | 5dcf2f5fb5651566b | 68.64.167.98 | 68.64.167.98 | 1 |
| 2016-01-14 1800Z | 5dcf2f5fb5651566b | 39.116.8.132 | 39.116.8.132 | 3 |
| 2016-01-14 1800Z | 5dcf2f5fb5651566b | pool-47-81.ptcomm.ru | 85.234.47.81 | 2 |
| 2016-01-14 1800Z | 5dcf2f5fb5651566b | cpc17-live20-2-0-cus... | 77.97.106.190 | 1 |

Risk Breakdown — 2802
Device Interactions — 2804
Web Proxy — 2806
User Auth — 2808

+ Criteria ▶ ☑ Date = 2016-1-14 X  ☑ Hour of Day = 18 ◀▶ X

Summarize by: Destination City — 3004
Cary (10) Sydney (4) Pune (2) — 3008
View: Table Chart Export — 3006
3000
3002

CYBERSECURITY RISK SCORE COMPUTATION BASED ON PEER GROUPING

CROSS-REFERENCE TO RELATED APPLICATIONS

The present application is a continuation of International Application No. PCT/US2017/019337 filed Feb. 24, 2017, the entire contents of which are hereby incorporated by reference. International Application No. PCT/US2017/019337 claims the benefit of 35 U.S.C. § 119(e) to U.S. Provisional Patent Application No. 62/434,186 filed Dec. 14, 2016, and to U.S. Provisional Patent Application No. 62/299,834 filed Feb. 25, 2016, the entire contents of which are hereby incorporated by reference.

BACKGROUND

As cybersecurity attacks become more and more prevalent, executives and government officials recognize that more must be done to protect networks, data, and services from malicious attacks. Example data breaches over the last decade include:

- 77 million customer records and possibly payment card information were stolen in April 2011;
- 152 million names, customer IDs, passwords, encrypted payment card information, and source code were stolen in October 2013;
- 110 million customer records, and credit and debit card numbers were stolen in December 2013;
- 78.8 million records that included personal data and Social Security numbers were stolen as announced in February 2015; and
- ~15 million customer records were stolen as announced in October 2015.

In most of these cases, sophisticated attackers targeted the companies and organizations and their most sensitive data. The security strategies used in the past are increasingly less effective against these new types of attacks. Many tools and security processes have been more focused on prevention than on detection and response, and attackers are taking advantage of the fact that organizations are not finding indicators of compromise within their environments soon enough, nor are they responding to these incidents and removing them quickly enough.

SUMMARY

In an example embodiment, a computer-readable medium is provided having stored thereon computer-readable instructions that when executed by a first computing device, cause the first computing device to compute a risk score for a user using a device based on a peer group identifier for the user. A plurality of records is read. Each record includes a user identifier, an IP address associated with the user identifier, a peer group identifier associated with the user identifier, and a plurality of network activity measures. The user identifier identifies a user of a second computing device being monitored by a third computing device. The peer group identifier identifies a peer group to which the user is assigned. Members of the peer group are identified based on an expected network activity behavior. The IP address identifies the second computing device. The plurality of network activity measures characterizes use of the second computing device by the user. For each unique peer group identifier included in the read plurality of netflow records, a mean value is computed of each of the plurality of network activity measures. For each unique IP address and user identifier combination included in the read plurality of netflow records, the computed mean value of each of the plurality of network activity measures is selected for the peer group identifier associated with the user identifier; a risk score is computed by comparing each network activity measure for the unique IP address and user identifier combination to the selected mean value for the respective network activity measure; and when the computed risk score exceeds a predefined alert threshold, a high risk alert indicator is set indicating that the second computing device is being used in an anomalous manner relative to other computing devices being monitored by the first computing device. The set high risk alert indicator is output to a display.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to compute a risk score for a user using a device based on a peer group identifier for the user.

In yet another example embodiment, a method of computing a risk score for a user using a device based on a peer group identifier for the user is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 9A-9G depict a flow diagram illustrating examples of operations performed by an ingest application of the cybersecurity application of the cybersecurity system of FIG. 4 in accordance with an illustrative embodiment.

FIGS. 11A-11D depict a flow diagram illustrating examples of operations performed by an analytic computation application of the cybersecurity application of the cybersecurity system of FIG. 4 in accordance with an illustrative embodiment.

FIGS. 17A-17B depict a flow diagram illustrating examples of operations performed by a peer group definition application of the peer group definition device of FIG. 16 in accordance with an illustrative embodiment.

FIGS. 18-30 illustrate a graphical user interface presented under control of the web server application on the system user device in accordance with an illustrative embodiment.

DETAILED DESCRIPTION

Figure 1:
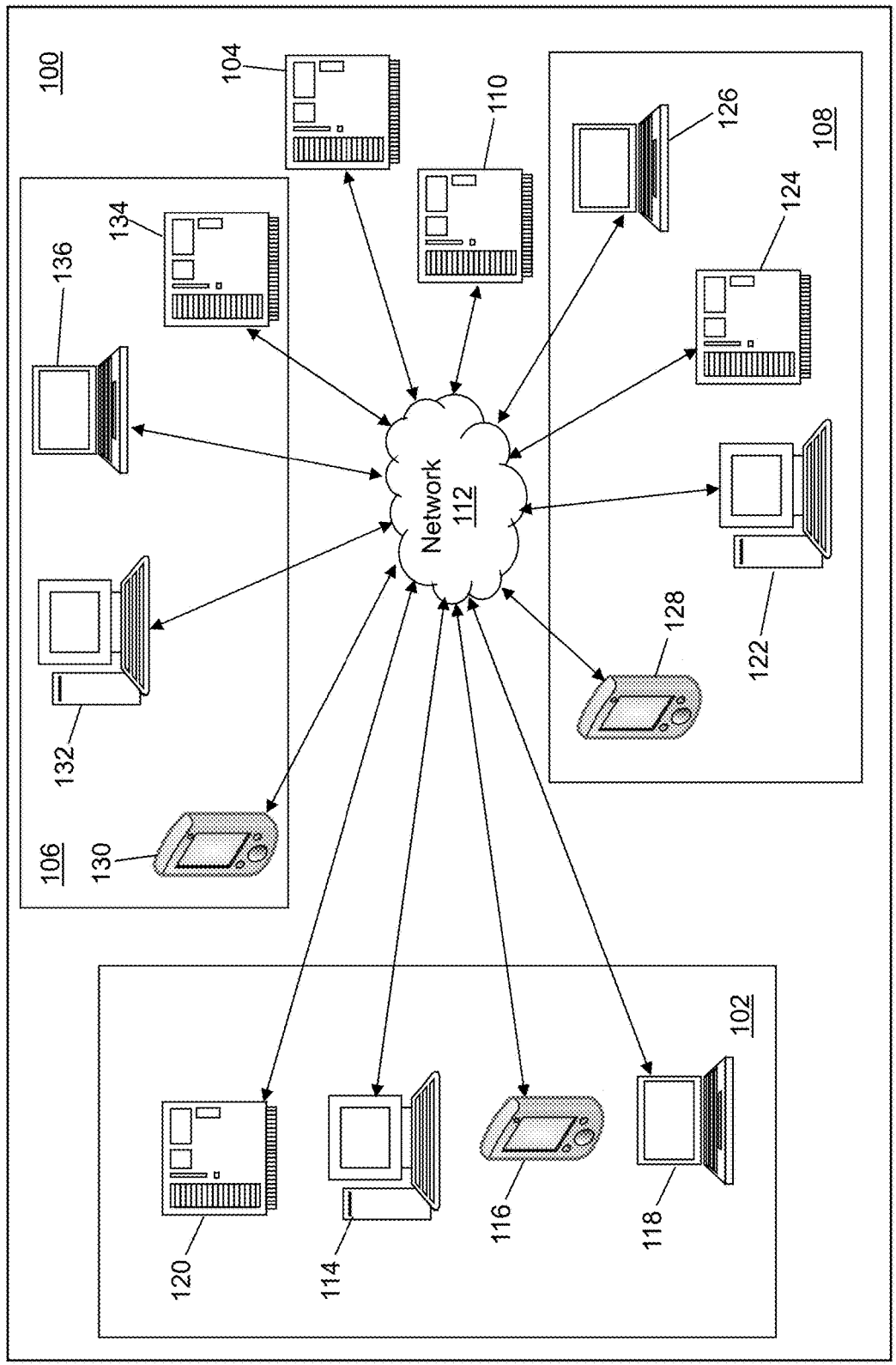
FIG. 1 depicts a block diagram of a cybersecurity monitoring system in accordance with an illustrative embodiment.

Referring to FIG. 1, a block diagram of a network monitoring system 100 is shown in accordance with an illustrative embodiment. In an illustrative embodiment, network monitoring system 100 may include a plurality of monitored devices 102, a network activity data capture device(s) 104, a plurality of external devices 106, a plurality of system user devices 108, a cybersecurity system 110, and a network 112. Each of the plurality of monitored devices 102, network activity data capture device(s) 104, the plurality of external devices 106, the plurality of system user devices 108, and cybersecurity system 110 may be composed of one or more discrete computing devices in communication through network 112 or through a direct connection.

Cybersecurity system 110 identifies active network attack campaigns involving the plurality of monitored devices 102 through statistical analysis based on behavioral abnormalities in high-velocity network data received from network activity data capture device(s) 104. Cybersecurity system 110 enriches and analyzes the data to identify anomalous activity. Cybersecurity system 110 further provides timely risk reporting based on context-relevant analytics appropriate to the given network activity. Cybersecurity system 110 still further makes risk scoring and relevant data available to the plurality of system user devices 108 through a web user interface.

Network 112 may include one or more networks of the same or different types. Network 112 can be any type of wired and/or wireless public or private network including a cellular network, a local area network, a wide area network such as the Internet or the World Wide Web (WWW), a personal area network, etc. Network 112 further may comprise sub-networks and consist of any number and types of communication networking devices. Illustrative communication networking devices include a firewall, a proxy server, a router, a multilayer switch, a modem, etc.

A multilayer switch may connect devices together on a sub-network of network 112. Multilayer switches manage the flow of data across the sub-network by transmitting a received packet only to the one or more devices on the sub-network for which the packet is intended. Multilayer switches may connect to a router.

A router forwards data packets between sub-networks of network 112 until the data packets reach their destination computing device also referenced as a destination node. Routers and switches may provide an interface for different physical types of network connections, such as copper cables, fiber optic, wireless, etc. and include firmware to support different networking communications protocol standards. Routers and switches further may include firmware and/or software to support firewall and proxy functionality.

A firewall monitors and controls communication between sub-networks of network 112 and/or between network 112 and a computing device of the plurality of monitored devices 102 based on predefined security rules. The firewall establishes a barrier between a trusted, secure internal network and another outside or external network that is assumed to not be secure or trusted. For example, the plurality of monitored devices 102, network activity data capture device(s) 104, the plurality of system user devices 108, and the cybersecurity system 110 may be considered part of an internal network of an entity; whereas, the plurality of external devices 106 may be considered part of an external network relative to the entity. The firewall may also offer other functionality to the internal network that it protects, such as acting as a dynamic host configuration protocol (DHCP) server or virtual private network server for the internal network.

DHCP is used for Internet Protocol version 4 (IPv4), as well as for Internet Protocol version 6 (IPv6). A DHCP server can manage transmission control protocol/internet protocol (TCP/IP) settings for devices on the internal network by automatically or dynamically assigning IP addresses to the devices. The devices on the internal network include computing devices such as client computing devices and server computing devices as well as printers, communication networking devices such as routers and switches, point of sale devices, cameras, etc. The DHCP protocol is based on a client-server model. When a computing device or other device connects to a network, the DHCP client software of that computing device sends a broadcast query requesting the necessary information. Any DHCP server on the network may service the request. The DHCP server manages a pool of IP addresses and information about client configuration parameters such as a default gateway, a hostname, and one or more name servers and time servers. A hostname is a name of a computing device within a domain that may include a domain name of the domain. The domain name is the name of a network associated with an entity and may reference the internal network.

A proxy server acts as an intermediary for requests from computing devices seeking resources from other servers. The computing device connects to the proxy server and requests a service, such as a copy of a file, a connection to another computing device, a web page, or other resource available from a different server. An example proxy server is a web proxy server that facilitates access to content on the Internet. For example, a web proxy server runs web proxy software that enables an entity to control and to authorize websites that an employee of the entity can visit. Although web proxy data may be used to enforce productivity and web traffic utilization policies, it may also protect employees from unknowingly visiting malicious locations on the Internet.

A proxy server may perform tasks such as load balancing between servers that service the request, authentication of the requesting computing device to the server that provides the service, decryption of a communication from the computing device, caching of a response to accelerate a second response to a second request, etc. A proxy server can capture and analyze the communication between a computing device and the WWW or the Internet portion of network 112.

Routers and switches can be configured to output a network flow record at a predefined interval and/or at the termination of a network flow to a collector computing device. A network flow may be defined as a unidirectional sequence of packets that share:

the same input interface (e.g., simple network management protocol interface index) value,
source IP address value,
destination IP address value,
IP protocol value,
source port for user datagram protocol (UDP) or TCP or 0 for other protocols,
destination port for UDP or TCP,
type and code for internet control message protocol (ICMP), or 0 for other protocols, and
IP type of service value.

Termination of the network flow may be based on expiration of an aging counter value or termination of a TCP session. The aging counter value is reset when a new transmission is received. The network flow record may be exported to network activity data capture device(s) 104, for example, using UDP or stream control transmission protocol (SCTP). The network flow record may include a start time and date of the network flow, a last (or most recent) time and date of the network flow, the IP protocol value of the network flow, the source IP address value and source port of the network flow, the destination IP address value and destination port of the network flow, a number of packets of the network flow, a total number of bytes of the network flow, a minimum packet length of the network flow, a maximum packet length of the network flow, a number of network flows between the source and destination IP addresses of the network flow, IP type of service value, input interface value, output interface value, TCP flags seen for the network flow, etc. The network flow record includes network flow data that characterizes an on-going or a stopped communication between a source device and a destination device.

A source device is one of the plurality of monitored devices 102. A destination device is one of the plurality of monitored devices 102 or one of the plurality of external devices 106 to which the source device is communicating. As a result, the source device can communicate with a destination device that is part of the internal network of the entity or part of the external network though the source device is part of the internal network of the entity. Of course, in any communication link, each communicating device can be both a source device and a destination device. Source communication parameters (e.g., IP address) are associated with the source device. Destination communication parameters (e.g., IP address) are associated with the destination device.

The plurality of monitored devices 102 may be associated with a common entity. For example, the common entity may be a company or other organization to which members belong. Users of the plurality of monitored devices 102 may be considered internal to the common entity regardless of a geographic location of the plurality of monitored devices 102. For example, the users may be employees of the common entity. The plurality of monitored devices 102 may be distributed worldwide, but communication between the plurality of monitored devices 102 is considered an internal communication using the internal network because each of the devices is associated with the common entity and communicates as part of the internal network. The internal communications may flow through "external" portions of network 112 such as the Internet as understood by a person of skill in the art. The plurality of monitored devices 102 may establish a communication link through network 112 to another system of the plurality of monitored devices 102. The communication link may be established for a variety of purposes including, but not limited to, send/receive information to/from a web server, to send/receive an email, to send/receive a file, to send/receive a text message, to print a document, to logon to a web application, to receive information from a web application, to remotely execute an application, etc.

Network monitoring system 100 may include one or more network activity data capture systems. Network monitoring system 100 may include any number and combination of types of network activity data capture systems. For example, network activity data capture device(s) 104 may include one or more computing devices that are collector computing devices that receive network flow records from routers and switches related to communications with any of the plurality of monitored devices 102.

As another example, network activity data capture device(s) 104 may include one or more computing devices that are web proxy servers that capture communications between the plurality of monitored devices 102 and web servers hosted within the internal or the external network. Web servers within the internal network may be included in the plurality of monitored devices 102. The web proxy server may intercept connections to the Internet including web browsing requests/responses such as those using hypertext transport protocol (HTTP) and/or HHTP secure (HTTPS), mail retrieval requests/responses such as those using post office protocol 3 (POP3) and/or simple mail transfer protocol (SMTP), file transfer requests/responses such as those using file transfer protocol (FTP), real time streaming protocol (RTSP), etc.

As yet another example, network activity data capture device(s) 104 may include one or more computing devices that are authentication proxy servers that capture authentication communications between the plurality of monitored devices 102 and other computing devices of the internal network. The authentication communications may be associated with requests by a user to logon to a computing device within the internal network, to logon to a sub-network within the internal network, to logon to an application hosted within the internal network, etc. An authentication record may include a user identifier (ID) such as a username, a hostname and/or IP address associated with the device to which the user attempted a logon, and a timestamp. The authentication record may indicate whether or not the logon attempt was successful or failed.

As still another example, network activity data capture device(s) 104 may include one or more computing devices that are syslog servers that collect any syslog data from any of the plurality of monitored devices 102. Syslog data may be generated by communication networking devices, DHCP servers, proxy servers, web servers, workstations, etc. Syslog data may be thought of as a standardized "envelope" in which to deliver one or more data types. For a typical entity, a single syslog data feed may contain dozens of different event record types (firewall, authentication, web proxy, end point, Internet provider security, intrusion detection system, etc.). For example, when a user logs onto a server computing device or a client computing device in a Microsoft® Windows operating environment, an authentication security event may be created that reflects the success or failure of the logon attempt. The authentication security event may be forwarded using a syslog message to network activity data capture device(s) 104.

As understood by a person of skill in the art, a syslog message may have three parts regardless of the content of the message. The first part of the syslog message is associated with a priority value that represents a facility and a severity. For illustration, various operating system daemons and processes have been assigned numeric facility codes though those that are unassigned may use any of the "local use" or "user-level" facilities. Illustrative operating system daemons and processes include kernel messages, user-level messages, mail system messages, security/authorization messages, syslogd messages, system daemons, clock daemon, file transfer protocol (FTP) daemon, log alert, etc. Illustrative severity codes may be associated with "Emergency: system is unusable", "Alert: action must be taken immediately", "Critical: critical conditions", "Error: error conditions", "Warning: warning conditions", etc.

The second part of the syslog message may include a timestamp field and a hostname field. The timestamp field includes a date and time that the syslog data is generated. The hostname field includes an indication of a hostname or IP address of the computing device generating the syslog data. The hostname field includes a name of the computing device and provides additional context for the source and destination IP addresses. The hostname presents a readable name (server, workstation, etc.) for the computing device. If the computing device does not have a hostname, the hostname field includes its IP address.

The third part of the syslog message contains additional information related to the process that generated the message and the text of the message that conveys information understandable to the intended recipient based on a type of the syslog message.

The plurality of external devices 106 includes any device to which a device of the plurality of monitored devices 102 establishes a communication link. Users of the plurality of external devices 106 are not members of the common entity. The plurality of external devices 106 may be distributed worldwide. The plurality of external devices 106 may further be defined as any device associated with an IPv4 or an IPv6 address that is not routable within the internal network of the common entity.

Cybersecurity system 110 monitors activity by the plurality of monitored devices 102 including the communication links established by each device to one or more of the plurality of monitored devices 102 or to the plurality of external devices 106, logon and logout activity by a user, web browsing activity, etc. based on data received from one or more of the network activity data capture systems 104. The plurality of system user devices 108 are devices that access information stored by cybersecurity system 110 to identify and investigate potential cybersecurity issues such as an improper access or suspicious use of a device of the plurality of monitored devices 102.

The one or more computing devices of the plurality of system user devices 108 may include computers of any form factor such as a server computer 124, a desktop computer 122, a smart phone 128, a laptop 126, a personal digital assistant, an integrated messaging device, a tablet computer, etc. The plurality of system user devices 108 can include any number and any combination of form factors of computing devices that may be organized into sub-networks and distributed worldwide. The computing devices of the plurality of system user devices 108 send and receive signals through network 112 to/from cybersecurity system 110. The one or more computing devices of the plurality of system user devices 108 may communicate using various transmission media that may be wired and/or wireless as understood by those skilled in the art.

The one or more computing devices of the plurality of monitored devices 102 may include computers of any form factor such as a server computer 120, a desktop computer 114, a smart phone 116, a laptop 118, a personal digital assistant, an integrated messaging device, a tablet computer, etc. The plurality of monitored devices 102 further may include a camera, a point of sale device, a printer, a speaker, a display, etc. Referring to FIG. 2, the plurality of monitored devices 102 can include any number and any combination of form factors of devices that may be organized into sub-networks such as a first subnet 200a, a second subnet 200b, and an nth subnet 200n and may be distributed worldwide. The plurality of monitored devices 102 send and receive signals through network 112 to/from another of the plurality of monitored devices 102 and/or to/from one or more devices of the plurality of external devices 106. The plurality of monitored devices 102 may communicate using various transmission media that may be wired and/or wireless as understood by those skilled in the art.

Figure 2A:
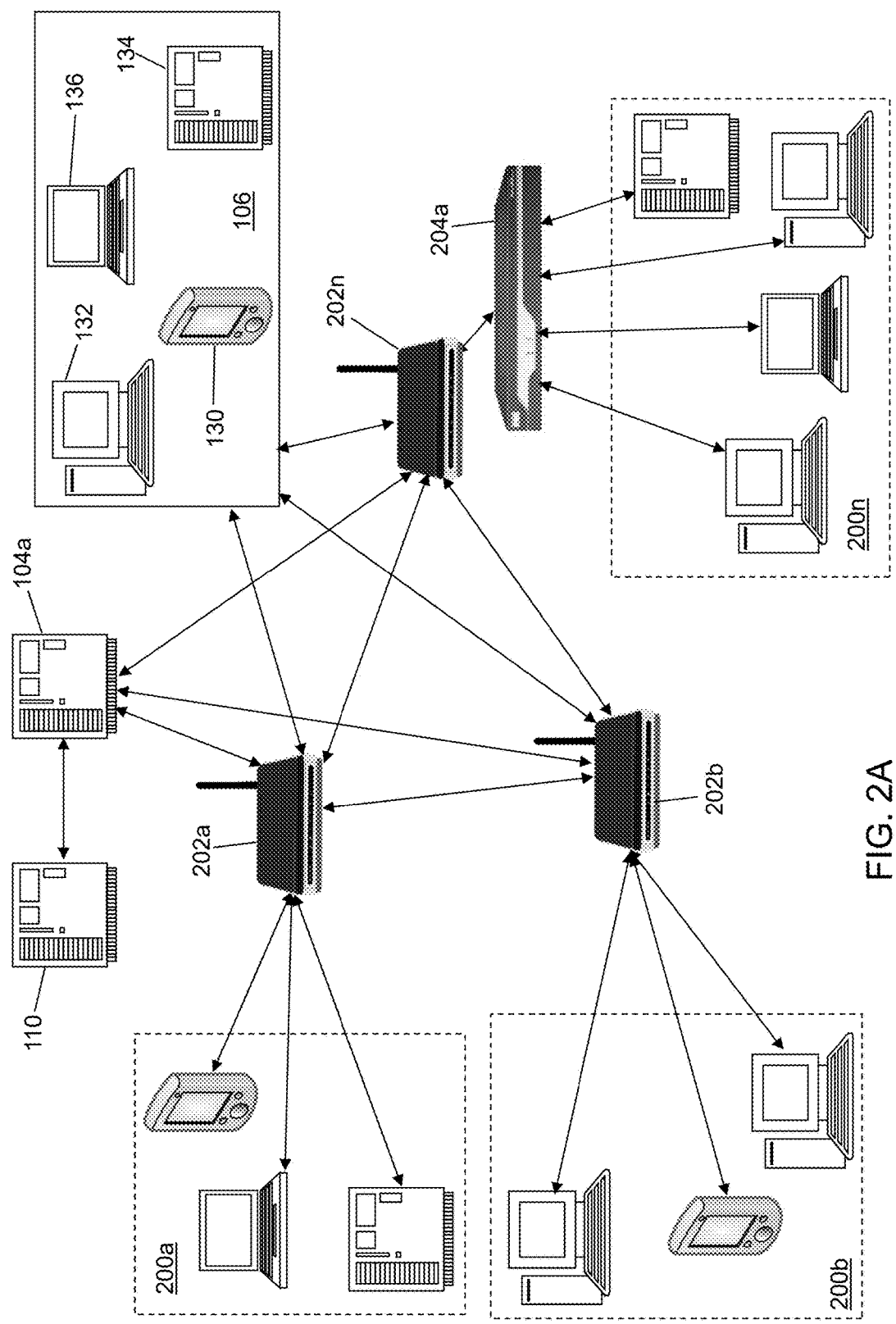
FIG. 2A depicts a first connectivity diagram of the cybersecurity monitoring system of FIG. 1 in accordance with an illustrative embodiment.
Figure 2B:
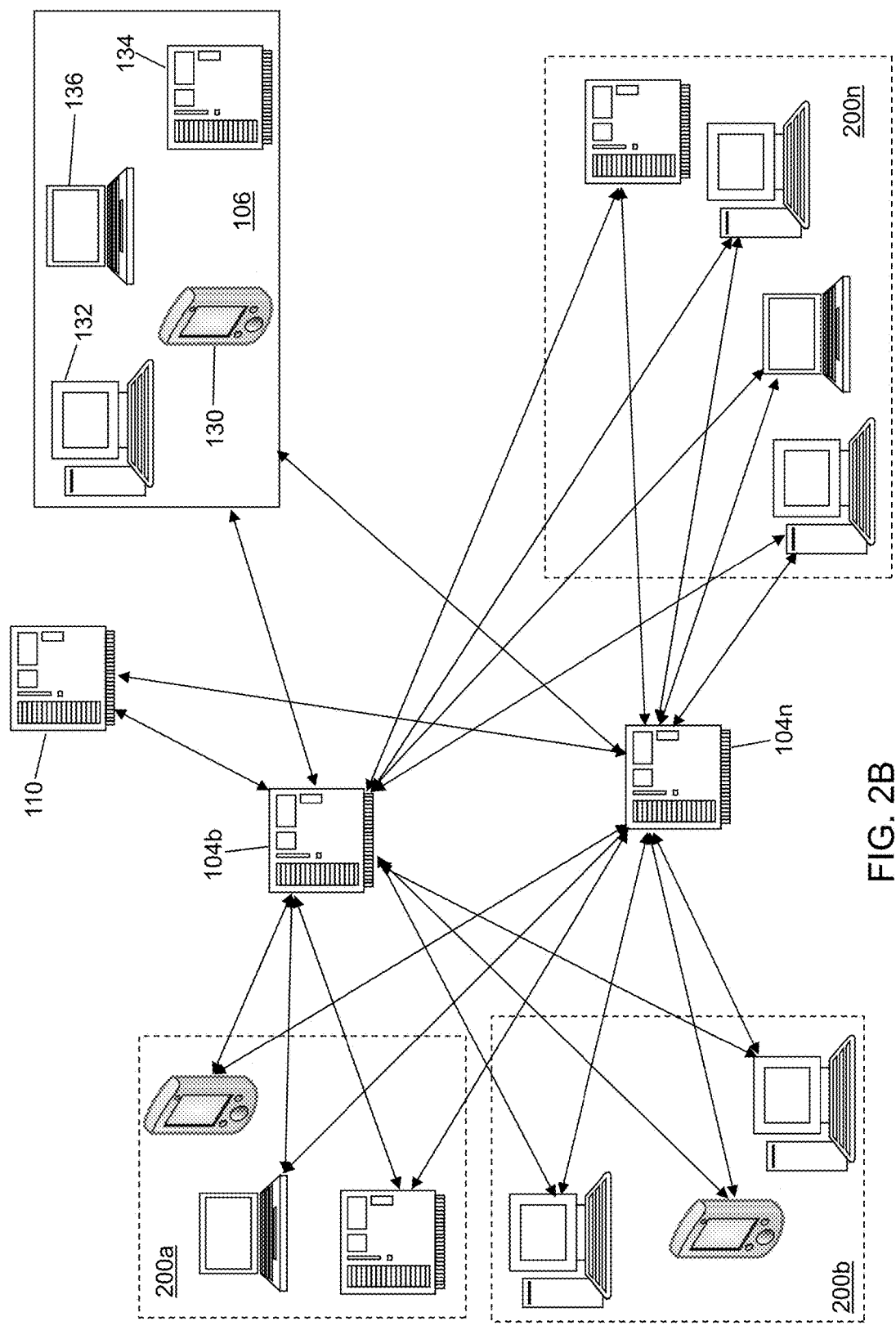
FIG. 2B depicts a second connectivity diagram of the cybersecurity monitoring system of FIG. 1 in accordance with an illustrative embodiment.

Referring to FIGS. 1, 2A, and 2B, the one or more computing devices of the plurality of external devices 106 may include computers of any form factor such as a server computer 134, a desktop computer 132, a smart phone 130, a laptop 136, a personal digital assistant, an integrated messaging device, a tablet computer, etc. The plurality of external devices 106 further may include a camera, a point of sale device, a printer, a speaker, a display, etc. The plurality of external devices 106 can include any number and any combination of form factors of computing devices and other devices that may be organized into sub-networks and distributed worldwide. The plurality of external devices 106 send and receive signals through network 112 to/from one or more devices of the plurality of monitored devices 102. The plurality of external devices 106 may communicate using various transmission media that may be wired and/or wireless as understood by those skilled in the art.

Referring to FIG. 2A, the plurality of monitored devices 102 included in first subnet 200a communicate with a first router 202a that routes communication packets to/from the plurality of monitored devices 102 included in first subnet 200a. The plurality of monitored devices 102 included in second subnet 200b communicate with a second router 202b that routes communication packets to/from the plurality of monitored devices 102 included in second subnet 200b. The plurality of monitored devices 102 included in nth subnet 200n communicate with a first switch 204a and nth router 202n that routes communication packets to/from the plurality of monitored devices 102 included in nth subnet 200n.

First router 202a, second router 202b, first switch 204a, and nth router 202n are illustrative communication networking devices of network 112 that route packets of information to/from first subnet 200a, second subnet 200b, and nth subnet 200n including to/from one of the plurality of external devices 106. First router 202a, second router 202b, first switch 204a, and nth router 202n are part of the internal network portion of network 112 and may be configured to send network flow records to a first network activity data capture device(s) 104a, for example, by being configured to send the network flow records to a pre-designated hostname:port of first network activity data capture device(s) 104a. First network activity data capture device(s) 104a further may be configured to send the network flow records to a pre-designated hostname:port of cybersecurity system 110.

Referring to FIG. 2B, the plurality of monitored devices 102 included in first subnet 200a, second subnet 200b, and nth subnet 200n communicate with a second network activity data capture device(s) 104b that is configured as a web proxy server or an authentication server. The computing devices of the plurality of monitored devices 102 included in first subnet 200a, second subnet 200b, and nth subnet 200n communicate with an nth network activity data capture device(s) 104n that is configured as an authentication server. In an alternative embodiment, second network activity data capture device(s) 104b and nth network activity data capture device(s) 104n may be configured as a web proxy server, an authentication server, and/or a syslog server. Though not shown for simplicity, the computing devices of the plurality of monitored devices 102 included in first subnet 200a, second subnet 200b, and nth subnet 200n may communicate with second network activity data capture device(s) 104b and nth network activity data capture device(s) 104n using one or more communication networking devices such as first router 202a, second router 202b, first switch 204a, and nth router 202n. First router 202a, second router 202b, first switch 204a, and nth router 202n further may be configured as a web proxy server and/or an authentication server. Second network activity data capture device(s) 104b and nth network activity data capture device(s) 104n are part of the internal network portion of network 112 and may be configured to send the web proxy data, authentication data, and/or syslog data received from the plurality of monitored devices 102 to cybersecurity system 110, for example, by being configured to send the data to a pre-designated hostname:port of cybersecurity system 110.

Figure 3:
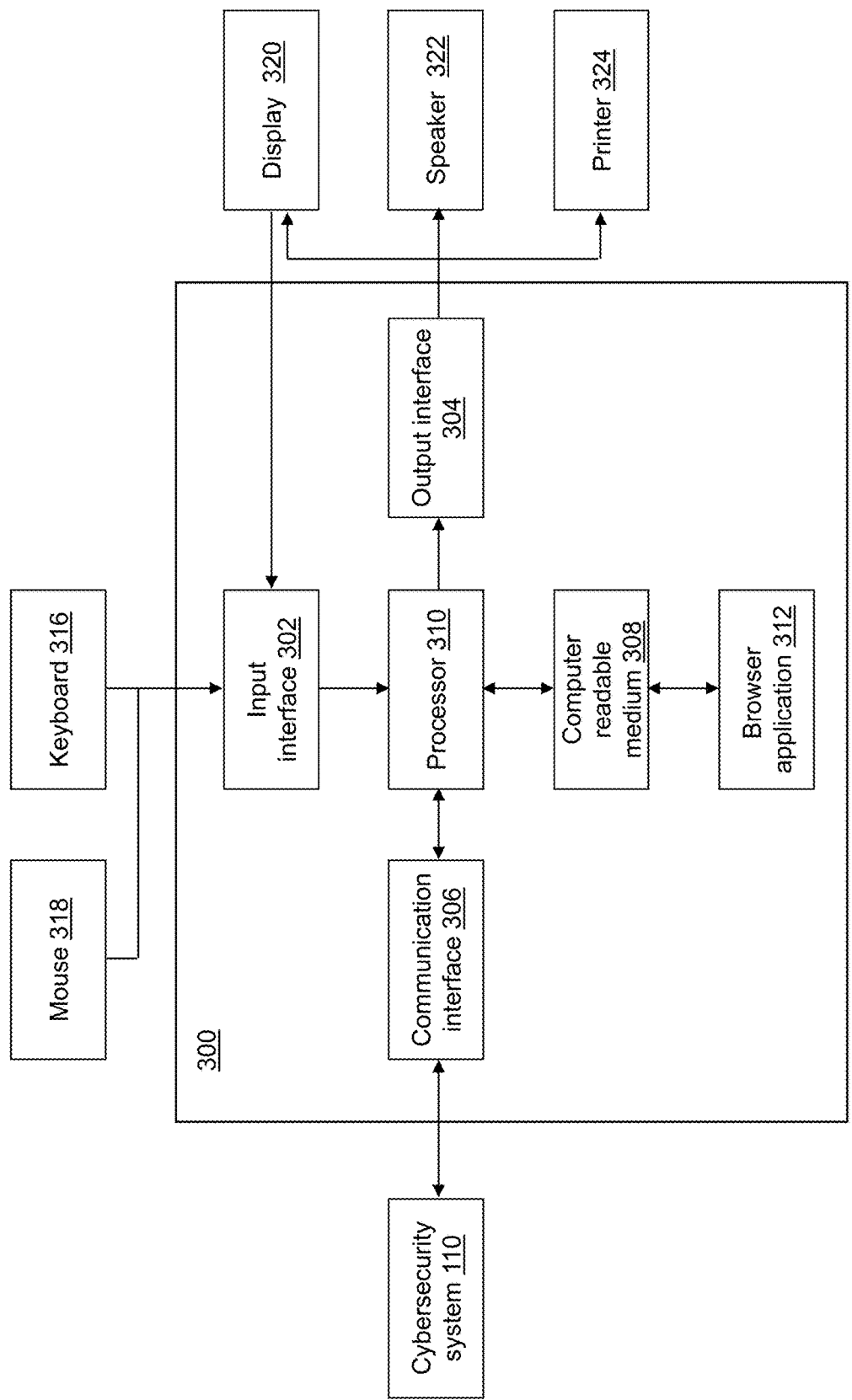
FIG. 3 depicts a system user device of the cybersecurity monitoring system of FIG. 1 in accordance with an illustrative embodiment.

Referring to FIG. 3, a block diagram of a system user device 300 is shown in accordance with an illustrative embodiment. System user device 300 is an example computing device of the plurality of system user devices 108. For example, each of server computer 124, desktop computer 122, smart phone 128, and laptop 126 is an instance of system user device 300. System user device 300 may include an input interface 302, an output interface 304, a communication interface 306, a computer-readable medium 308, a processor 310, and a browser application 312. Fewer, different, and additional components may be incorporated into system user device 300. The plurality of system user devices 108 may be geographically dispersed from each other and/or co-located. Each system user device 300 of the plurality of system user devices 108 may include the same or different components and combinations of components.

Input interface 302 provides an interface for receiving information for entry into system user device 300 as understood by those skilled in the art. Input interface 302 may interface with various input technologies including, but not limited to, a keyboard 316, a mouse 318, a display 320, a track ball, a keypad, one or more buttons, etc. to allow the user to enter information into system user device 300 or to make selections presented in a user interface displayed on display 320. The same interface may support both input interface 302 and output interface 304. For example, display 320 comprising a touch screen both allows user input and presents output to the user. System user device 300 may have one or more input interfaces that use the same or a different input interface technology. The input interface technology further may be accessible by system user device 300 through communication interface 306.

Output interface 304 provides an interface for outputting information for review by a user of system user device 300. For example, output interface 304 may interface with various output technologies including, but not limited to, display 320, a speaker 322, a printer 324, etc. System user device 300 may have one or more output interfaces that use the same or a different interface technology. The output interface technology further may be accessible by system user device 300 through communication interface 306.

Communication interface 306 provides an interface for receiving and transmitting data between devices using various protocols, transmission technologies, and media as understood by those skilled in the art. Communication interface 306 may support communication using various transmission media that may be wired and/or wireless. System user device 300 may have one or more communication interfaces that use the same or a different communication interface technology. For example, system user device 300 may support communication using an Ethernet port, a Bluetooth antenna, a telephone jack, a USB port, etc. Data and messages may be transferred between system user device 300 and cybersecurity system 110 using communication interface 306.

Computer-readable medium 308 is an electronic holding place or storage for information so the information can be accessed by processor 310 as understood by those skilled in the art. Computer-readable medium 308 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. System user device 300 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. System user device 300 also may have one or more drives that support the loading of a memory media such as a CD or DVD, an external hard drive, etc. One or more external hard drives further may be connected to system user device 300 using communication interface 106.

Processor 310 executes instructions as understood by those skilled in the art. The instructions may be carried out by a special purpose computer, logic circuits, or hardware circuits. Processor 310 may be implemented in hardware and/or firmware. Processor 310 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 310 operably couples with input interface 302, with output interface 304, with communication interface 306, and with computer-readable medium 308 to receive, to send, and to process information. Processor 310 may retrieve a set of instructions from a permanent memory device and copy the instructions in an executable form to a temporary memory device that is generally some form of RAM. System user device 300 may include a plurality of processors that use the same or a different processing technology.

Browser application 312 performs operations associated with retrieving, presenting, and traversing information resources provided by a web application and/or web server as understood by those skilled in the art. In an illustrative embodiment, cybersecurity system 110 includes a web application executing on a web server that presents information related to the network activity of the plurality of monitored devices 102. An information resource is identified by a uniform resource identifier (URI) and may be a web page, image, video, or other piece of content. Hyperlinks in resources enable users to navigate to related resources. Illustrative browser applications 312 include Navigator by Netscape Communications Corporation, Firefox® by Mozilla Corporation, Opera by Opera Software Corporation, Internet Explorer® by Microsoft Corporation, Safari by Apple Inc., Chrome by Google Inc., etc. as known to those skilled in the art.

Browser application 312 may be configured to receive HTTP/HTTPS responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as FTP, HTTP, HTTPS, H.323, RTSP, etc. The file accessed may be a simple text file, an image file, an audio file, a video file, an executable, a common gateway interface application, a Java applet, an extensible markup language (XML) file, or any other type of file supported by HTTP.

Figure 4:
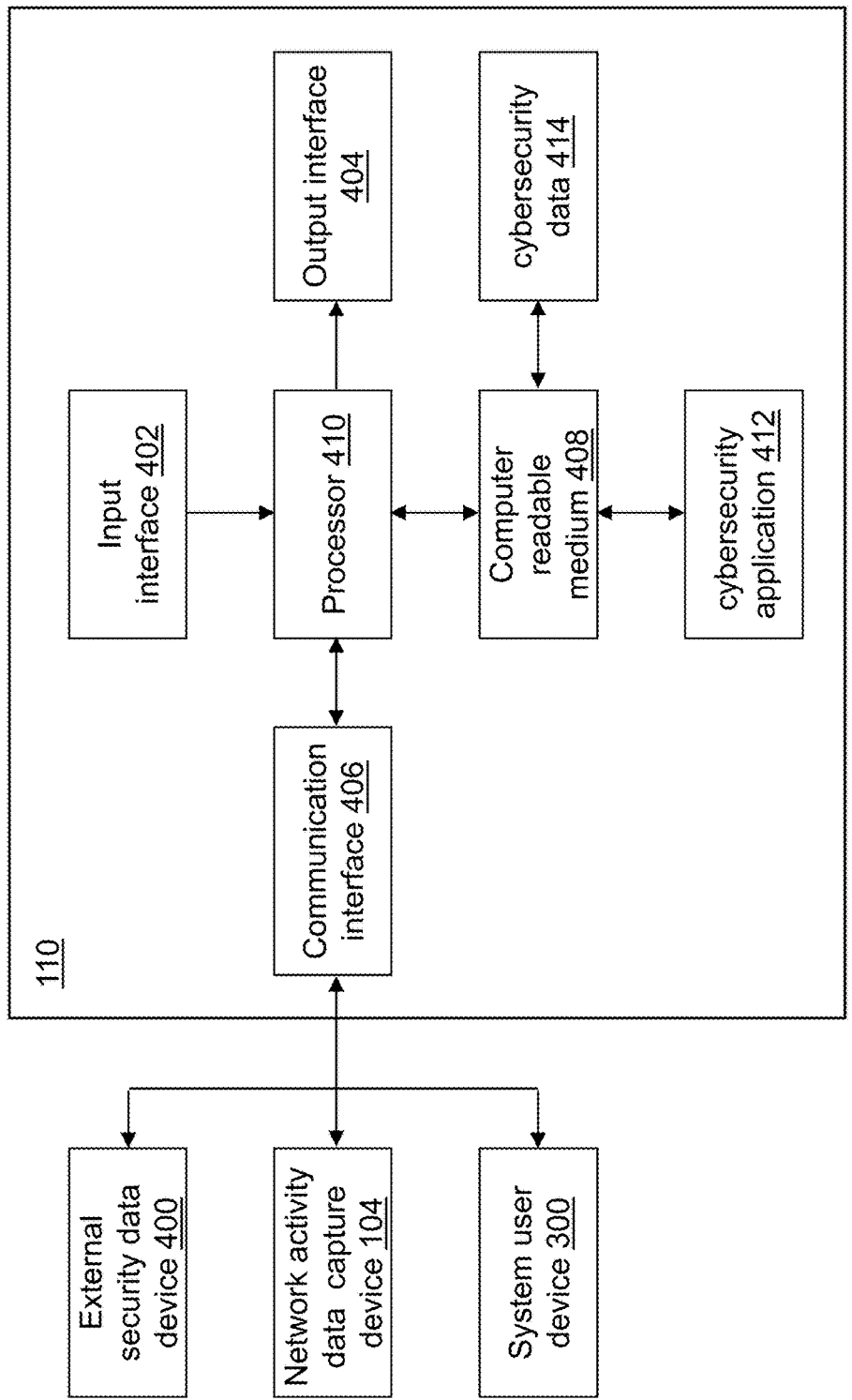
FIG. 4 depicts a cybersecurity system of the cybersecurity monitoring system of FIG. 1 in accordance with an illustrative embodiment.

Referring to FIG. 4, a block diagram of a cybersecurity system 110 is shown in accordance with an illustrative embodiment. As will be made clear below, cybersecurity system 110 may include a plurality of integrated computing devices though FIG. 4 shows a representation of cybersecurity system 110 in a single device. Cybersecurity system 110 may include a second input interface 402, a second output interface 404, a second communication interface 406, a second computer-readable medium 408, a second processor 410, a cybersecurity application 412, and cybersecurity data 414. Fewer, different, and additional components may be incorporated into cybersecurity system 110. The plurality of integrated computing devices that may implement cybersecurity system 110 may be geographically dispersed from each other and/or co-located. Each of the plurality of integrated computing devices that may implement cybersecurity system 110 may include the same or different components and combinations of components.

Second input interface 402 provides the same or similar functionality as that described with reference to input interface 302 of system user device 300 though referring to cybersecurity system 110 or one of the plurality of integrated computing devices that may implement cybersecurity system 110. Second output interface 404 provides the same or similar functionality as that described with reference to output interface 304 of system user device 300 though referring to cybersecurity system 110 or one of the plurality of integrated computing devices that may implement cybersecurity system 110. Second communication interface 406 provides the same or similar functionality as that described with reference to communication interface 306 of system user device 300 though referring to cybersecurity system 110 or one of the plurality of integrated computing devices that may implement cybersecurity system 110. Second computer-readable medium 408 provides the same or similar functionality as that described with reference to computer-readable medium 308 of system user device 300 though referring to cybersecurity system 110 or one of the plurality of integrated computing devices that may implement cybersecurity system 110. Second processor 410 provides the same or similar functionality as that described with reference to processor 310 of system user device 300 though referring to cybersecurity system 110 or one of the plurality of integrated computing devices that may implement cybersecurity system 110.

Data and messages may be transferred between cybersecurity system 110 and an external security data device 400 using second communication interface 406. For illustration, external security data device 400 may provide threat feeds to cybersecurity system 110, where the threat feeds, for example, provide lists of known bad IP addresses or known bad website addresses.

As another illustration, a black hole list may be defined for the internal network as a range of IP addresses that should never be contacted. If a device on the internal or external network tries to connect to one of the IP addresses included on the black hole list, that device may be identified as of immediate concern. The range of IP addresses can be added to the threat feeds, for example, with a category of "black hole" to allow cybersecurity system 110 to detect known bad IP addresses external (not routable within the internal network) to the entity and "black hole" IP addresses that are internal (routable within the internal network) to the entity.

Data and messages further may be transferred between cybersecurity system 110 and network activity data capture device 104 using second communication interface 406. Data and messages yet further may be transferred between cybersecurity system 110 and system user device 300 (e.g., any computing device of the plurality of system user devices 108) using second communication interface 406.

Figure 5:
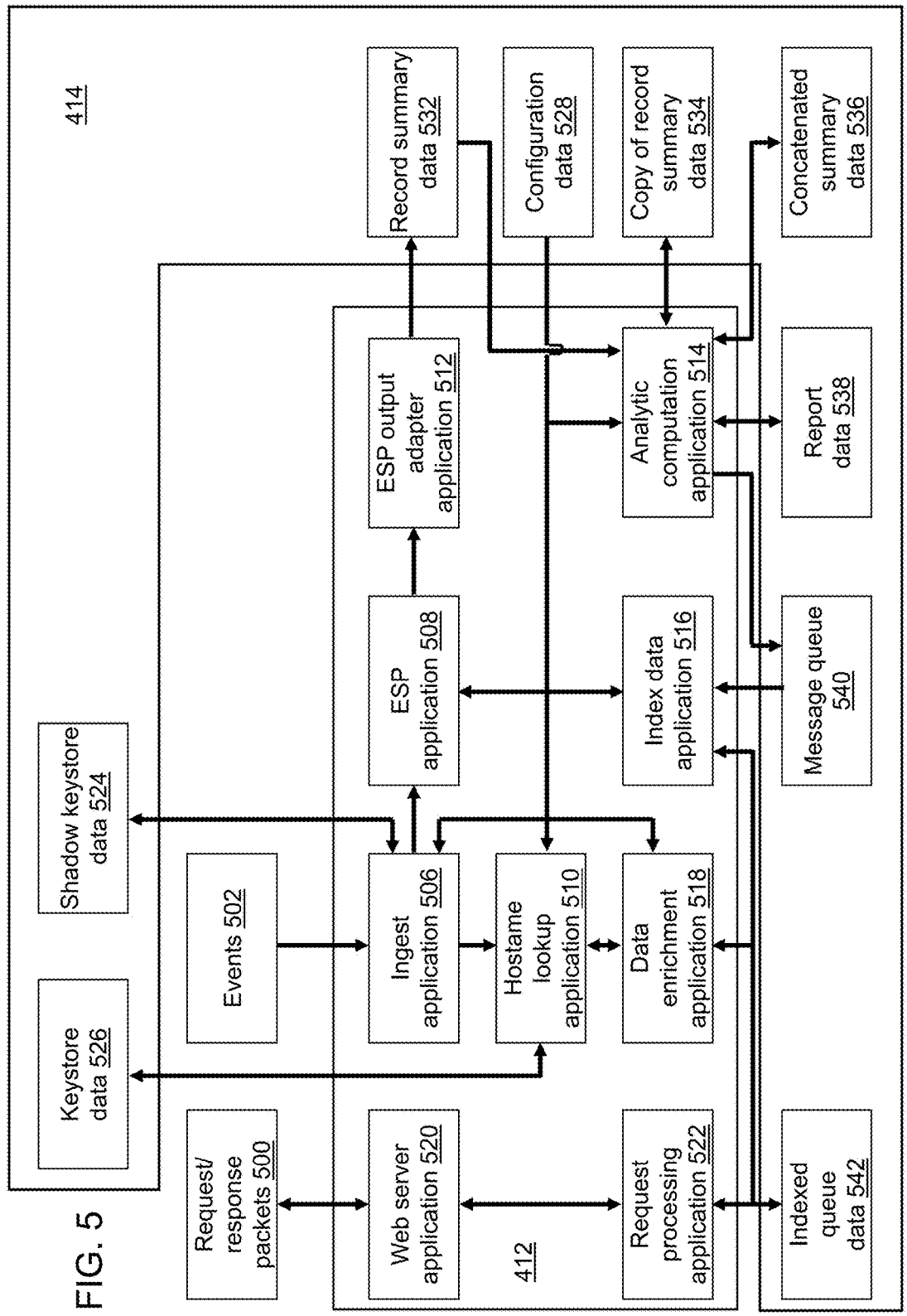
FIG. 5 depicts a block diagram illustrating interactions among components of the cybersecurity system of FIG. 4 in accordance with an illustrative embodiment.

Referring to FIG. 5, a block diagram illustrating interactions among the components of cybersecurity system 110 is shown in accordance with an illustrative embodiment. Cybersecurity application 412 may include an ingest application 506, an ESP application 508, a hostname lookup application 510, an ESP output adapter application 512, an analytic computation application 514, an index data application 516, a data enrichment application 518, a web server application 520, and a request processing application 522. Ingest application 506, ESP application 508, hostname lookup application 510, ESP output adapter application 512, analytic computation application 514, index data application 516, data enrichment application 518, web server application 520, and request processing application 522 interact with each other to provide cybersecurity functionality. In alternative embodiments, cybersecurity application 412 may include a fewer or a greater number of applications.

Referring to the example embodiment of FIG. 4, cybersecurity application 412 is implemented in software (comprised of computer-readable and/or computer-executable instructions) stored in second computer-readable medium 408 and accessible by second processor 410 for execution of the instructions that embody the operations of cybersecurity application 412. Cybersecurity application 412 may be written using one or more programming languages, assembly languages, scripting languages, etc. For illustration, cybersecurity application 412 may be implemented using or integrated with one or more of Base SAS, SAS® Enterprise Miner™ SAS/STAT®, SAS® High Performance Analytics Server, SAS® LASR™ Analytic Server, SAS® LASR™ In-Memory Analytic Server, SAS® LASR™ Analytic Server Access Tools, SAS® In-Database Products, SAS® Scalable Performance Data Engine, SAS/OR®, SAS/ETS®, SAS® Visual Analytics, SAS® Viya™ SAS In-Memory Statistics for Hadoop®, SAS® In-Memory Statistics, SAS® Forecast Server, SAS® Event Stream Processing Engine, SAS/Graph®, etc. all of which are developed and provided by SAS Institute Inc. of Cary, N.C., USA; Logstash® and Elasticsearch®, developed and provided by Elasticsearch BV; etc. Cybersecurity application 412 further may be stored and executed on a plurality of computing devices. As a result, cybersecurity application 412 may be stored in a plurality of second computer-readable media 408 and may be accessed by a plurality of second processors 410.

Cybersecurity data 414 may include a shadow keystore data 524, keystore data 526, configuration data 528, record summary data 532, a copy of record summary data 534, concatenated summary data 536, report data 538, message queue data 540, and indexed queue data 542. In alternative embodiments, cybersecurity data 414 may include a fewer or a greater number or distribution of data structures that store data used by and/or generated by cybersecurity system 110. For example, configuration data 528 may be distributed among a plurality of files.

The data stored in cybersecurity data 414 may be generated by and/or captured from a variety of sources including by one or more components of cybersecurity application 412. As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Cybersecurity data 414 may be stored on second computer-readable medium 408 or on one or more computer-readable media of cybersecurity system 110 that includes a plurality of computing devices. Cybersecurity data 414 may be accessed by cybersecurity system 110 using communication interface 406, input interface 402, and/or output interface 404. The data stored in cybersecurity data 414 may be captured at different date/time points periodically, intermittently, when an event occurs, etc. Each record of cybersecurity data 414 may include one or more date values and/or time values. Cybersecurity data 414 may include data captured at a high data rate such as hundreds of thousands of events per second.

Cybersecurity data 414 may be stored using one or more of various data structures as known to those skilled in the art including one or more files of a file system, a relational database, one or more tables of a system of tables, a structured query language database, etc. Cybersecurity system 110 may coordinate access to cybersecurity data 414 that is distributed across a plurality of computing devices. For example, a portion of cybersecurity data 414 may be stored in a cube distributed across a grid of computers as understood by a person of skill in the art. As another example, a portion of cybersecurity data 414 may be stored in a multi-node Hadoop® cluster. As an example, Apache™ Hadoop® is an open-source software framework for distributed computing supported by the Apache Software Foundation. As another example, a portion of cybersecurity data 414 may be stored in a cloud of computers and accessed using cloud computing technologies, as understood by a person of skill in the art. The SAS® LASR™ Analytic Server may be used as an analytic platform to enable multiple users to concurrently access data stored in cybersecurity data 414. The SAS® Viya™ open, cloud-ready, in-memory architecture also may be used as an analytic platform to enable multiple users to concurrently access data stored in cybersecurity data 414. Some systems may use SAS In-Memory Statistics for Hadoop® to read big data once and analyze it several times by persisting it in-memory for the entire session. Some systems may be of other types and configurations.

Request/response packets 500 may be received and sent, respectively, by web server application 520. Response packets may be generated from data stored in indexed queue data 542 based on a query included in a request packet. Request/response packets 500 may be sent from and received, respectively, by browser application 312 executing at system user device 300. In response to receipt of a response packet, browser application 312 may modify the information presented in display 320 of system user device 300 that relates to network activity associated with the plurality of monitored devices 102. For illustration, FIGS. 20-32 present various graphical user interface windows presented in display 320 in response to receipt of a response packet.

Events 502 may be received by ingest application 506 of cybersecurity application 412. For illustration, events 502 may include packets of syslog data, network flow data, web proxy data, and/or authentication data from network activity data capture device(s) 104. For example, events 502 may be sent to a first pre-designated hostname:port for a device executing ingest application 506 of cybersecurity application 412 using TCP or UDP packets. The first pre-designated hostname:port may be included in configuration data 528 read when cybersecurity system 110 is installed and started. Different types of events 502 may be received by different pre-designated hostname:ports as defined in configuration data 528.

Event block objects created by ingest application 506 from events 502 may be sent to ESP application 508 of cybersecurity application 412. For illustration, the event block objects may be sent to a second pre-designated hostname:port for a device executing ESP application 508 of cybersecurity application 412 using a streaming protocol such as RTSP. The second pre-designated hostname:port may be included in configuration data 528 read when cybersecurity system 110 is installed and started.

Figure 6A:
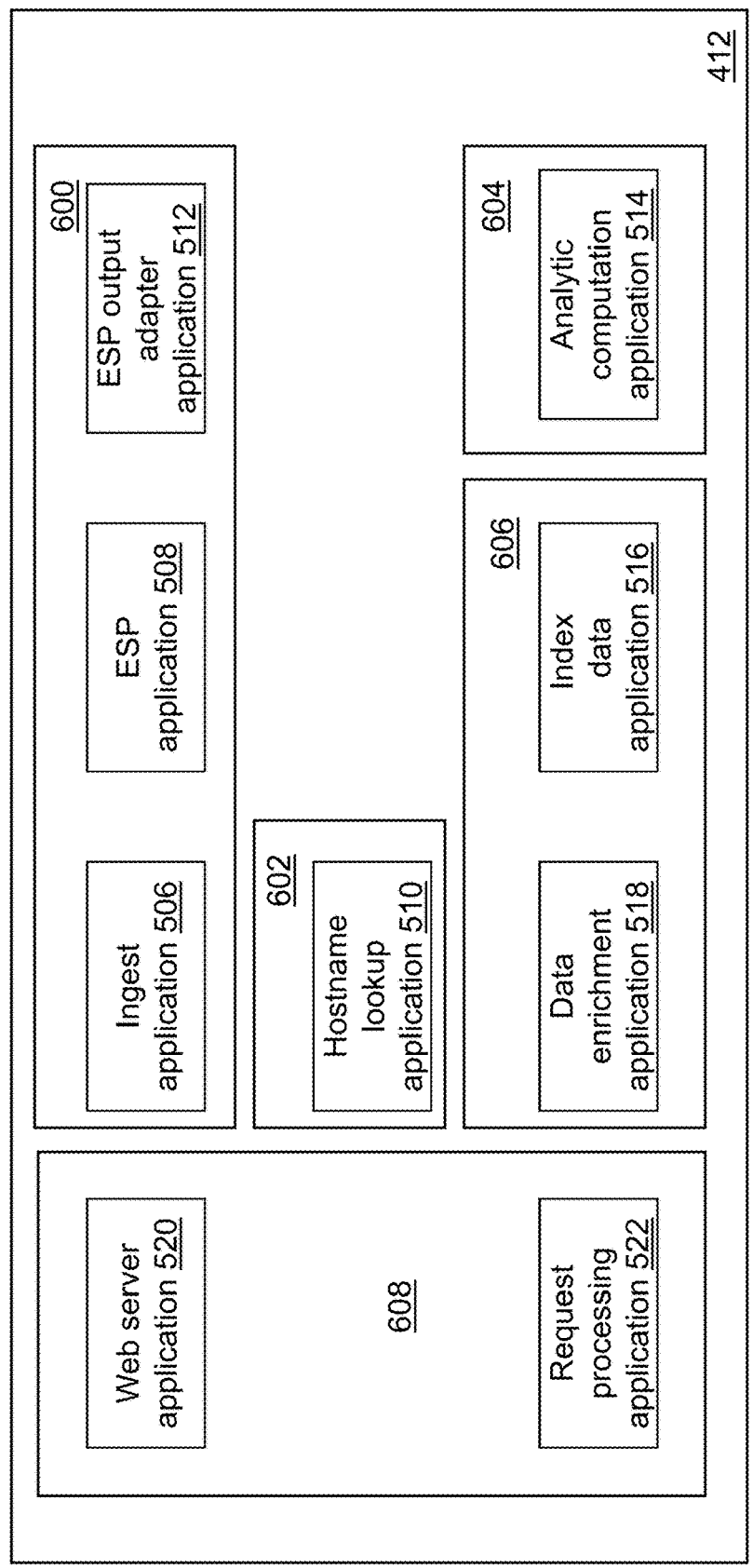
FIG. 6A depicts a distribution of the components of a cybersecurity application of the cybersecurity system of FIG. 4 across a plurality of computing devices in accordance with an illustrative embodiment.

Referring to FIG. 6A, a distribution of components of cybersecurity application 412 across a plurality of computing devices is shown in accordance with an illustrative embodiment. The number and types of computing devices may be different for each component, for example, based on the number of computing devices included in the plurality of monitored devices 102. Ingest application 506, ESP application 508, and ESP output adapter application 512 may be installed and executed on a first group of computing devices 600 to support the high speed processing of the large quantity of data that may be included in events 502. The first group of computing devices 600 may include one or more server type computing devices. In general, a server type computing device may include faster processors, a plurality of processors, more disk memory, and more random access memory (RAM) than a client type computing device and support multi-threading as understood by a person of skill in the art.

Starting an ESP manager application portion of ESP application 508 on the first group of computing devices 600 may initialize an ESP engine (ESPE) with a streaming application and read contextualization data from configuration data 528 into memory. After the ESP manager application initializes, ingest application 506 can be started to process events 502 into the event block objects sent to the ESPE. ESP output adapter application 512 receives the processed event block objects and outputs them to subscribing client applications using predefined formats.

Hostname lookup application 510 may be installed and executed on a second group of computing devices 602. The second group of computing devices 602 may include one or more server type computing devices.

Analytic computation application 514 may be installed and executed on a third group of computing devices 604. The third group of computing devices 604 may include one or more server type computing devices.

Index data application 516 and data enrichment application 518 may be installed and executed on a fourth group of computing devices 606. The fourth group of computing devices 606 may include one or more server type computing devices.

Web server application 520 and request processing application 522 may be installed and executed on a fifth group of computing devices 608. The fifth group of computing devices 606 may include one or more server type computing devices.

Figure 6B:
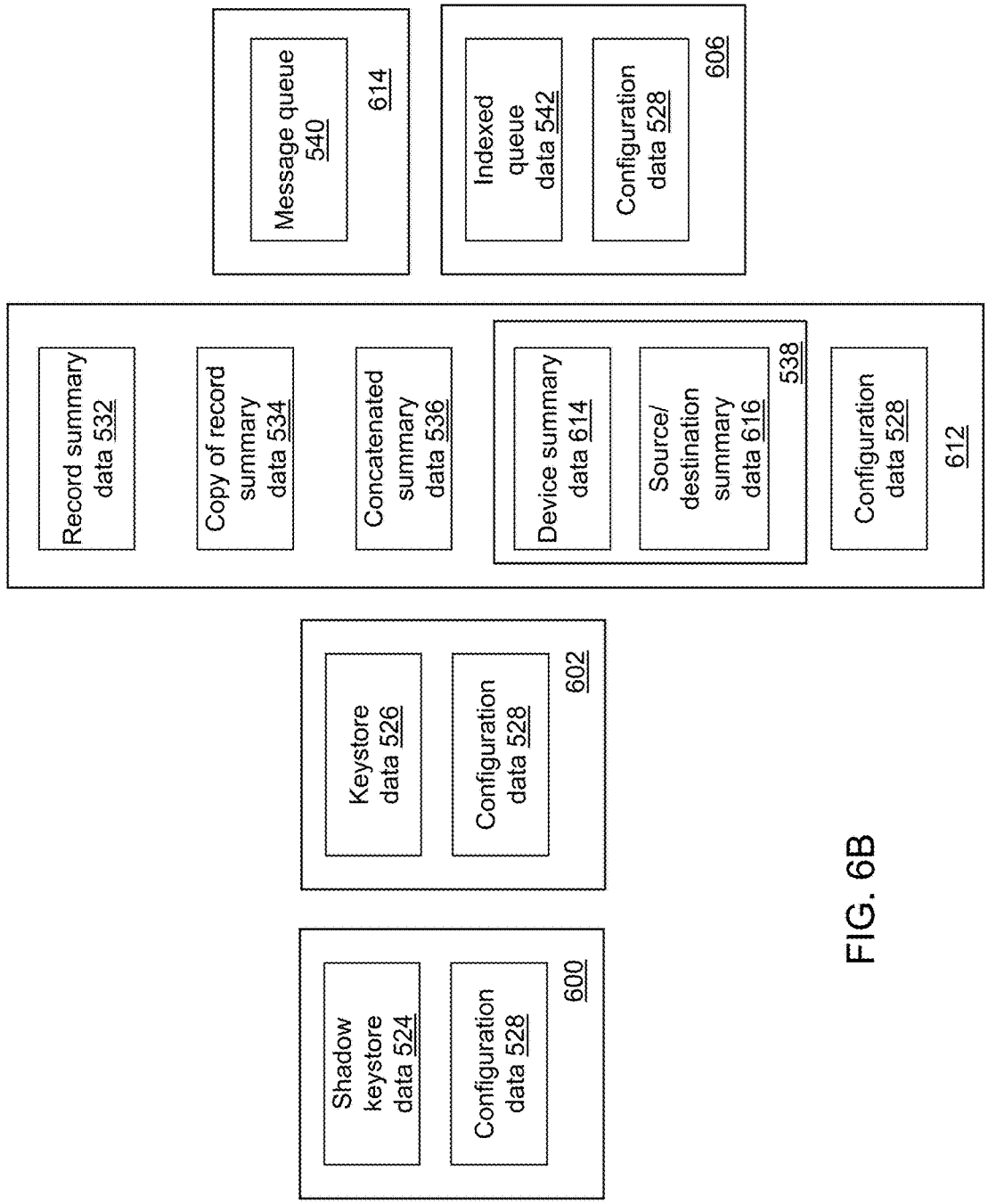
FIG. 6B depicts a distribution of the components of cybersecurity data of the cybersecurity system of FIG. 4 across a plurality of computing devices in accordance with an illustrative embodiment.

Referring to FIG. 6B, a distribution of components of cybersecurity data 414 across a plurality of computing devices is shown in accordance with an illustrative embodiment. Shadow keystore data 524 and configuration data 528 may be read and stored on the first group of computing devices 600 as part of initial execution of cybersecurity system 110. For example, configuration data 528 may be read from a pre-defined location and stored in a cache of the first group of computing devices 600 as needed. Shadow keystore data 524 further may be read from a pre-defined location and stored in cache. Shadow keystore data 524 may be synchronized with keystore data 526 as it is updated during execution of cybersecurity system 110.

Keystore data 526 and configuration data 528 may be read and stored on the second group of computing devices 602 as part of initial execution of cybersecurity system 110. For example, configuration data 528 may be read from a pre-defined location and stored in a cache of the second group of computing devices 602 as needed. Keystore data 526 may be updated during execution of cybersecurity system 110 by hostname lookup application 510.

Record summary data 532, the copy of record summary data 534, concatenated summary data 536, report data 538, and configuration data 528 may be stored on the third group of computing devices 604 or on a seventh group of computing devices 612. Message queue data 540 may be stored on the fourth group of computing devices 606 or on an eighth group of computing devices 614. Indexed queue data 542 and configuration data 528 may be stored on the fourth group of computing devices 606. Again, configuration data 528 may be read from a pre-defined location and stored in a cache of the fourth group of computing devices 606 as needed.

For example, configuration data 528 may include server information that describes the distribution of components of cybersecurity application 412 and the distribution of components of cybersecurity data 414 across the plurality of computing devices. For illustration, configuration data 528 may include a hostname and port number for an active directory (AD) and/or lightweight directory access protocol (LDAP) server, the first group of computing devices 600, the second group of computing devices 602, the third group of computing devices 604, the fourth group of computing devices 606, the fifth group of computing devices 608, the sixth group of computing devices 610, the seventh group of computing devices 612, and the eighth group of computing devices 614. Configuration data 528 further may include an AD binding user distinguished name, an AD binding user password, an AD base search distinguished name, and/or a port to be used such as port number 3268. Configuration data 528 further may include a URL for an entity directory such as an internal corporate employee directory.

ESP application 508 defines how incoming event streams from the device(s) executing ingest application 506 are transformed into outgoing event streams output to ESP output adapter application 512. ESP application 508 may embed the ESPE with its own dedicated thread pool or pools into its application space where the main application thread can do application-specific work, and the ESPE processes event streams at least by creating an instance of a model into processing objects. For illustration, ESP application 508 may be implemented using the SAS® Event Stream Processing Engine.

Figure 7:
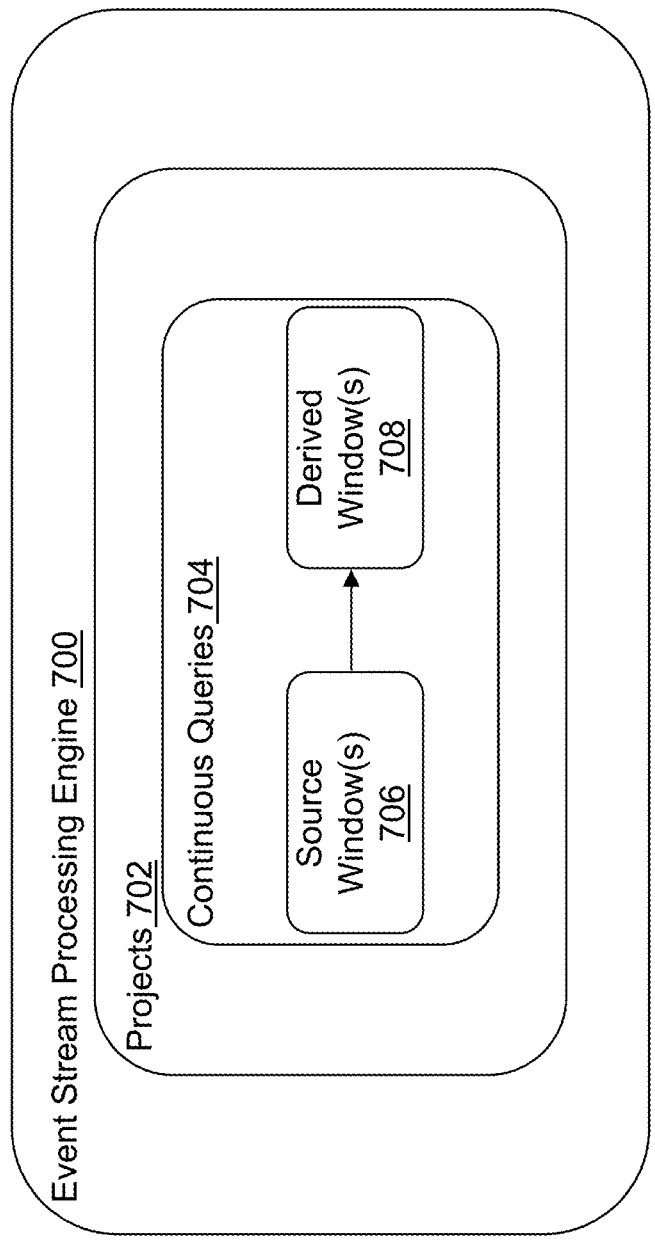
FIG. 7 depicts a block diagram of an event stream processing (ESP) engine executing as part of the cybersecurity system of FIG. 4 in accordance with an illustrative embodiment.

Referring to FIG. 7, when executed, ESP application 508 defines and starts ESPE 700 at the first group of computing devices 600. ESPE 700 may analyze and process events in motion or "event streams." Instead of storing data and running queries against the stored data, ESPE 700 may store queries and stream data through them to allow continuous analysis of data as it is received. For example, referring to FIG. 7, the components of ESPE 700 are shown in accordance with an illustrative embodiment. ESPE 700 may include one or more projects 702. A project may be described as a second-level container in an engine model managed by ESPE 700 where a thread pool size for the project may be defined by a user. A value of 1 for the thread pool size indicates that writes are single-threaded. Each project of the one or more projects 702 may include one or more continuous queries 704 that contain data flows, which are data transformations of incoming event streams including event block objects generated by an instantiation of ingest application 506. The one or more continuous queries 704 may include one or more source windows 706 and one or more derived windows 708.

The engine container is the top-level container in a model that manages the resources of the one or more projects 702. In an illustrative embodiment, for example, there is a single ESPE 700 for each instance of ESP application 508, and ESPE 700 has a unique engine name. Additionally, the one or more projects 702 may each have unique project names, and each query may have a unique continuous query name and begin with a uniquely named source window of the one or more source windows 706. ESPE 700 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 706 and the one or more derived windows 708 represent continuously executing queries that generate updates to a query result set as new event blocks stream through ESPE 700. A directed graph, for example, is a set of nodes connected by edges, where the edges have a direction associated with them.

An event object may be described as a packet of data accessible as a collection of fields, with at least one of the fields defined as a key or unique ID. The event object may be created using a variety of formats including binary, alphanumeric, XML, etc. Each event object may include one or more fields designated as a primary ID for the event so ESPE 700 can support operation codes (opcodes) for events including insert, update, upsert, and delete. Upsert opcodes update the event if the key field already exists; otherwise, the event is inserted.

ESPE may receive one or more types of event objects. For illustration, a first type of event object may be a packed binary representation of one or more network flow records processed into one or more event block objects that include one or more event objects. A second type of event object may be a packed binary representation of an authentication record. A third type of event object may be a packed binary representation of a web proxy record. A fourth type of event object may be a packed binary representation of another type of syslog record.

An event block object may be described as a grouping or package of one or more event objects. An event stream may be described as a flow of event block objects. A continuous query of the one or more continuous queries 704 transforms the incoming event stream made up of streaming event block objects published into ESPE 700 into one or more outgoing event streams using the one or more source windows 706 and the one or more derived windows 708. A continuous query can also be thought of as data flow modeling.

The one or more source windows 706 are at the top of the directed graph and have no windows feeding into them. Event streams are published into the one or more source windows 706, and from there, the event streams are directed to the next set of connected windows as defined by the directed graph. The one or more derived windows 708 are all instantiated windows that are not source windows and that have other windows streaming events into them. The one or more derived windows 708 perform computations or transformations on the incoming event streams. The one or more derived windows 708 transform event streams based on the window type (that is operators such as join, filter, compute, aggregate, copy, pattern match, procedural, union, etc.) and window settings. As event streams are published into ESPE 700, they are continuously queried, and the resulting sets of derived windows in these queries are continuously updated.

ESP application 508 may be developed, for example, using a modeling application programming interface (API) that provides a set of classes with member functions. As an example, the SAS® Event Stream Processing Engine provides a modeling API that provides a set of classes with member functions. These functions enable ESP application 508 to embed ESPE 700 possibly with dedicated thread pools into its own process space. Alternatively, ESPE 700 can be embedded into the process space of an existing or a new application. In that case, a main application thread is focused on its own chores and interacts with the embedded ESPE 700 as needed.

Figure 8:
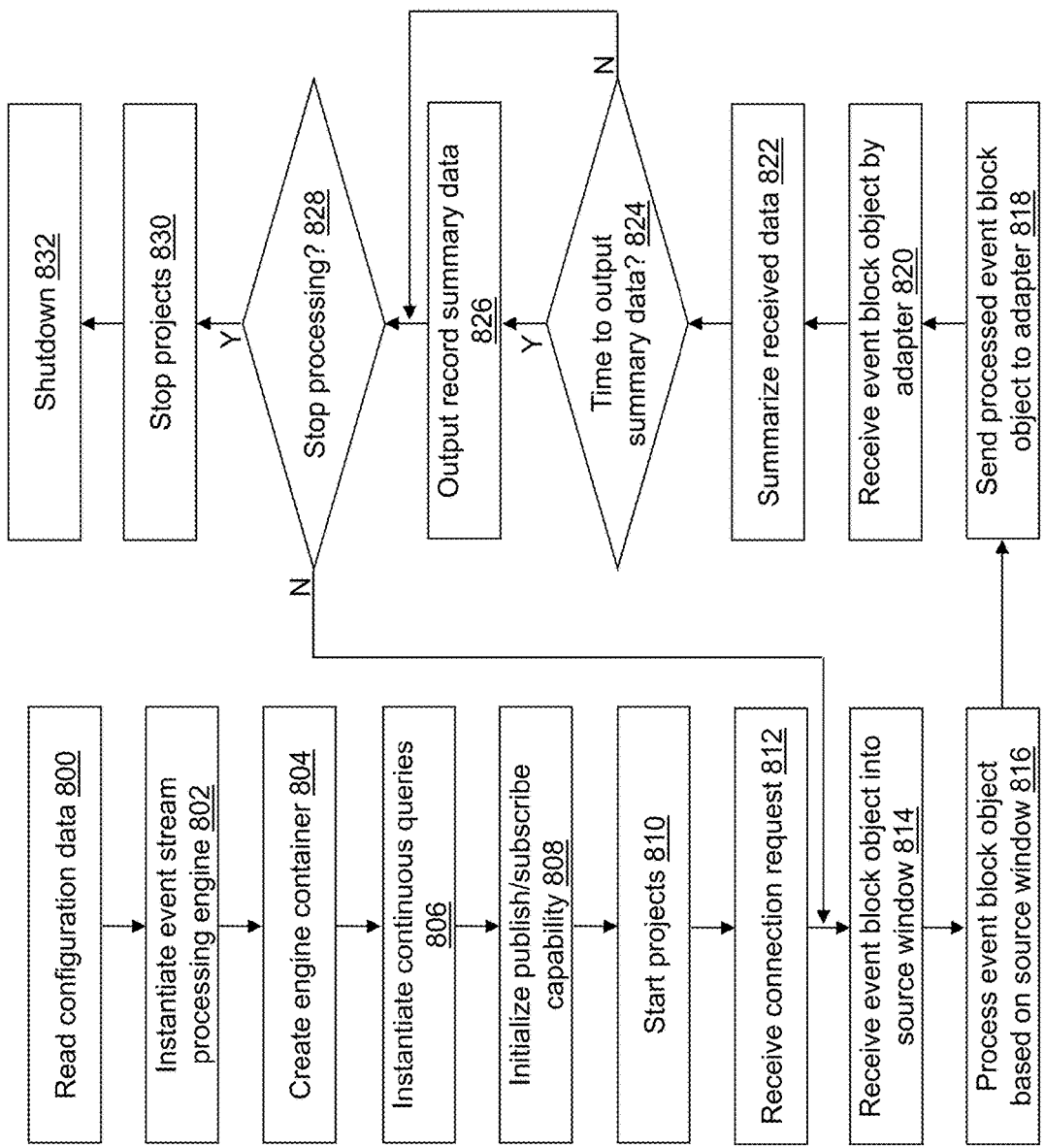
FIG. 8 depicts a flow diagram illustrating examples of operations performed by an ESP application of the cybersecurity application of the cybersecurity system of FIG. 4 in accordance with an illustrative embodiment.

Referring to FIG. 8, example operations associated with ESP application 508 are described. Additional, fewer, or different operations may be performed depending on the embodiment. The order of presentation of the operations of FIG. 8 is not intended to be limiting. Although some of the operational flows are presented in sequence, the various operations may be performed in various repetitions, concurrently, and/or in other orders than those that are illustrated. For example, various operations may be performed in parallel, for example, using a plurality of threads.

In an operation 800, configuration data 528 is read and may be stored in a local cache. For illustration, configuration data 528 may include information that characterizes the internal network of the entity also referred to herein as network context data. Configuration data 528 may be distributed among one or more distinct data structures such as one more data files using one or more data formats. For example, a networks file may include an IP address, a network name, a network type, a geographic location, a time zone, etc. for each device of the plurality of monitored devices 102 that is associated with the internal network of the entity. The network name identifies a portion of the internal network to which the IP address is associated. The network type identifies a type of network such as static, DHCP, customer-specific, etc. The geographic location may include one or more of a city, a region, a state, a province, a country, a latitude, a longitude, a site code (e.g., US1, US2, IN, CN1, CN2), etc. The time zone information may be a time zone offset time value relative to Greenwich mean time (GMT) for the site location of the device.

As another example, a server file may include the IP address, a hostname, a user ID, a division ID, a department ID, a peer group ID, a device type, etc. for each computing device of the plurality of monitored devices 102 that has a static IP address. The server file may be used to differentiate devices that are associated with a user such as a client computing device from devices that are not associated with a user of the internal network. The devices that are not associated with a user may include devices such as server computing devices, printers, cameras, point of sale devices, routers, etc. The hostname may be the fully qualified domain name associated with the IP address. The user ID defines the user associated with the device and is left blank for devices not associated with a user. Each entity may have its own division ID, department ID, and peer group ID. The division ID defines an organizational division to which the device is associated (e.g., North America). The department ID defines an organizational department to which the device is associated (e.g., automobile sales). The peer group ID defines a peer group to which the device is associated (e.g., database, development).

Each peer group identifies a set of assets, hosts, and/or users expected to have matching attributes and to exhibit similar behavior. The device type identifies a broader classification of the device (e.g., client, server, demilitarized zone). Peer groups may be organized into two categories: user-based and non-user-based. Behavioral analysis may be defined by a combination of the assigned peer group of a user of a device and the time zone of the network in which a device or user is active.

For illustration, John works as a human resources (HR) benefits specialist in Chicago, Ill. He is assigned to the HR peer group for the entity in the server file. When John works from the Chicago office of the entity, his behaviors are compared with others who are in the HR peer group and are active in the entity's network in the central time zone of the United States (US). John travels to an office of the entity in Munich, Germany to communicate recent changes to corporate benefits. While he is working in Munich, John's behaviors are compared to others who are in the HR peer group and are active in the entity's network in central European time.

As another illustration, a retail entity has 500 stores in the continental US that span all four time zones. All computers supporting point of sale (POS) functions are assigned to the POS peer group. The behavior of a single POS device is compared to all POS devices within the same network time zone. This same concept applies to devices such as printers, servers, routers, security cameras, etc.

As still another example, a threat feed file may include a list of normalized external IP addresses that are associated with known threat categories, such as malware, botnet, tor exit nodes, etc. An organization can take multiple threat feeds and combine them into a single threat feed file. The threat feed file may include an IP address, a risk value, a category ID, a geographic location, etc. for each device associated with known threat categories. The risk value may be a numeric value used to differentiate the risk of the associated IP address from low (10) to high (100). The category ID identifies a category for the threat such as malware, botnet, TOR exit node, c2c, etc. The geographic location may include a country, a latitude, and a longitude associated with the IP address.

In an operation 802, ESP application 508 instantiates ESPE 700 on the first group of computing devices 600.

In an operation 804, the engine container is created. For illustration, ESPE 700 may be instantiated using a function call that specifies the engine container as a manager for the model. The function call may include the engine name for ESPE 700 that is provided by a user or a developer and may be unique to ESPE 700. For illustration, the engine name may be included in configuration data 528

In an operation 806, the one or more continuous queries 704 are instantiated by ESPE 700 as a model. The one or more continuous queries 704 may be instantiated with a dedicated thread pool or pools that generate updates as new event block objects stream through ESPE 700. To create a continuous query, input event structures that are schemas with keys that flow into the one or more source windows 706 may be identified. Output event structures that are also schemas with keys generated by the one or more source windows 706 and/or the one or more derived windows 708 may also be identified. For example, the block of code below illustrates creation of a compute window that normalizes a "City" field that is created for events in that window:

```
dfESPwindow_source *sw;
  sw = contQuery->newWindow_source("sourceWindow", depot,
    dfESPindextypes::pi_HASH,
    dfESPstring("name:string,ID*:int32,city:string"));
```

```
dfESPschema *sw_schema = sw->getSchema( );
dfESPwindow_compute *cw;
cw = contQuery->newWindow_compute("computeWindow", depot,
    dfESPindextypes::pi_HASH,
    dfESPstring("ID*:int32,name:string,oldCity:string,newCity:string"));
// Register the non-key field calculation expressions.
cw->addNonKeyFieldCalc("name"); // pass name through unchanged
cw->addNonKeyFieldCalc("city"); // pass city through unchanged
// Run city through the blue fusion standardize function.
char newCity[1024] = "bluefusion bf\r\n";
strcat(newCity, "String result\r\n");
strcat(newCity, "bf = bluefusion_initialize( )\r\n");
strcat(newCity, "if (isnull(bf)) then\r\n");
strcat(newCity, " print(bf.getlasterror( ))\r\n");
strcat(newCity, "if (bf.loadqkb(\"ENUSA\") == 0) then\r\n");
strcat(newCity, " print(bf.getlasterror( ))\r\n");
strcat(newCity, "if (bf.standardize(\"City\",city,result) == 0) then\r\n");
strcat(newCity, " print(bf.getlasterror( ))\r\n");
strcat(newCity, "return result");
cw->addNonKeyFieldCalc(newCity);
// Add the subscriber callbacks to the windows
cw->addSubscriberCallback(winSubscribe_compute);
// Add window connectivity
contQuery->addEdge(sw, 0, cw);
// create and start the project
project->setNumThreads(2);
myEngine->startProjects( );
// declare variables to build up the input data.
dfESPptrVect<dfESPeventPtr> trans;
dfESPevent *p;
// Insert multiple events
p = new dfESPevent(sw_schema,(char *)"i,n,Jerry, 1111, apex");
trans.push_back(p);
p = new dfESPevent(sw_schema,(char *)"i,n,Scott, 1112, caryy");
trans.push_back(p);
p = new dfESPevent(sw_schema,(char *)"i,n,someone, 1113,
rallleigh");
trans.push_back(p);
dfESPeventblockPtr ib = dfESPeventblock::newEventBlock(&trans,
    dfESPeventblock::ebt_TRANS);
project->injectData(contQuery, sw, ib);
```

In an operation 808, a publish/subscribe (pub/sub) capability is initialized for ESPE 700. In an illustrative embodiment, a pub/sub capability is initialized for each project of the one or more projects 702. To initialize and enable pub/sub capability for ESPE 700, a port number is provided. Pub/sub clients can use a hostname of ESP device 104 and the port number to establish pub/sub connections to ESPE 700. For example, a server listener socket is opened for the port number to enable the instantiation of ingest application 506 to connect to ESPE 700 for publish/subscribe services. The hostname and the port number to establish pub/sub connections to ESPE 700 may be referred to as the host:port designation of ESPE 700 executing on the first group of computing devices 600.

Publish-subscribe is a message-oriented interaction paradigm based on indirect addressing. Processed data recipients specify their interest in receiving information from ESPE 700 by subscribing to specific classes of events, while information sources (e.g., the network activity data capture device(s) 104) publish events to ESPE 700 without directly addressing the data recipients.

A publish/subscribe API may be described as a library that enables an event publisher, such as ingest application 506, to publish event streams into ESPE 700 or an event subscriber, such as ESP output adapter application 512 to subscribe to event streams from ESPE 700. For illustration, one or more publish/subscribe APIs may be defined. As an example, the SAS® Event Stream Processing Engine provides a C++ publish/subscribe API and a Java publish/subscribe API. Using the publish/subscribe API, network activity data capture device(s) 104 may publish event streams into a running event stream processor project source window of ESPE 700, and a subscribing device may subscribe to a project source window of ESPE 700. The publish/subscribe API provides cross-platform connectivity and endianness compatibility between ESP application 508 and other networked applications.

In an operation 810, the one or more projects 702 are started. The one or more started projects may run in the background.

In an operation 812, a connection request is received, for example, from ingest application 506, for a source window to which data will be published.

In an operation 814, an event block object is received from ingest application 506. An event block object containing one or more event objects is injected into a source window of the one or more source windows 706. The event block object is automatically received by a predefined source window of the one or more source windows 706 from ingest application 506 based on data read from configuration data 528 as described below referring, for example, to operations 921, 942, 945, 948, and/or 974.

In an operation 816, the received event block object is processed through the one or more continuous queries 704. For example, authentication event data included in the event block object received from ingest application 506 is correlated with network flow record event data, web proxy event data, threat feed data, etc. using a continuous query.

For example, a web proxy source window of ESPE 700 may receive web proxy event block objects and authentication event block objects. The user ID included in each web proxy event record of the received web proxy event block objects is matched to a user ID included in an authentication record included in each authentication event block object. The division ID, department ID, peer group ID, and device type included in the authentication record for the matching user ID is joined to the web proxy event record. This join enables reporting of allowed web traffic, blocked web traffic, and web proxy URL categories by division ID, department ID, peer group ID, and device type.

A network flow source window of ESPE 700 may receive network flow event block objects, authentication event block objects, and read network context data and threat feed data from configuration data 528. The IP address is matched to associate network flow event data with a specific user of the computing device having that IP address. Both the source IP address and the destination IP address may be matched though some destination IP addresses may not have matching authentication event data or network context data because the associated device is part of the external network.

The source and destination IP address included in each network flow event record of the received network flow event block event block objects is matched to an IP address included in the network context data, for example, in a NetworkContext source window. A network scope, a network type, a geographic location, and a time zone included in the network context data for the matching IP address is joined to the network flow event record. The network scope is set to internal unless the IP address is not part of the internal network. When the IP address is not part of the internal network, the scope is set to external.

The source and destination IP address included in each network flow event record of the received network flow event block event block objects is also matched to an IP address included in an authentication record included in each authentication event block object, for example, in an IpContext source window. The user ID, division ID, department ID, peer group ID, and device type included in the authentication record for the matching IP address is joined to the network flow event record.

The source and destination IP address included in each network flow event record of the received network flow event block event block objects is also matched to an IP address included in the threat feed data, for example, in a ThreatFeedContext source window. The threat category ID, risk value, and geographic location included in the threat feed data for the matching IP address is joined to the network flow event record. As a result, each network flow event record is supplemented with three additional types of information: 1) user information from the authentication event block objects, 2) network context information from the network context data, and 3) threat feed information from the threat feed data.

In an operation 818, the processed event block objects are sent to an adapter of ESP output adapter application 512. For example, context data related to correlated network flow record event data may be output as IP context data to a first adapter. Context data related to correlated web proxy event data and/or authentication event data may be output as user context data to a second adapter.

In an operation 820, the sent event block objects are received by the appropriate adapter of ESP output adapter application 512.

In an operation 822, data is summarized over a predefined time period in each adapter to create record summary data 532. For example, the time period may be defined in configuration data 528. For illustration, a time period of two minutes may be used. During that time period, sums may be computed from the received event block objects for matching parameters. For example, a total number of bytes and a total number of packets communicated between a specific source IP address and a specific destination IP address may be computed during the predefined time period to reduce the amount of data that is output. User context data associated with a user may be summarized for each specific user. IP context data associated with each specific source IP address may be summarized for each specific source IP address.

In an operation 824, a determination is made concerning whether or not it is time to output the summarized data to record summary data 532. If it is time to output the summarized data, processing continues in an operation 826. If it is not time to output the summarized data, processing continues in an operation 828.

In operation 826, the data summarized during the last predefined time period is output as record summary data 532. For illustration, the SAS® Event Stream Processing Engine provides adapters and connectors that can be used to stream data into or out of ESPE 700. As an example, where the Hadoop distributed file system (HDFS) is used to store record summary data 532 that is the data processed through ESPE 700, an HDFS adapter may be defined to receive the processed event block objects and to write summarized data in comma separated value format to an HDFS file. A timestamp may be appended to the filename of each written file included in record summary data 532. In this example, ESP output adapter application 512 performs operations 820, 822, 824, and 826 and is implemented using the SAS® Event Stream Processing Engine HDFS adapter. As a result, record summary data 532 may be stored in a multi-node Hadoop® cluster. In alternative embodiments, other output methods and data structure types may be used to output record summary data 532 periodically.

Record summary data 532 may include a separate HDFS file for each predefined time period and each type of record. For example, if the predefined time period is two minutes, a new HDFS record summary data file is created that may be appended with a timestamp or a counter to distinguish it from the previous HDFS file. A new HDFS record summary data file further may be created separately for web proxy event data, network flow record event data, authentication event data, and syslog event data. For example, the first adapter may output correlated network flow record event data to a first HDFS file, the second adapter may output correlated web proxy data to a second HDFS file, and the second adapter may output authentication data to a third HDFS file for each predefined time period. The different types of summarized data (netflow, authentication, web proxy) may be written to different directories or appended with different names.

In operation 828, a determination is made concerning whether or not processing is stopped. If processing is not stopped, processing continues in operation 814 to continue receiving the one or more event streams containing event block objects from ingest application 506. If processing is stopped, processing continues in an operation 820.

In operation 820, the started projects are stopped. In operation 822, ESPE 700 is shutdown.

Ingest application 506 defines how incoming events 502 are transformed into event streams output to ESPE 700. Ingest application 506 acts as a buffering mechanism between incoming packets (events 502) received from network activity data capture devices 104 and ESPE 700. Ingest application 506 may be implemented as an extensible data integration application that reads native data formats, parses formats into standardized data models, and publishes data to ESPE 700. Referring to FIGS. 9A-9G, example operations associated with ingest application 506 are described. Additional, fewer, or different operations may be performed depending on the embodiment. The order of presentation of the operations of FIGS. 9A-9G is not intended to be limiting. Although some of the operational flows are presented in sequence, the various operations may be performed in various repetitions, concurrently, and/or in other orders than those that are illustrated. For example, various operations may be performed in parallel, for example, using a plurality of threads.

Similar to operation 800, in an operation 900, configuration data 528 is read and may be stored in a local cache. When ingest application 506 and ESP manager application 508 are executing on the first group of computing devices 600, both ingest application 506 and ESP manager application 508 may read configuration data 528 from the same location, which may or may not be from the first group of computing devices 600.

In an operation 901, ESPE 700 is queried, for example, to discover projects 702, continuous queries 704, windows 706,608, window schema, and window edges currently running in ESPE 700. The engine name and host/port to ESPE 700 may be provided as an input to the query and a list of strings may be returned with the names to the projects 702, to the continuous queries 704, to the windows 706,608, to the window schema, and/or to the window edges of currently running projects on ESPE 700. The host is associated with a hostname or IP address of the computing device executing ESPE 700. The port is the port number provided when the pub/sub capability is initialized by ESPE 700. The engine name is the name of ESPE 700. The engine name of ESPE 700 and host/port may be read from a storage location on computer-readable medium 408, may be provided on a command line, or otherwise input to or defined by ingest application 506 as understood by a person of skill in the art. For example, the information may be read from configuration data 528.

In an operation 902, publishing services are initialized to each source window 706.

In an operation 903, the initialized publishing services are started, which may create a publishing client for ingest application 506. The publishing client performs the various pub/sub activities for ingest application 506. For example, a string representation of a URL to ESPE 700 is passed to a "Start" function. For example, the URL may include the host:port designation of ESPE 700 executing at ESP device 104, a project of the projects 702, a continuous query of the continuous queries 704, and a window of the source windows 706. The "Start" function may validate and retain the connection parameters for a specific publishing client connection and return a pointer to the publishing client. For illustration, the URL may be formatted as "dfESP://<host>:<port>/<project name>/<continuous query name>/<window name>". If ingest application 506 is publishing to more than one source window of ESPE 700, the initialized publishing services may be started to each source window using the associated names (project name, continuous query name, window name).

In an operation 904, a connection is made between ingest application 506 and ESPE 700 for each source window to which data is to be published. To make the connection, the pointer to the created publishing client may be passed to a "Connect" function. If ingest application 506 is publishing to more than one source window of ESPE 700, a connection may be made to each started window using the pointer returned for the respective "Start" function call.

Ingest application 506 may be configured in various manners dependent on the types of network activity data capture device(s) 104. For example, ingest application 506 may be configured to receive netflow records, syslog UDP records, syslog TCP records, syslog records from a file, organizational data read from a file, organizational data received from an AD server, etc. For example, as described previously, netflow events are captured by network activity data capture device(s) 104 that include routers and/or switches and are forwarded to a hostname and port number associated with receipt of netflow records by ingest application 506.

As another example, authentication events are captured by network activity data capture device(s) 104 that include routers, switches, AD servers, and/or LDAP servers and are forwarded to a hostname and port number associated with receipt of authentication records by ingest application 506. The authentication events may be received by a port using UDP in a syslog message.

As still another example, the entity may support a real-time connection to an AD and/or LDAP server to provide organizational information related to users and/or devices of the plurality of monitored devices 102. In some cases, a real-time connection to an AD and/or LDAP server may not be supported. In these cases, the organizational information may be read from a file.

As yet another example, web proxy events are captured by network activity data capture device(s) 104 that include routers, switches, and/or proxy servers and are forwarded to a hostname and port number associated with receipt of web proxy records by ingest application 506. The web proxy events may be received in a syslog message through a port using UDP or TCP. For illustration, various vendors such as Zscaler, Inc. headquartered in San Jose, Calif., USA and Blue Coat Systems, Inc. headquartered in Sunnyvale, Calif., USA provide software that can be installed on servers to capture web and firewall logs from users of the internal network and to send them to other devices such as the first group of computing devices 600 executing ingest application 506. The entity may support a real-time connection to a web proxy server to provide web proxy events related to users of the plurality of monitored devices 102. In some cases, a real-time connection to a web proxy server may not be supported. In these cases, the web proxy events may be written to a log file by the web proxy server and may be read from the log file by ingest application 506.

In an operation 905, a determination is made concerning whether or not organizational data is read from a file. If organizational data is read from a file, processing continues in an operation 906. If organizational data is not read from a file, processing continues in an operation 908.

In operation 906, the organizational data is read from one or more files. For illustration, the server file described previously with reference to ESPE 700 that includes the IP address, the hostname, the user ID, the division ID, the department ID, the peer group ID, the device type, etc. for each computing device of the plurality of monitored devices 102 that has a static IP address may be read. Additionally, a user organization mapping file may be read that includes each user ID for the entity. The user organization mapping file may include a division ID and/or department ID associated with each user ID. A peer group mapping file further may be read that includes each division ID and/or department ID associated with a peer group defined for the entity.

In an operation 907, the read organizational data is stored in a cache or local memory. For example, the data read from the server file may be stored in a first in-memory table; the data read from the user organization mapping file may be stored in a second in-memory table; and the data read from the peer group mapping file may be stored in a third in-memory table. In an alternative embodiment, the read organizational data may be read and stored in cache or local memory in operation 900.

In operation 908, a determination is made concerning whether or not web proxy events are read from a file. If web proxy events are read from a file, processing continues in an operation 909. If web proxy events are not read from a file, processing continues in an operation 910.

In operation 909, web proxy data are read from one or more log files, and processing continues in an operation 917. For illustration, new web proxy data is read from one or more log files identified from configuration data 528. The one or more log files may be created and updated by network activity data capture device(s) 104 based on web proxy event packets received by network activity data capture device(s) 104.

Figure 9A:
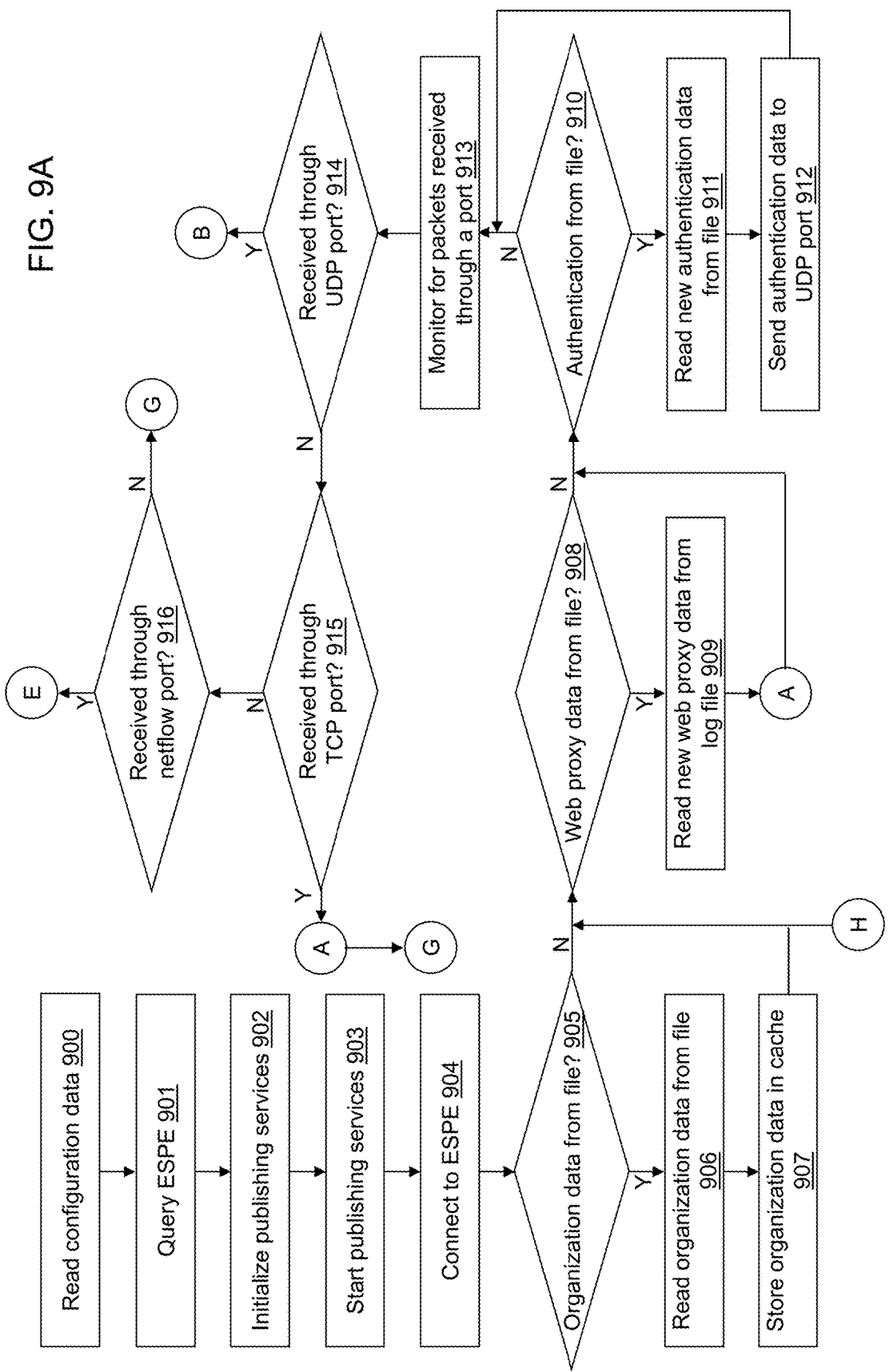
Figure 9B:
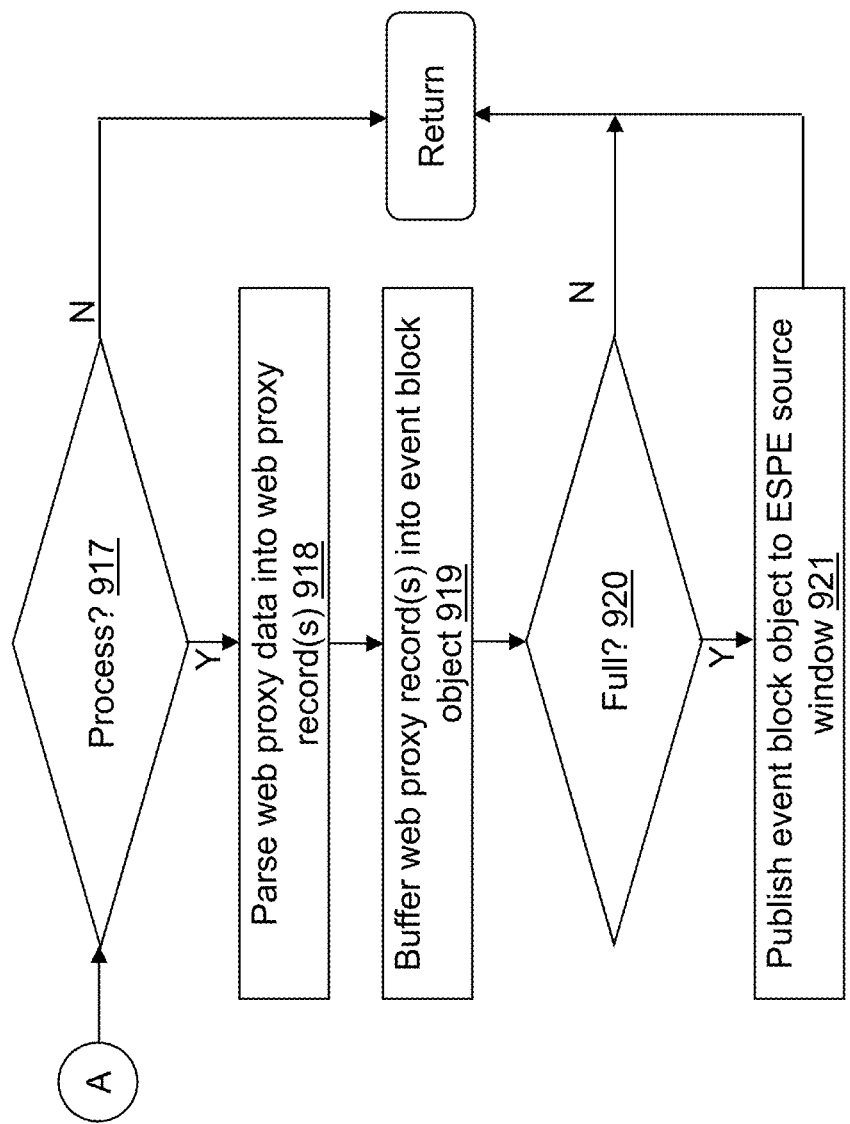
Figure 9C:
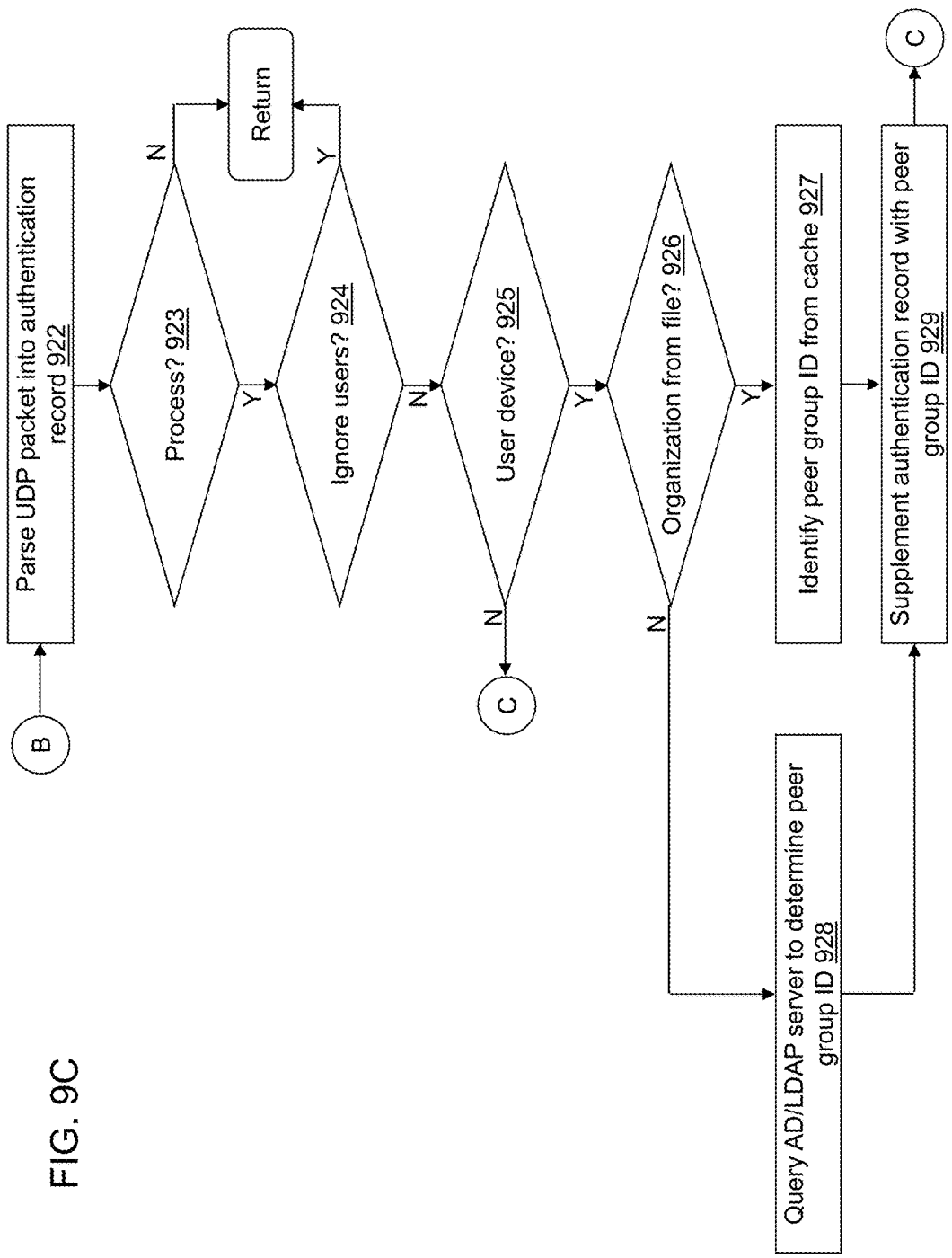

Referring to FIG. 9B, in operation 917, a determination is made concerning whether or not the new web proxy data is to be processed. If the new web proxy data is to be processed, processing continues in an operation 918. If the new web proxy data is not to be processed, processing continues in operation 910.

In operation 918, the new web proxy data is parsed into one or more web proxy records. In an operation 919, the parsed one or more web proxy records are buffered into an event block object.

For illustration, where the network activity data capture device(s) 104 update the one or more log files using fields based on the standard log format from ZScaler, regular expression (REGEX) parsing patterns may be used to determine which web proxy data to parse and how to buffer the parsed web proxy data into the event block object. As understood by a person of skill in the art, a REGEX pattern is a sequence of characters used to define a search pattern that can be matched to text read from the one or more log files. When the read web proxy data matches a REGEX pattern, the associated parsing and buffering into fields is performed. For illustration, the following may be included in and read from configuration data 528 to define possible parsing rules for ZScaler log records:

```
"parser": {
    "class": "com. sas.cyber.ingest.syslog.proxy.ZscalerwebProxySyslogParser",
    "filters": " "^\ \ d\ \ d. +vendor=Z~c<\ler",
    "inputDateformat": "YYYY-M-dd HH:mm: ss",
    "impliedYear": false,
    "compressedWhitespace" : false,
     "timeZone": "UTC",
    "mappings": {
        "timestamp":  "^[0-9]{4}-\ \d\ \d-\ \d\ \d\ \s \ \d\ \d : \ \d\ \d: \ \d\ \d",
        "action": "_MatchGroup('(\\saction=)([\\w\\p{javaWhitespace}]+(?=\\t)) ',2)",
        "reason": "_MatchGroup('(\\sreason=)([\\w\\p{javaWhitespace}]+(?=\\t)) ',2)",
        "hostname": "_MatchGroup('(\\shostname=)(\\S+) ',2) ",
        "dstIpAddress": "_MatchGroup('(\\sserverip=)([0-9]+. [0-9]+. [0-9]+. [0-9]+) ',2)",
        "username" : "_MatchGroup('(\\suser=)(\\S+@\\S+) ',2)",
        "requestSize": "_MatchGroup('(\\srequestsize =)([0-9]+) ',2)",
        "responseSize": "_MatchGroup('(\\sresponsesize =)([0-9]+) ',2)",
        "protocol": "_MatchGroup('(\\sprotocol=)([a-zA-Z]+) ', 2)",
        "url": "_MatchGroup('(\\s+url=)(\\S+) ', 2) ",
        "urlCategory": "_MatchGroup('(\\surlcategory)([\\w\\p{javaWhitespace}]+(?=\\t))
            ', 2)",
        "urlClass": "_MatchGroup('(\\surlclass =)([\\w\\p{javaWhitespace}]+(?=\\t)) ', 2)",
        "requestMethod":"_MatchGroup('(\\srequestmethod =)([a-zA-Z]+) ', 2)",
        "pageRisk" : "_MatchGroup('(\\spagerisk =)([0-9]+) ',2)",
        "status": "_MatchGroup('(\\sstatus =)([\\w-\\p{javaWhitespace}]+(?=\\t)) ', 2)",
        "threatCategory" : "_MatchGroup('(\\sthreatcategory
            )([\\w\\p{javaWhitespace}]+(?=\\t))', 2)",
        "threatName": "_MatchGroup('(\\sthreatname
            =)([\\w\\p{javaWhitespace}]+(?=\\t)) ', 2)",
        "appClass": "_MatchGroup('(\\sappclass =)([\\w\\p{javaWhitespace}]+(?=\\t)) ',
            2)",
        "appName": "_MatchGroup('(\\sappname =)([\\w\\p{javaWhitespace}]+(?=\\t)) ',
            2)",
    }
}
```

The class property defines the behavioral implementation of the parser. The "filters" property is a list of pipe-delimited regular expressions that detect the presence of a specific record format (e.g. ZScaler) in the composite flow of syslog that could contain heterogeneous formats of data such as authentication, end point, IDS, IPS, and firewall logs. If the filter matches, the parser defined by the "class" property is instantiated in memory and cached for parsing each subsequent record. The "inputDateFormat" property is a date/time conversion format used to interpret the value of the "timestamp" property mapping. The "impliedYear" property enables/disables the ability to impute the current year of the timestamp value when a year is not provided as part of the log record. The "compressedWhitespace" property enables/disables the ability to compress multiple sequential whitespaces into a single whitespace for the value parsed in the timestamp field. The "timeZone" property specifies the time standard used. The "mappings" section contains a listing of the logical internal web proxy data model fields and their respective regular expressions to parse each native field into a logical data model. The "_MatchGroup" parameter is a convenience function to match a sequence of regular expression groups and to select the value of the regular expression group to assign as the value of the associated field.

In an operation 920, a determination is made concerning whether or not the event block object is full. If the event block object is full, processing continues in an operation 921. If the event block object is not full, processing continues in operation 910.

In operation 921, the event block object is published to the source window of ESPE 700 defined to receive web proxy event block objects. The event block object is published to ESPE 700 using the pointer returned for the respective "Start" function call to the appropriate source window. Ingest application 506 passes the event block object to the created publishing client that injects the event block object into the appropriate source window, continuous query, and project of ESPE 700.

Referring again to FIG. 9A, in operation 910, a determination is made concerning whether or not authentication data is read from a file. If authentication data is read from a file, processing continues in an operation 911. If authentication data is not read from a file, processing continues in an operation 913.

In operation 911, authentication data is read from one or more authentication log files. In an operation 912, the read authentication data is sent to a UDP port identified in and read from configuration data 528, and processing continues in operation 913. For illustration, in some deployment scenarios of cybersecurity system 110, an entity may not be able to deliver some syslog data, such as authentication events, over a real-time network feed. In this situation, the entity may define an FTP/SCP integration in which files are copied to a determined directory for processing. The one or more authentication log files may be created and updated by network activity data capture device(s) 104 based on authentication event packets received by network activity data capture device(s) 104. Ingest application 506 may handle this scenario by reading the one or more authentication log files from an incoming directory and publishing the read authentication data as syslog UDP packets. The following is an illustrative list of properties that may be defined in configuration data 528 for this configuration:

```
"FileToSyslog": {
    "wake_frequency": 250,
    "pipes": {
        "input": 1,
        "output": 10
    },
    "input": {
        "file": {
            "sampling": true,
            "sampleRate": 100000,
            "fileRegex": "\\S+\\.log",
            "eventRate": 10000,
            "incoming": "/home/cyber/data/file/ incoming",
            "processed" : "/home/cyber/data/file/processed",
            "errors" : "/home/cyber/data/file/errors"
        }
    },
    "output" : {
        "udp": {
            "connect" : {
                "//1": "A host of null uses wildcard hostname",
                "host" : "${Common .Servers.ESP.hostname}",
                "port": 2056,
                "sampling": true ,
                "sampleRate": 100000
            }
        }
    },
    "monitor" : {
        "log" : {
            "frequency": 10000
        }
    }
}
```

The "pipes" "input" value defines a number of threads assigned to read the one or more authentication log files in operation 911 with a wake frequency defined by the "wake-frequency" value. The "pipes" "output" value defines a number of threads assigned to send the read authentication data as syslog events to the UDP port. The "input" "file" "sampling" value defines a Boolean flag that enables or disables the sampling of syslog events written to the one or more authentication log files. The "input" "file" "sampleRate" value defines a number of records to skip until a next sample record is selected for processing. The "input" "file" "fileRegex" value defines a regular expression used to select which files in the incoming directory should be processed as the one or more authentication log files. The "input" "file" "eventRate" value defines a number of events/second to publish to the UDP port. The "input" "file" "incoming" value defines a fully qualified path in which new authentication log files are located. The "input" "file" "processed" value defines a fully qualified path to which the authentication log files are moved after they are successfully processed. The "input" "file" "errors" value defines a fully qualified path to which files are moved when a processing error occurred. The "output" "udp" "connect "host" value defines the hostname or IP address to which the read authentication data is sent. The "output" "udp" "connect "port" value defines the port number to which the read authentication data is sent.

In operation 913, one or more ports are monitored to determine if a packet is received by the one or more ports. The one or more ports may be identified in and read from configuration data 528. For example, the "output" "udp" "connect "port" value defines the port monitored for authentication data.

In operation 914, a determination is made concerning whether or not a packet is received through a UDP port. If a packet is received through a UDP port, processing continues in an operation 922. If a packet is not received through a UDP port, processing continues in an operation 915. For example, the packet may be received through the UDP port directly from network activity data capture device(s) 104 or in response to execution of operation 912.

Referring again to FIG. 9C, in operation 922, the received UDP packet is parsed into an authentication record. The following is an illustrative list of properties that may be defined in configuration data 528 for parsing the received UDP packet:

```
"Authentication": {
  "debug": false,
  "parser" : {
    "class": "com.sas.cyber.ingest.syslog.authentication.
        MicrosoftAuthenticationSyslogParser",
    "filters" : "Microsoft-Windows - Security-Auditing\ \[\ d+\ \ ):
        An account was successfully logged on|Microsoft-Windows-S
    "mappings": {
      "priority" : ""^<[0-9]{1,4}>",
      "timestamp" : "^ [A- Z][a-z]{2}\\s[\\s\\d]\\d\\s\\d\\d:\\d\\d :\\d \\d",
      "hostname": "_ MatchGroup( ' ^ (\\S+)(\\s+)',1)",
      "appName" : "^\ \S+\ \]",
      "srcIpAddress": "_ MatchGroup('(Source Network Address:)
          (\\s+) ([a- zA- Z0-9.]+)(\\s+)',3)",
      "user name" : "_MatchGroup('(Account Name :)(\\s+)
          ( [a-zA-Z0-9-){2COMMA})(\\s+)', 3) ",
      "domain" : "_ MatchGroup( '(Account Domain: )(\\ s+)
          ([ a-zA-Z0-9]{2COMMA})(\\ s+) ',3) ",
      "failedReason" : "_ MatchGroup( '(Failure Reason: )
          (\\ s+) ( [a-zA-Z0-9\\ s.]+) (\\s+Status) ', 3)"
    }
  }
}
```

The "parser" "class" value defines a run-time implementation used for the parser. The "parser" "filters" value defines a comma-separated list of regular expressions that when matched, trigger the authentication parser and publishers. The "parser" "mappings" "priority" value defines a regular expression or parsing function used to parse the PRI part of the syslog message from the received UDP packet. The "parser" "mappings" "timestamp" value defines a regular expression or parsing function used to parse the timestamp part of the syslog message from the received UDP packet. The "parser" "mappings" "hostname" value defines a regular expression or parsing function used to parse the hostname from the received UDP packet. The "parser" "mappings" "appName" value defines a regular expression or parsing function used to parse the application name from the received UDP packet. The "parser" "mappings" "srcIpAddress" value defines a regular expression or parsing function used to parse the source IP address from the received UDP packet. The "parser" "mappings" "username" value defines a regular expression or parsing function used to parse the username or user ID from the received UDP packet. The "parser" "mappings" "domain" value defines a regular expression or parsing function used to parse the domain from the received UDP packet. The "parser" "mappings" "failedReason" value defines a regular expression or parsing function used to parse a failed reason associated with a logon failure from the received UDP packet.

In an operation 923, a determination is made concerning whether or not the parsed authentication record is to be processed. If the parsed authentication record is to be processed, processing continues in an operation 924. If the parsed authentication record is not to be processed, processing continues in operation 915. For illustration, the "parser" "filters" value is compared to the parsed UDP packet. When a regular expression match occurs, processing continues in operation 924.

In operation 924, a determination is made concerning whether or not the username or user ID parsed from the UDP packet is to be ignored. If the username or user ID is to be ignored, processing continues in operation 915. If the username or user ID is not to be ignored, processing continues in an operation 925. For example, a list of username or user ID may be included in configuration data 528 that may not be processed further. The authentication record is not processed further. Illustrative user IDs may include "ldapid", "admin", "ANONYMOUS", etc.

In operation 925, a determination is made concerning whether or not the source IP address parsed from the UDP packet is associated with a user or a non-user device. If the source IP address is associated with a user device, processing continues in an operation 926. If the source IP address is not associated with a user device, processing continues in an operation 930. For illustration, the source IP address may be compared to IP addresses stored in the first in-memory table read from the server file. If a match is found, the device is associated with a non-user device, and is not a user device.

Similar to operation 905, in operation 926, a determination is made concerning whether or not organizational data is read from a file. If organizational data is read from a file, processing continues in an operation 927. If organizational data is not read from a file, processing continues in an operation 928. Depending on the entity, it may not be technically feasible or scalable to perform real-time queries against an AD and LDAP service to correlate division, department, and peer group information for a given authenticated user.

In operation 927, a peer group ID is identified for the username or user ID parsed from the UDP packet. For illustration, the division and/or department ID for the username or user ID parsed from the UDP packet may be read from the user organization mapping file stored in the second in-memory table. The peer group ID may be read from the peer group mapping file stored in the third in-memory table using the read division and/or department ID for the username or user ID.

In operation 928, a query with the username or user ID parsed from the UDP packet is sent to an AD or LDAP server identified in configuration data 528 to acquire the associated division, department, and email information. The division and department information may be used to perform a real-time query to an in-memory lookup service to resolve the division and department to a corresponding peer group. For illustration, the peer group ID may be read from the peer group mapping file stored in the third in-memory table using the division and/or department ID returned in a response to the query for the username or user ID. As another option, the peer group ID may be read from a list that associates a division/department ID with a peer group ID that is read from configuration data 528.

In an operation 929, the authentication record is supplemented with the peer group ID determined from operation 927 or from operation 928, and processing continues in operation 930. The authentication record further may be supplemented with the acquired division, department, and email information and/or the correlated division and/or department ID. The authentication record further may be supplemented with a device type value set to indicate the device is a user device.

Figure 9D:
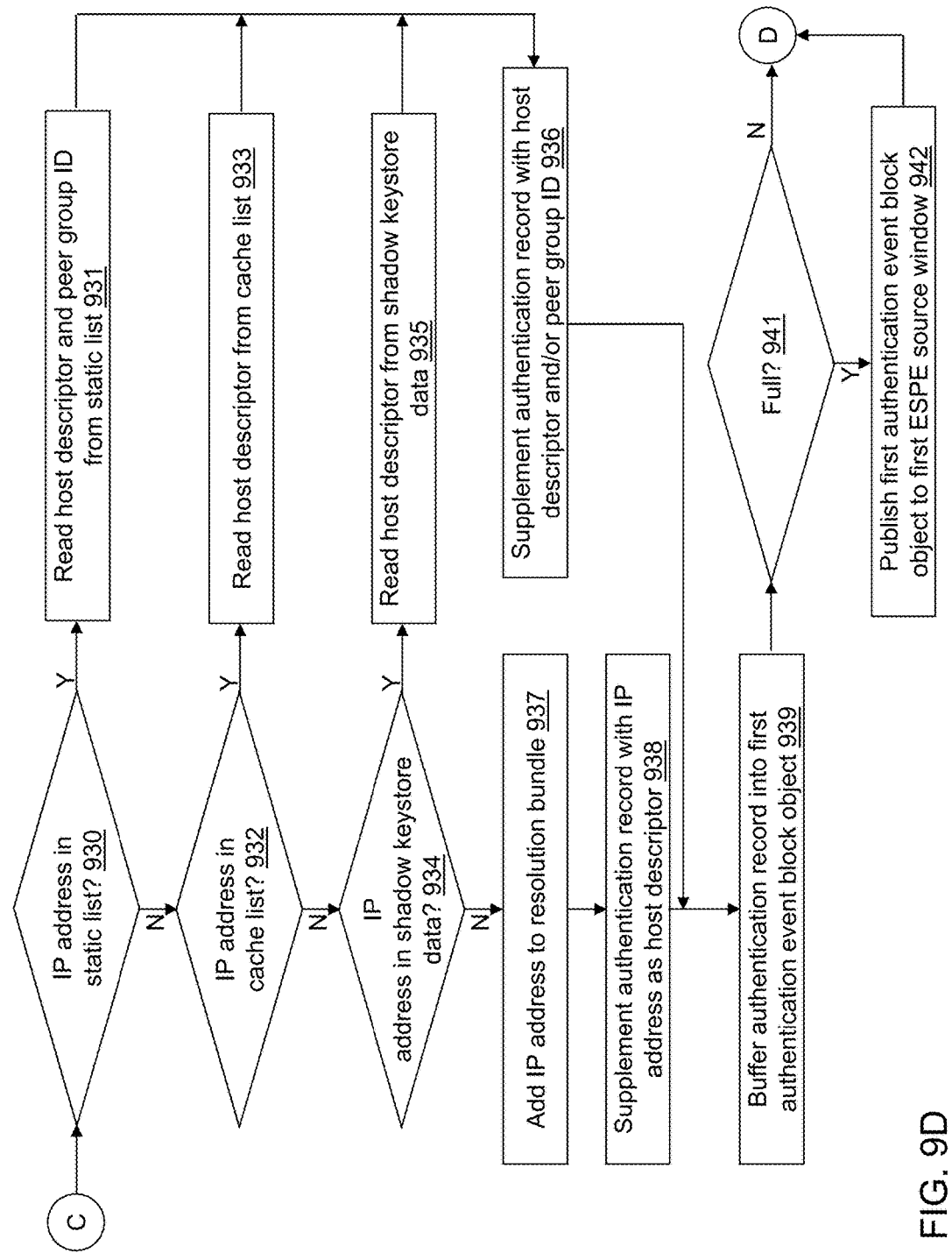

Referring to FIG. 9D, in operation 930, a determination is made concerning whether or not the source IP address parsed from the UDP packet is in a static list. If the source IP address is in the static list, processing continues in an operation 931. If the source IP address is not in the static list, processing continues in an operation 932. For illustration, the source IP address may be compared to IP addresses stored in the first in-memory table read from the server file to identify the hostname, the division ID, the department ID, the peer group ID, the device type, etc.

In operation 931, the host descriptor such as the hostname, the division ID, the department ID, the device type, and the peer group ID are read from the first in-memory table for the source IP address, and processing continues in operation 936. Use of the static list reduces a number of IP addresses sent for hostname resolution.

In operation 932, a determination is made concerning whether or not the source IP address parsed from the UDP packet is in a cache list. If the source IP address is in the cache list, processing continues in an operation 933. If the source IP address is not in the cache list, processing continues in an operation 934.

For illustration, the source IP address may be compared to IP addresses included in a cache list read from configuration data 528. A parameter "cache_ip_address": "10.*.*.*, 192.168.*.*,172.*.*.*" may be defined in configuration data 528, where 10.*.*.*, 192.168.*.*, 172.*.*.* is a comma-separated list of IP address ranges that are cached locally and not sent to hostname lookup application 510 for resolution. If the source IP address is included in the "cache_ip_address" property, the resolution is cached locally.

In operation 933, a host descriptor such as a hostname is read from the cache list for the source IP address, and processing continues in operation 936.

In operation 934, a determination is made concerning whether or not the source IP address parsed from the UDP packet is in shadow keystore data 524. If the source IP address is in shadow keystore data 524, processing continues in an operation 935. If the source IP address is not in shadow keystore data 524, processing continues in an operation 937.

For illustration, the source IP address may be compared to IP addresses included in shadow keystore data 524. Shadow keystore data 524 may initially be read from configuration data 528. Shadow keystore data 524 further may be synchronized with keystore data 526 maintained by hostname lookup application 510 as discussed further referring to FIG. 10. Shadow keystore data 524 may store lookup results from previous requests to avoid an unnecessary resolution request to hostname lookup application 510. Shadow keystore data 524 is a distributed in-memory lookup table that can be incrementally and concurrently updated.

In operation 935, a host descriptor such as a hostname is read from shadow keystore data 524 for the source IP address, and processing continues in operation 936.

Similar to operation 929, in operation 936, the authentication record is supplemented with the host descriptor and/or the peer group ID determined from operations 931, 933, or 935, and processing continues in operation 939.

In operation 937, the source IP address is added to a bundle of resolution requests to be sent to hostname lookup application 510. For example, the bundle of resolution requests may be implemented as a list of requests. A priority may be assigned to each request. For example, internal IP addresses may be assigned a higher priority because they can typically be resolved faster.

In an operation 938, the authentication record is supplemented with the source IP address as the host descriptor and/or the peer group ID as a placeholder, and processing continues in operation 939.

In operation 939, the parsed authentication record is buffered into a first authentication event block object.

In an operation 941, a determination is made concerning whether or not the first authentication event block object is full. If the first authentication event block object is full, processing continues in an operation 942. If the first authentication event block object is not full, processing continues in operation 943.

In operation 942, the first authentication event block object is published to the source window of ESPE 700 defined to receive the first authentication event block objects. For example, the first authentication event block object may be associated with processing authentication events. The event block object is published to ESPE 700 using the pointer returned for the respective "Start" function call to the appropriate source window for processing authentication events. Ingest application 506 passes the event block object to the created publishing client that injects the event block object into the appropriate source window, continuous query, and project of ESPE 700.

Figure 9E:
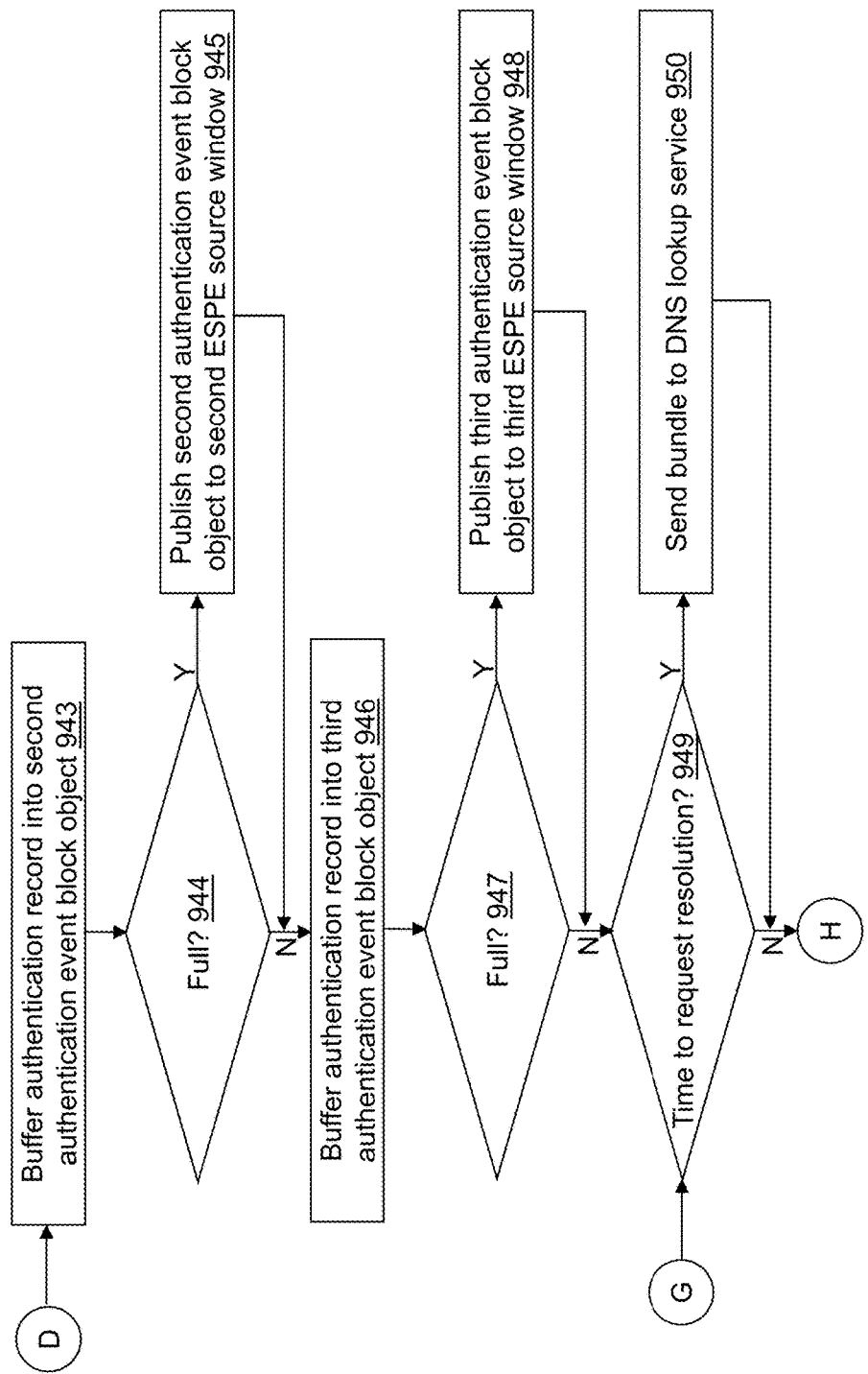

Referring to FIG. 9E, in operation 943, the parsed authentication record is buffered into a second authentication event block object.

In an operation 944, a determination is made concerning whether or not the second authentication event block object is full. If the second authentication event block object is full, processing continues in an operation 945. If the second authentication event block object is not full, processing continues in operation 946.

In operation 945, the second authentication event block object is published to the source window of ESPE 700 defined to receive the second authentication event block objects. For example, the second authentication event block object may be associated with processing netflow events. The event block object is published to ESPE 700 using the pointer returned for the respective "Start" function call to the appropriate source window for processing netflow events. Ingest application 506 passes the event block object to the created publishing client that injects the event block object into the appropriate source window, continuous query, and project of ESPE 700.

In operation 946, the parsed authentication record is buffered into a third authentication event block object.

In an operation 947, a determination is made concerning whether or not the third authentication event block object is full. If the third authentication event block object is full, processing continues in an operation 948. If the third authentication event block object is not full, processing continues in operation 949.

In operation 948, the third authentication event block object is published to the source window of ESPE 700 defined to receive the first authentication event block objects. For example, the third authentication event block object may be associated with processing web proxy events. As a result, a single successful authentication event may be published to three different input streams of ESPE 700. The event block object is published to ESPE 700 using the pointer returned for the respective "Start" function call to the appropriate source window for processing web proxy events. Ingest application 506 passes the event block object to the created publishing client that injects the event block object into the appropriate source window, continuous query, and project of ESPE 700.

The following is an illustrative list of properties that may be defined in configuration data 528 for publishing the parsed UDP packet to three different source windows of ESPE 700:

```
"publishers": {
    "AuthenticationPublisher ": {
        "class": "com. sas.cyber.ingest.syslog .authentication.
            AuthenticationPublisher",
        "'eventTypes": "Authentication",
        "url": "dfESP: //${Common.Servers.ESP.hostname}:
            ${Common.Servers.ESP.pubSubPort}/CyberIngest/
            _SyslogUdp_Query_01/Authentication",
        "blocksize": 10,
        "dateFormat'": "YYYY MMM dd HH:mm:ss" ,
        "impliedYear ": true
    },
    "AuthenticationToNetflow" : {
        "class": "com.sas.cyber.ingest.syslog .authentication.
            AuthenticationToNetflowIpContextPublisher",
        "eventTypes": "Authentication",
        "url : "dfESP: //${Common. Servers. ESP.hostname}:
            ${Common.Servers.ESP.pubSubPort}/Cyber ingest/
            NetflowIngest_Query_01/ IpContext",
        "blocksize" : 10
    },
    "AuthenticationToWebProxy": {
        "class" : "com.sas.cyber.ingest.sys log.authentication.
            AuthenticationToWebPr oxyUserContextPubl isher ",
        "eventTypes" : "Authentication",
        "url": "dfESP: //${Common.Servers.ESP.hostname}:
            ${Common.Servers.ESP.pubSubPort}/CyberIngest/
            WebProxyIngest_Query_01/UserContext",
        "blocksize": 10
    }
}
```

AuthenticationPublisher may be responsible for writing both successful and failed logon attempts that occur in authentication syslog events. The "AuthenticationPublisher" "class" value defines a run-time implementation used for the parser. The "AuthenticationPublisher" "eventTypes" value defines a comma-separated list of the event types that this publisher publishes to ESPE700. The "AuthenticationPublisher" "url" value defines a fully-qualified URL of the ESPE 700 source window to which this publisher publishes. The "AuthenticationPublisher" "blocksize" value defines a number of events to accumulate before publishing the entire block to ESPE 700. The "AuthenticationPublisher" "dateFormat" value defines a date pattern associated with the authentication syslog events. The "AuthenticationPublisher" "impliedYear" value defines a boolean value that enables the publisher to append the year to the authentication syslog event. For example, in the date format 10 February 12 08:33:67, the year is implied to be the current year. Setting the value to true for this field ensures that the implied year is added to the parsed date.

AuthenticationToNetflow may be responsible for writing successful logon attempts that occur in the authentication syslog events to an IPContext source window for correlation with netflow events. The "AuthenticationPublisher" "class" value defines a run-time implementation used for the parser. The "AuthenticationPublisher" "eventTypes" value defines a comma-separated list of the event types that this publisher publishes to ESPE700. The "AuthenticationPublisher" "url" value defines a fully-qualified URL of the ESPE 700 source window to which this publisher publishes. The "AuthenticationPublisher" "blocksize" value defines a number of events to accumulate before publishing the entire block to ESPE 700.

AuthenticationToWebProxy may be responsible for writing successful logon attempts that occur in the authentication syslog events to a UserContext source window for correlation with web proxy events. The "AuthenticationPublisher" "class" value defines a run-time implementation used for the parser. The "AuthenticationPublisher" "eventTypes" value defines a comma-separated list of the event types that this publisher publishes to ESPE700. The "AuthenticationPublisher" "url" value defines a fully-qualified URL of the ESPE 700 source window to which this publisher publishes. The "AuthenticationPublisher" "blocksize" value defines a number of events to accumulate before publishing the entire block to ESPE 700.

In operation 949, a determination is made concerning whether or not it is time to send a request to resolve the bundled resolution requests. If it is time, processing continues in an operation 950. If it is not time, processing continues in operation 908 to continue processing new received data. For example, resolution requests are bundled for a predefined time period such as ten seconds. The bundle may include tens of thousands of requests. As another option, a predefined number of resolution requests are bundled before sending the resolution requests to hostname lookup application 510.

In operation 950, the bundled requests are sent to hostname lookup application 510 that is performing a domain name system (DNS) lookup service, and processing continues in operation 908 to continue processing new received data. A priority number may be assigned to each resolution request. For example, internal IP addresses may be identified based on inclusion in a predefined range or predefined ranges of IP addresses such as the cache list used in operation 932. Internal IP addresses may be assigned a higher priority because they are anticipated to resolve faster because the resolution information is more likely cached on a local DNS proxy server; whereas, external IP addresses are assigned a relatively lower priority.

As understood by a person of skill in the art, the Internet maintains two principal namespaces, a hostname hierarchy and an IP address space. The DNS maintains the hostname hierarchy and provides translation services between it and the IP address. DNS is a hierarchical decentralized naming system for computers, services, or resources connected to the Internet or a private network. DNS associates information with hostnames assigned to each entity's domain providing a worldwide, distributed directory service. DNS translates more readily memorized hostnames to the numerical IP addresses needed for the purpose of locating and identifying computer services and devices with the underlying network protocols. DNS delegates the responsibility of assigning hostnames and mapping those names to Internet resources by designating authoritative name servers for each domain. Network administrators may delegate authority over sub-domains of their allocated name space to other name servers. The DNS protocol defines a detailed specification of the data structures and data communication exchanges used in DNS as part of the Internet protocol suite.

A DNS name server is a server that stores the DNS records for a domain. The DNS name server responds with answers to queries against its database relative to the mapping between a hostname and an IP address. A DNS proxy server may receive a DNS query from a network and forward it to an Internet domain name server. The DNS name server may also cache DNS records for a period of time after a response to reduce the load on an individual server and to reduce the time associated with resolving a domain name and IP address. As a result of the distributed, caching architecture, changes to DNS records do not propagate throughout the network immediately. Instead, caches expire and refresh after the time to live (TTL) associated with each record expires. A reverse lookup is a query of the DNS for domain names when the IP address is known.

Referring again to FIG. 9A, in operation 915, a determination is made concerning whether or not a packet is received through a TCP port. If a packet is received through a TCP port, processing continues in operation 917 to process a web proxy event received from network activity data capture device(s) 104 rather than read from file as in operation 908, and processing continues in operation 949. If a packet is not received through a TCP port, processing continues in an operation 916.

In operation 916, a determination is made concerning whether or not a packet is received through a netflow port. If a packet is received through a netflow port, processing continues in an operation 951. If a packet is not received through a netflow port, processing continues in operation 949. For example, a UDP port through which netflow events are received is defined in configuration data 528. In other embodiments, a TCP port may be used.

Referring to FIG. 9F, in operation 951, the received netflow packet is parsed into a netflow record. For example, the netflow packet fields are parsed based on a version of netflow used by the network activity data capture device(s) 104 that sent the netflow packet. For example, a header is read to identify a netflow version and a version-specific parser is instantiated in-memory. To process netflow packets, several multi-threaded processes running simultaneously may be used. The following is an illustrative list of thread allocations for high-level processes properties that may be defined in configuration data 528 for allocating processing of the received netflow packet:

```
"netflow": {
    "wake_ frequency": 250,
    "pipes" : {
        "input": 1,
        "parser " : 8,
        "analyzer" : 4,
        "converter": 8,
        "resolver ": 2,
        "output": 4
    }
}
```

The "pipes" "input" value defines a number of threads assigned to read UDP packets from the netflow port with a wake frequency defined by the "wake-frequency" value. The "pipes" "parser" value defines a number of threads assigned to parse the read UDP packets. The "pipes" "analyzer" value defines a number of threads assigned to perform calculations on the parsed UDP packets. The "pipes" "converter" value defines a number of threads assigned to convert the analyzed UDP packets into a netflow event block object. The "pipes" "resolver" value defines a number of threads assigned to send IP addresses to hostname lookup application 510 in operation 950 that is performing the DNS lookup service. The "pipes" "output" value defines a number of threads assigned to publish the netflow event block objects to ESPE 700.

The following is an illustrative list of parameters for defining the input processing in configuration data 528:

```
"input": {
    "host": "${Common.Servers.ESP.hostname }",
    "port": 2055,
    "byteBufferSize": 2048,
    "buffer size": 1073741824
}
```

The "input" "host" value defines a hostname or IP address that is being monitored for netflow packets. The "input" "port" value defines the port number of the computing device associated with the hostname or IP address through which the netflow packets are received. The "input" "byteBufferSize" value defines a size of a byte buffer used to hold a content of a single incoming UDP packet. The "input" "buffer size" value defines a buffer size of the UDP input reader. A large value may be used to minimize a number of dropped UDP packets under high throughput conditions.

In an operation 952, the parsed netflow packets are analyzed by performing calculations. For example, a number of bytes per packet is calculated and added to the parsed netflow packets as an additional field.

The following is an illustrative list of parameters for defining resolution processing in configuration data 528:

```
"resolver" : {
    "enabled": true,
    "serversFile" : "/home/cyber/server/Analysis.ESPManager/
    data/netflow/servers.csv",
    "cache_ip_address": "[list of one or more IP addresses]",
    "ignore_ip_address": "[list of one or more IP addresses]",
    "frequency": 10000
}
```

The "resolver" "enabled" value enables or disables operations 949 and 950. The "resolver" "serversFile" value defines a fully qualified path to the server file discussed previously that is used to avoid looking up IP addresses that have already been resolved and are statically assigned. The "resolver" "cache_ip_address" value defines a comma-separated list of IP address ranges that should be cached locally and not sent to the lookup service for resolution as discussed previously. The "resolver" "ignore_ip_address" value defines a comma-separated list of IP address ranges that should not be sent to the lookup service for resolution as discussed previously. The "resolver" "frequency" value defines a frequency in milliseconds used to determine the timing for the sending of request resolution bundles in operation 949.

In an operation 953, a determination is made concerning whether or not the source IP address parsed from the netflow packet is to be ignored. If the source IP address is to be ignored, processing continues in operation 949. If the source IP address is not to be ignored, processing continues in an operation 954. For example, the source IP address is compared to the "resolver" "ignore_ip_address" value. Illustrative IP addresses may be associated with multicast traffic.

Similar to operation 930, in an operation 954, a determination is made concerning whether or not the source IP address parsed from the netflow packet is in a static list. If the source IP address is in the static list, processing continues in an operation 955. If the source IP address is not in the static list, processing continues in an operation 957. For illustration, the source IP address may be compared to IP addresses stored in the first in-memory table read from the server file to identify the hostname, the division ID, the department ID, the peer group ID, the device type, etc.

Similar to operation 931, in operation 955, the host descriptor such as the hostname, the division ID, the department ID, the device type, etc. and the peer group ID are read from the first in-memory table for the source IP address, and processing continues in operation 956. Use of the static list reduces a number of IP addresses sent for hostname resolution.

Similar to operation 936, in operation 956, the netflow record is supplemented with the host descriptor and/or the peer group ID, and processing continues in operation 963.

Similar to operation 931, in operation 957, a determination is made concerning whether or not the source IP address parsed from the netflow packet is in a cache list. If the source IP address is in the cache list, processing continues in an operation 958. If the source IP address is not in the cache list, processing continues in an operation 959. For illustration, the source IP address may be compared to IP addresses included in the "resolver" "cache_ip_address" value.

Similar to operation 933, in operation 958, a host descriptor such as a hostname is read from the cache list for the source IP address, and processing continues in operation 956.

Similar to operation 934, in operation 959, a determination is made concerning whether or not the source IP address parsed from the UDP packet is in shadow keystore data 524. If the source IP address is in shadow keystore data 524, processing continues in an operation 960. If the source IP address is not in shadow keystore data 524, processing continues in an operation 961. Again, shadow keystore data 524 may store lookup results from previous requests to avoid an unnecessary resolution request to hostname lookup application 510.

Similar to operation 935, in operation 960, a host descriptor such as a hostname is read from shadow keystore data 524 for the source IP address, and processing continues in operation 956.

Similar to operation 937, in operation 961, the source IP address is added to a bundle of resolution requests to be sent to hostname lookup application 510.

In an operation 962, the netflow record is supplemented with the source IP address as the host descriptor and/or the peer group ID as a placeholder, and processing continues in operation 963.

Figure 9G:
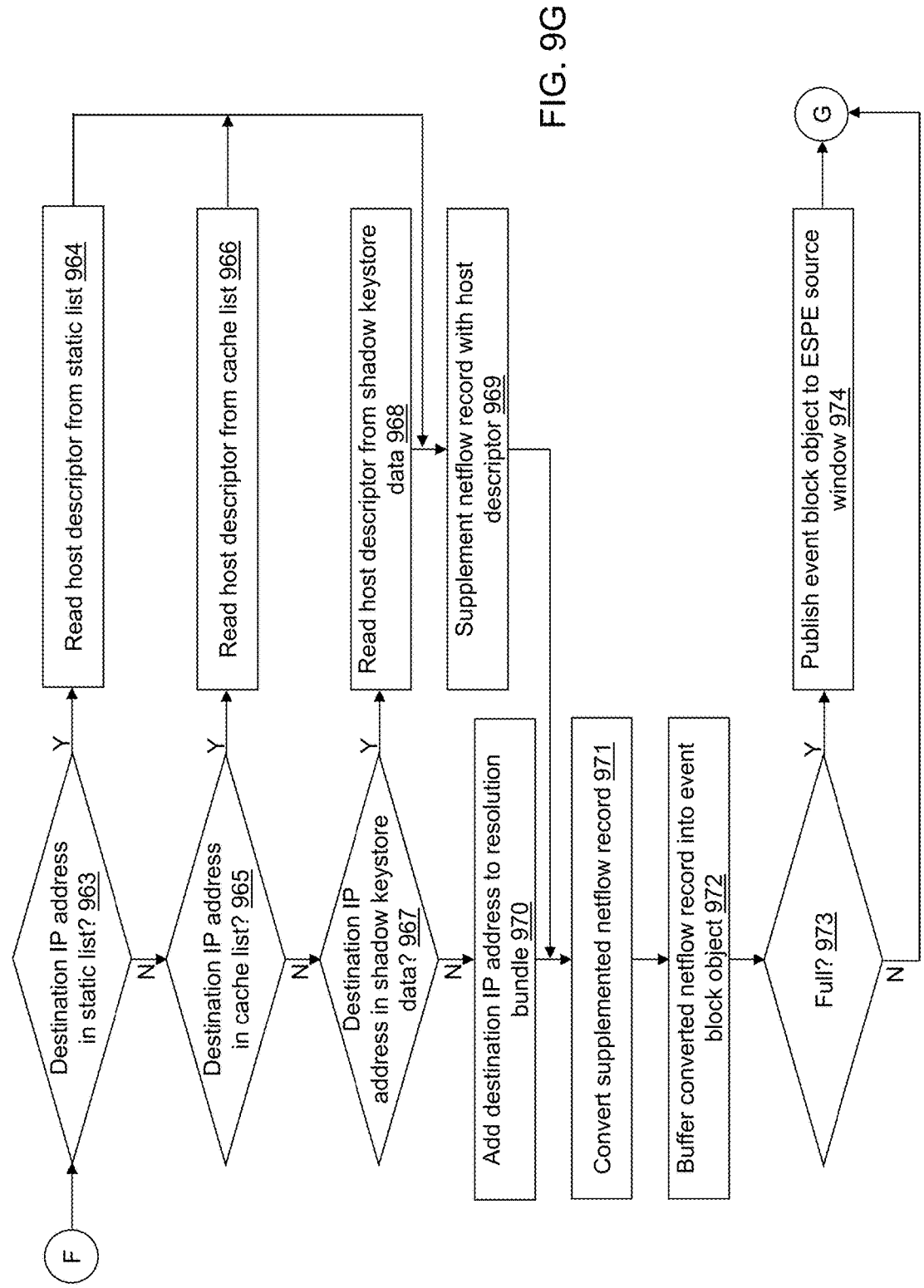

Referring to FIG. 9G, similar to operation 954, in operation 963, a determination is made concerning whether or not the destination IP address parsed from the netflow packet is in the static list. If the destination IP address is in the static list, processing continues in an operation 964. If the destination IP address is not in the static list, processing continues in an operation 965. For illustration, the destination IP address may be compared to IP addresses stored in the first in-memory table read from the server file to identify the hostname, the division ID, the department ID, the peer group ID, the device type, etc.

Similar to operation 955, in operation 964, the host descriptor such as the hostname, the division ID, the department ID, the device type, etc. and the peer group ID are read from the first in-memory table for the destination IP address, and processing continues in an operation 969.

Similar to operation 957, in operation 965, a determination is made concerning whether or not the destination IP address parsed from the netflow packet is in the cache list. If the destination IP address is in the cache list, processing continues in an operation 966. If the destination IP address is not in the cache list, processing continues in an operation 967.

Similar to operation 958, in operation 966, a host descriptor such as a hostname is read from the cache list for the destination IP address, and processing continues in operation 969.

Similar to operation 959, in operation 967, a determination is made concerning whether or not the destination IP address parsed from the UDP packet is in shadow keystore data 524. If the destination IP address is in shadow keystore data 524, processing continues in an operation 968. If the destination IP address is not in shadow keystore data 524, processing continues in an operation 970.

Similar to operation 960, in operation 968, a host descriptor such as a hostname is read from shadow keystore data 524 for the destination IP address, and processing continues in operation 969.

Similar to operation 956, in operation 969, the netflow record is supplemented with the host descriptor and/or the peer group ID of the destination IP address, and processing continues in operation 971.

Similar to operation 961, in operation 970, the destination IP address is added to a bundle of resolution requests to be sent to hostname lookup application 510.

In operation 971, the supplemented netflow record is converted. FOr example, internal Java strings and numbers may be converted to binary compatible objects.

In an operation 972, the converted netflow record is buffered into a netflow event block object. For example, binary compatible objects are queued into a publishing buffer.

In an operation 973, a determination is made concerning whether or not the netflow event block object is full. If the netflow event block object is full, processing continues in an operation 974. If the netflow event block object is not full, processing continues in operation 949.

In operation 974, the netflow event block object is published to the source window of ESPE 700 defined to receive the netflow event block objects. The event block object is published to ESPE 700 using the pointer returned for the respective "Start" function call to the appropriate source window for processing authentication events. Ingest application 506 passes the event block object to the created publishing client that injects the event block object into the appropriate source window, continuous query, and project of ESPE 700. The following is an illustrative list of parameters for defining the publication processing in configuration data 528:

```
"output": {
    "esp": {
        "url" : "dfESP: //${Common.Servers.ESP.hostname}:
            ${Common.Servers.ESP.pubSubPort}
            /CyberIngest/ NetflowIngest_Query_01/ Netflow"
    },
    "blocksize": 128
}
```

The "output" "esp" "url" value defines a fully-qualified URL of the ESPE 700 source window to which the netflow event block object is published. The "output" "blocksize" value defines a number of events to accumulate before publishing the entire block to ESPE 700.

Processing continues until cybersecurity system 110 or ESPE 700 is stopped. A timestamp may be added to each web proxy, authentication, or netflow record. For example, if timestamps are native to the event record, the internal timestamp is used. If there are no timestamps or the native timestamp includes an invalid value due to an incorrect configuration of the network device that generated the record, a wall clock time is included as the timestamp for the record. GMT conversion is applied to all date-time values to ensure normalization of time across all records.

Ingest application 506 may utilize multiple threads for each process so that the processing can be performed in parallel. Though shown as decision points, in some cases, a decision point may not be implemented. Instead, different applications may be associated with each type of data processing and selected by the user using configuration data 528. As a result, ingest application 506 may be formed as one or more applications selectable by the user that perform distinct operations.

Figure 10:
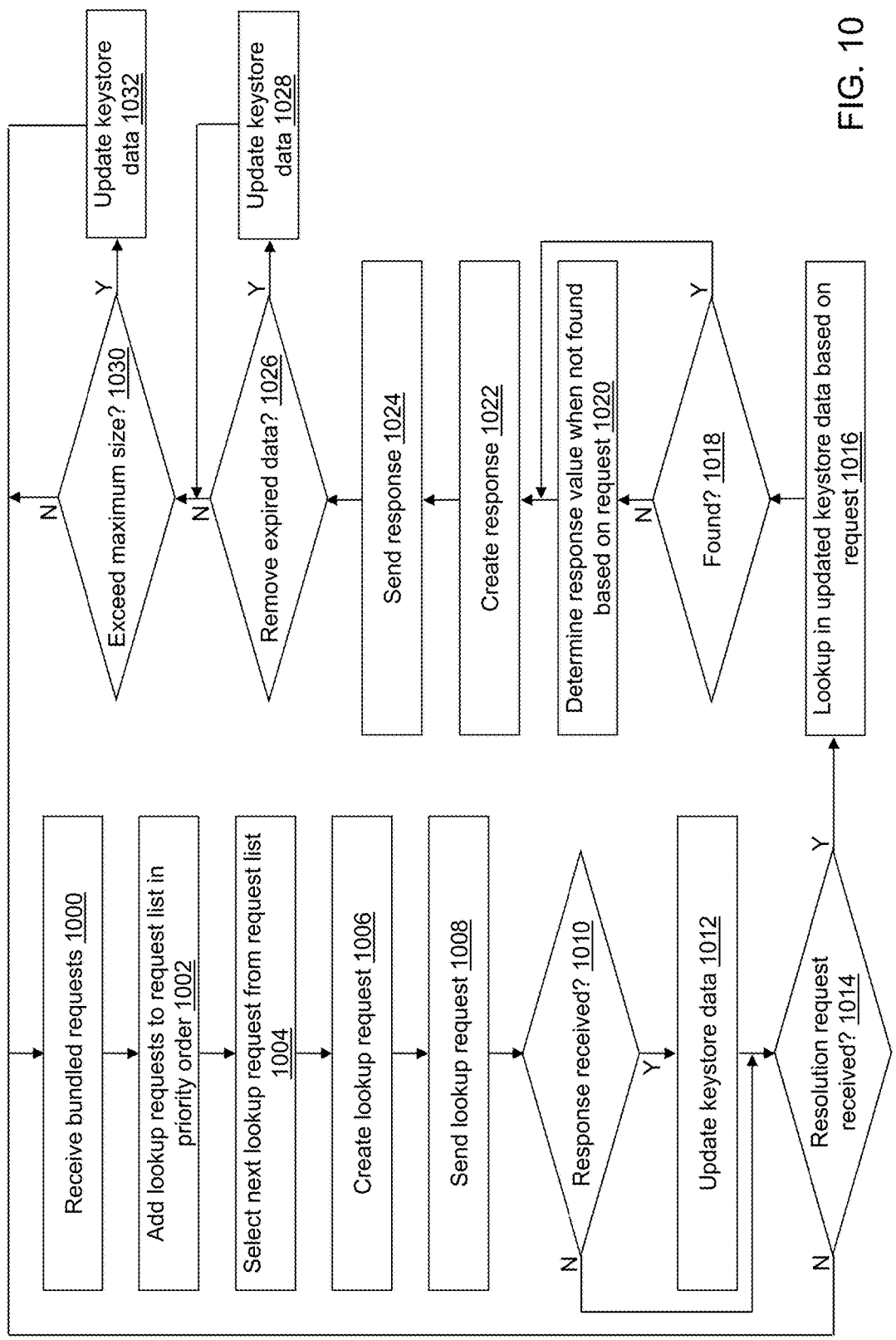
FIG. 10 depicts a flow diagram illustrating examples of operations performed by a hostname lookup application of the cybersecurity application of the cybersecurity system of FIG. 4 in accordance with an illustrative embodiment.

Referring to FIG. 10, example operations associated with hostname lookup application 510 are described. Additional, fewer, or different operations may be performed depending on the embodiment. The order of presentation of the operations of FIG. 10 is not intended to be limiting. Although some of the operational flows are presented in sequence, the various operations may be performed in various repetitions, concurrently, and/or in other orders than those that are illustrated. For example, various operations may be performed in parallel, for example, using a plurality of threads.

In an operation 1000, the bundled resolution requests sent from ingest application 506 are received.

In an operation 1002, the lookup requests in the received bundled requests are added to a request list in priority order based on the assigned priority value. For example, lookup requests with a higher assigned priority value are added to the request list above those requests having a lower assigned priority value. The new requests may be added to the request list below those requests having the same priority, but already on the request list such that the oldest, highest priority resolution requests are performed first.

In an operation 1004, a next lookup request is selected from a top of the request list.

In an operation 1006, a reverse DNS resolution request is created for the lookup request.

In an operation 1008, the created reverse DNS resolution request is sent. For example, the created reverse DNS resolution request is sent to a DNS resolver in the local operating system, which in turn handles the communications required to obtain a resolution.

In an operation 1010, a determination is made concerning whether or not a resolution response is received. For example, the DNS resolver to which the request was sent may maintain a cache. If its cache can provide the answer to the request, the DNS resolver returns the value in the cache to ingest application 506. If its cache does not contain the answer, the DNS resolver sends the request to one or more designated DNS name servers. Where systems administrators have configured systems to use their own DNS name servers, their DNS resolvers point to separately maintained name servers of the entity. In any event, the DNS name server, when queried, follows the process outlined above, until it either successfully finds a result or does not. The DNS name server returns its results to the DNS resolver. Assuming a result was found, the DNS resolver may cache the result for future use and return the result to hostname lookup application 510. If a resolution response is received, processing continues in an operation 1012. If a resolution response is not received, processing continues in an operation 1014.

In operation 1012, the hostname is stored with the IP address in keystore data 526. Shadow keystore data 524 accessed by ingest application 506 may be a shadow copy of keystore data 526 so that ingest application 506 does not request resolution for the same IP address again.

In operation 1014, a determination is made concerning whether or not a resolution request is received. For example, other components, such as analytic computation application 514 and/or data enrichment application 518, may request a hostname associated with an IP address. If a resolution request is received, processing continues in an operation 1016. If a resolution request is not received, processing continues in operation 1000 to continue processing bundled requests.

In operation 1016, a lookup from keystore data 526 is performed based on a provided parameter. For example, the provided parameter may be an IP address or a hostname. Keystore data 526 may be an in-memory table of key/value pairs such as an IP address that is a "key" and "hostname" that is a value. When a hostname is not known, the value may be a copy of the IP address.

In an operation 1010, a determination is made concerning whether or not the provided parameter was found in keystore data 526. If the provided parameter was found, processing continues in an operation 1022. If the provided parameter was not found, processing continues in an operation 1020.

In operation 1020, a response value to the request is determined based on the request when the provided parameter is not found.

In operation 1022, a response is created.

In an operation 1024, the created response is sent to the requester such as analytic computation application 514 or data enrichment application 518.

In an operation 1026, a determination is made concerning whether or not expired data should be removed from keystore data 526. If expired data should be removed, processing continues in an operation 1028. If expired data should not be removed, processing continues in an operation 1030. For example, expired data may be periodically identified and deleted.

In operation 1028, data in keystore data 526 that has expired is deleted from keystore data 526. For example, an expiration time value may be added to a storage time for each keystore item and compared to a current time. If the current time is greater than the computed value, the keystore item is expired. The expiration time value specifies a time after which data in keystore data 526 is considered stale. Shadow keystore data 524 may be similarly updated.

In operation 1030, a determination is made concerning whether or not keystore data 526 has exceeded a maximum size value. If keystore data 526 has exceeded a maximum size value, processing continues in an operation 1032. If keystore data 526 has not exceeded a maximum size value, processing continues in operation 1000.

In operation 1032, the oldest data in keystore data 526 is deleted from keystore data 526 until a size of keystore data 526 no longer exceeds the maximum size value. Shadow keystore data 524 may be similarly updated.

Hostname lookup application 510 may periodically write keystore data 526 to indexed queue data 542. At startup, keystore data 526 may be read into memory from indexed queue data 542. Shadow keystore data 524 may be similarly read into memory.

For illustration, hostname lookup application 510 maintains a basic HTTP endpoint and responds to a representational state transfer (REST) request from analytic computation application 514 and/or data enrichment application 518. By default if a lookup of a key or value does not exist, a null is returned. However, some types can be associated with a ValueProvider class that defines what to return for non-existing values instead of a null. For example, a DNSValueProvider might take an IP address key that does not exist and perform a reverse DNS Resolution on that key to return a hostname.

In the below definitions, the following fields have the following definitions and usages:

<Type> is the name of the in-memory table;
<LookupExpression> is a valid lookup expression, which can be any of the following:
   <key> - matches the specific key string given. If no specific key exists, the ValueProvider, if any, will be called;
   !<key> - matches the specific key string given;
   <key>* - matches any key that starts with the given key string;
   *<key> - matches any key that ends with the given key string;
   ~<regex> - matches any key that matches the regex expression given;
   =<value> - matches any value with the same value string given. If no specific value exists, the ReverseValueProvider, if any, will be called;
   =!<value> - matches any value with the same value string given. If no specific value exists, the ReverseValueProvider, if any, will be called;
   =<value>* - matches any value that starts with the given value string;
   =*<value> - matches any value that ends with the given value string; and
   =~<regex> - matches any value that matches the regular expression provided. Numeric and Boolean values are ignored when matching values with a regex expression.

Lookup Requests may have the form:
GET http://WEB01/lookupkType>—Returns all of the key/value pairs of the <Type> in keystore data 526. Return type is application/JSON (Javascript object notation) object of key/value pairs. In the event of a missing or empty table, an empty JSON object ({ }) is returned; or
GET http://WEB01/lookupkType>/<LookupExpression> [,<LookupExpression> . . . ]—Returns all matching key/value pairs in keystore data 526. Multiple <LookupExpression> can be used and may be mixed together. The return type is application/JSON. All key/value pairs in the in-memory table that match ANY of the <LookupExpression> are returned.

Referring to FIGS. 11A-11D, example operations associated with analytic computation application 514 are described. The SAS® LASR™ Analytic Server may be used as an analytic platform to enable multiple users to concurrently access data stored in record summary data 532. Additional, fewer, or different operations may be performed depending on the embodiment. The order of presentation of the operations of FIGS. 11A-11D is not intended to be limiting. Although some of the operational flows are presented in sequence, the various operations may be performed in various repetitions, concurrently, and/or in other orders than those that are illustrated. For example, various operations may be performed in parallel, for example, using a plurality of threads.

Similar to operation 900, in an operation 1100, configuration data 528 is read and may be stored in a local cache.

In an operation 1102, a first indicator of a data copying time period may be received. The data copying time period defines a periodic time period after which record summary data 532 is written to copy of record summary data 534. An indicator may indicate one or more user selections from a user interface, one or more data entries into a data field of the user interface, one or more data items read from second computer-readable medium 408 or otherwise defined with one or more default values, etc. that are received as an input by analytic computation application 514.

In an operation 1104, a second indicator of one or more data concatenation time periods may be received. Each data concatenation time period represents a concatenation of data read from record summary data 532. For illustration, the one or more data concatenation time periods indicated by the second indicator may be 10, 60, 240, and 1440 minutes. Similar to operation 832, for each time period, sums may be computed. For example, a total number of bytes received in packets communicated between a specific source IP address and a specific destination IP address is accumulated from record summary data 532 over a ten minute period and output to ten-minute concatenated summary data. The total number of bytes received in packets communicated between a specific source IP address and a specific destination IP address is accumulated from the ten-minute concatenated summary data over a 60 minute period and output to 60-minute concatenated summary data. The total number of bytes received in packets communicated between a specific source IP address and a specific destination IP address is accumulated from the 60-minute concatenated summary data over a 240 minute period and output to 240-minute concatenated summary data. The total number of bytes received in packets communicated between a specific source IP address and a specific destination IP address is accumulated from the 240-minute concatenated summary data over a 1440 minute period and output to 1440-minute concatenated summary data.

In an operation 1106, a third indicator of a data analysis time period may be received. The data analysis time period defines a periodic time period after which concatenated summary data 536 is analyzed to create report data 538.

In an operation 1108, a fourth indicator may be received that indicates one or more variables of record summary data 532 to use in computing a risk score. A weight value further may be entered for each variable. The fourth indicator may indicate that all or only a subset of the variables stored in record summary data 532 be used to compute the risk score. For example, the fourth indicator indicates a list of variables to use by name, column number, etc. In an alternative embodiment, the fourth indicator may not be received. For example, all of the variables may be used automatically. As another example, the variables may be included in a list with additional parameters. The following is an illustrative list of parameters for defining a variable in a list of variables in configuration data 528 that are used to compute the risk score:

```
"definedAnalytics" : {
  "DistinctInternalDstIpAnalytic" : {
    "title": "Distinct Internal Destination IP Analysis",
    "class": "com.sas.cyber.lasr.manager.
       analytics.DistinctInternalDstIpAnalytic,
    "goal": "Identify devices on the network that are
       performing internal host scanning",
    "description" : "For a given source IP address, calculate the number
       of unique internal destination IP addresses that the device
       interacts with for a given hour of the day. Compare this
       measure against the mean of the device's peer group for
       the same time window, ","weight" : 100,
    "filter": "srcIpOctl IN ($(Analysis.LASRManager.Analytics.
       DSHReporter_variables.INTERNAL_OCTET_FILTER}]
       AND dstIpOctl IN (${Analysis.LASRManager.
       Analytics.DSHReporter.variables. ... )"
  }
}
```

The "filter" value employs a SQL WHERE clause syntax, and refers to variables from a variables section of configuration data 528. The following is an illustrative variables section in configuration data 528:

```
"variables" : {
  "PORT_FTP'": "21",
  "PORT_SSH": "22",
  "PORT_TELNET":"23",
  "PORT_DNS": "53",
```

-continued

```
"PORT_AUTHENTICATION": "389,3289",
"POR_SQLSERVER": "1433",
"PORT_MYSQL": "3306'",
"PORT_ ORACLE": "1521",
"PROTOCOL_UDP": "17",
"PROTOCOL_ TCP": "6",
"PROTOCOL_ICMP": "1",
"INTERNAL_ OCTET_FILTER": "[list of one or more IP addresses]",
"INTERNAL_ THREATFEED_FILTER": "[list of one or more IP
   addresses]",
"COMMUNICATION_SERVERS": "[list of one or more IP
   addresses]",
"//WEB_PROXY_SERVERS": "For example, these are the IP
   Addresses for Zscaler Web Proxy Servers",
"WEB_PROXY SERVERS": "[list of one or more IP addresses]",
"NETWORK_SWITCH_IPS": "[list of one or more IP addresses]",
"INTERNAL_HOSTNAME_FI LTER": "'xxx', 'yyy' ,'zzz'",
"INTERNAL_IP _FILTER": "${Analysis.LASRManager.Analytics.
   DSHReporter.variables.NETWORK_SWITCH_IPS},
   $(Analysis.LASRManager.An alytics.DSH Reporter.
   variables.COMMUNICATION_SERVERS}'",
"BASE_PORTS_FILTER": "113,427,445,2869,9433"
"APP_PORTS_FILTER":"80,443,8080,8443"
}
```

The variables used to compute the risk score further may be listed in a parameter such as "enabled Analytics" in configuration data 528. The "enabledAnalytics" field may define a comma-separated list of analytics that are enabled to compute the risk score from the analytics defined using the "definedAnalytics" field illustrated above. Analytic computation application 514 may execute only the enabled analytics defined in the "enabledAnalytics" field of configuration data 528.

The variables identified in the "enabledAnalytics" field may be associated with different categories of monitored activity such as host scanning, bytes transferred, port scanning, application scanning, active directory, and other (e.g. ICMP). Host scanning variables may include DistinctInternalDstIpmeasure, which identifies devices of the plurality of monitored devices 102 that are performing internal host scanning; DistinctExternalDstIpmeasure, which identifies devices of the plurality of monitored devices 102 that are performing external host scanning outbound without going through a web proxy; and WebProxyDstIpmeasure, which identifies devices of the plurality of monitored devices 102 that are anomalously scanning for external devices via the Web Proxy server.

Bytes transferred variables may include InternalBytesSentmeasure, which identifies devices of the plurality of monitored devices 102 with excessive data transfer activity towards a single internal device, and ExternalBytesSentmeasure, which identifies devices of the plurality of monitored devices 102 with excessive data transfer activity towards a single external device.

Port scanning variables may include DistinctInternalDstPortsmeasure, which identifies devices of the plurality of monitored devices 102 with excessive port activity directed toward a single internal device; DistinctExternalDstPortsmeasure, which identifies devices of the plurality of monitored devices 102 with excessive port activity directed toward a single external device; and WebProxyDstPortsmeasure, which identifies devices of the plurality of monitored devices 102 that are anomalously scanning for external devices using a web proxy server.

Application scanning variables may include SshHostScanningmeasure, which identifies devices of the plurality of monitored devices 102 that are anomalously scanning for devices hosting an SSH server on a specified port such as port number 22; TelnetHostScanningmeasure, which identifies devices of the plurality of monitored devices 102 that are anomalously scanning for devices hosting a telnet server on a specified port such as port number 23; FtpHostScanningmeasure, which identifies devices of the plurality of monitored devices 102 that are anomalously scanning for devices hosting an ftp server on a specified port such as port number 21; SqlServerHostScanningmeasure, which identifies devices of the plurality of monitored devices 102 that are anomalously scanning for devices hosting a SQL server database on a specified port such as port number 1433; MySQLServerHostScanningmeasure, which identifies devices of the plurality of monitored devices 102 that are anomalously scanning for devices hosting a MySQL database on a specified port such as port number 3306; OracleServerHostScanningmeasure, which identifies devices of the plurality of monitored devices 102 that are anomalously scanning for devices hosting an Oracle database on a specified port such as port number 1521; and ApplicationServerHostScanningmeasure, which identifies devices of the plurality of monitored devices 102 that are anomalously scanning for devices hosting an HTTP or application server on specified ports such as port numbers 80, 443, 8080, 8443, etc.

Active directory variables may include DomainControllerEventsmeasure, which identifies devices of the plurality of monitored devices 102 that are anomalously showing excessive flow events to devices hosting authentication services such as AD or LDAP, and DomainControllerScanningmeasure, which identifies devices of the plurality of monitored devices 102 that are anomalously scanning for devices hosting authentication services such as AD or LDAP.

Other variables may include DnsUdpEventsmeasure, which identifies devices of the plurality of monitored devices 102 with excessive DNS activity spanning all destination traffic to a specified destination port such as port number 53; DistinctDstPeerGroupsmeasure, which identifies devices of the plurality of monitored devices 102 that are connecting to an excessive number of distinct peer groups; DistinctDstCountriesmeasure, which identifies devices of the plurality of monitored devices 102 that are connecting to IP addresses in an excessive number of distinct countries; IcmpScanningmeasure, which identifies devices of the plurality of monitored devices 102 that are anomalously scanning for devices using the ICMP protocol; and UdpProtocolmeasure, which identifies devices of the plurality of monitored devices 102 that are anomalously communicating using the UDP protocol.

In an operation 1110, a fifth indicator of a kernel function to apply may be received. For example, the fifth indicator indicates a name of a kernel function. The fifth indicator may be received after selection from a user interface window or after entry by a user into a user interface window. A default value for the kernel function may further be stored, for example, in second computer-readable medium 408. As an example, a kernel function may be selected from "Gaussian", "Exponential", etc. For example, a default kernel function may be the Gaussian kernel function. Of course, the kernel function may be labeled or selected in a variety of different manners by the user as understood by a person of skill in the art. In an alternative embodiment, the kernel function may not be selectable, and a single kernel function is implemented by analytic computation application 514. For example, the Gaussian kernel function may be used by default or without allowing a selection.

In an operation 1112, a sixth indicator of a kernel parameter value to use with the kernel function may be received. For example, a value for s, the Gaussian bandwidth parameter, may be received for the Gaussian kernel function. In an alternative embodiment, the sixth indicator may not be received. For example, a default value for the kernel parameter value may be stored, for example, in second computer-readable medium 408 and used automatically or the kernel parameter value may not be used. In another alternative embodiment, the value of the kernel parameter may not be selectable. Instead, a fixed, predefined value may be used.

In an operation 1114, a seventh indicator of a value of an alert threshold may be received. The alert threshold may be defined as a percent and may be used to identify when network activity at a source IP address is sufficiently anomalous to generate an alert message. In an alternative embodiment, the seventh indicator may not be received. For example, a default value may be stored, for example, in second computer-readable medium 408 and used automatically. In another alternative embodiment, the value of the alert threshold may not be selectable. Instead, a fixed, predefined value may be used. The alert threshold may be defined in configuration data 528.

In operation 1116, a determination is made concerning whether or not it is time to create copy of record summary data 534 from record summary data 532. If it is time, processing continues in an operation 1118. If it is not time, processing continues in an operation 1120.

In operation 1118, copy of record summary data 534 is created from record summary data 532 in a second directory of the HDFS. For example every minute, copy of record summary data 534 is created from record summary data 532 in the second directory so that later tasks do not use partially written data.

In operation 1120, a determination is made concerning whether or not it is time to created concatenated summary data 536 from copy of record summary data 534. If it is time, processing continues in an operation 1122. If it is not time, processing continues in an operation 1124.

In operation 1122, concatenated summary data 536 is computed from either copy of record summary data 534 or a plurality of shorter in time concatenated summary data files. For example, every two minutes, a data file is written to a respective /in/data-type directory by ESPE 700, where data-type may indicate one of web proxy data, netflow data, or authentication data. Analytic computation application 514 gathers and accumulates the two-minute files into HDFS directories based on the data type. As two minute files are received in the /in/data-type directory, they are moved into a corresponding /raw/data-type directory based on a user-definable schedule. To achieve a composite risk score across netflow data, authentication data, web proxy data, and any other data sets, a time correction step may be applied to each data type to ensure all data being contextualized and analyzed is coherent in time. For example, data in the /raw/data-type directory is read into memory, a time quantization is performed on the timestamp for each record, and one or more time-adjusted files are written into an /srt/data-type directory. An hourly concatenation process runs to concatenate the time corrected data in the /srt/data-type directory. This process may be run on an independent schedule from other processing tasks and may be user-definable to wait for the slowest arriving data set. For example, if web proxy data is arriving with a maximum delay of two hours, the hourly concatenation process concatenates data in the /srt/data-type directory that is outside the maximum delay of a single data-type. In the above example, the hourly concatenation process concatenates hourly files for those /srt/data-type records associated with three or more hours ago.

As another example data concatenation, based on the example for the second indicator provided above, every 10 minutes, a new 10-minute concatenated summary data file is created from copy of record summary data 534 by summing a plurality of records having the same source and destination IP addresses. Each 10-minute concatenated summary data file may be appended with a timestamp or counter to distinguish it from a previous 10-minute concatenated summary data file.

Every 60 minutes, the six most recent 10-minute concatenated summary data files are read and summed for the plurality of records having the same source and destination IP addresses. The results are stored in a new 60-minute concatenated summary data file that may be appended with a timestamp or a counter.

Every 240 minutes, the four most recent 60-minute concatenated summary data files are read and summed for the plurality of records having the same source and destination IP addresses. The results are stored in a new 240-minute concatenated summary data file that may be appended with a timestamp or a counter.

Every 1440 minutes, the six most recent 240-minute concatenated summary data files are read and summed for the plurality of records having the same source and destination IP addresses. The results are stored in a new 1440-minute concatenated summary data file that may be appended with a timestamp or a counter.

Concatenated summary data 536 may include each 10-minute concatenated summary data, each 60-minute concatenated summary data, each 240-minute concatenated summary data, and each 1440-minute concatenated summary data. Any number of concatenated summary data files may be created based on the second indicator. Optionally, once a next level of concatenation is performed the concatenated summary data files used to create the next level of concatenation are deleted. Optionally, the different level of concatenation summary files are stored in different directories.

In operation 1124, a determination is made concerning whether or not it is time to update report data 538. If it is time, processing continues in an operation 1126. If it is not time, processing continues in operation 1118. For example, report data 538 may be updated hourly.

In operation 1126, a peer group of a plurality of peer groups and a time zone of a plurality of time zones is selected. The plurality of peer groups and the plurality of time zones may be read from configuration data 528. The peer group and the time zone are evaluated as a pair.

Figure 11A:
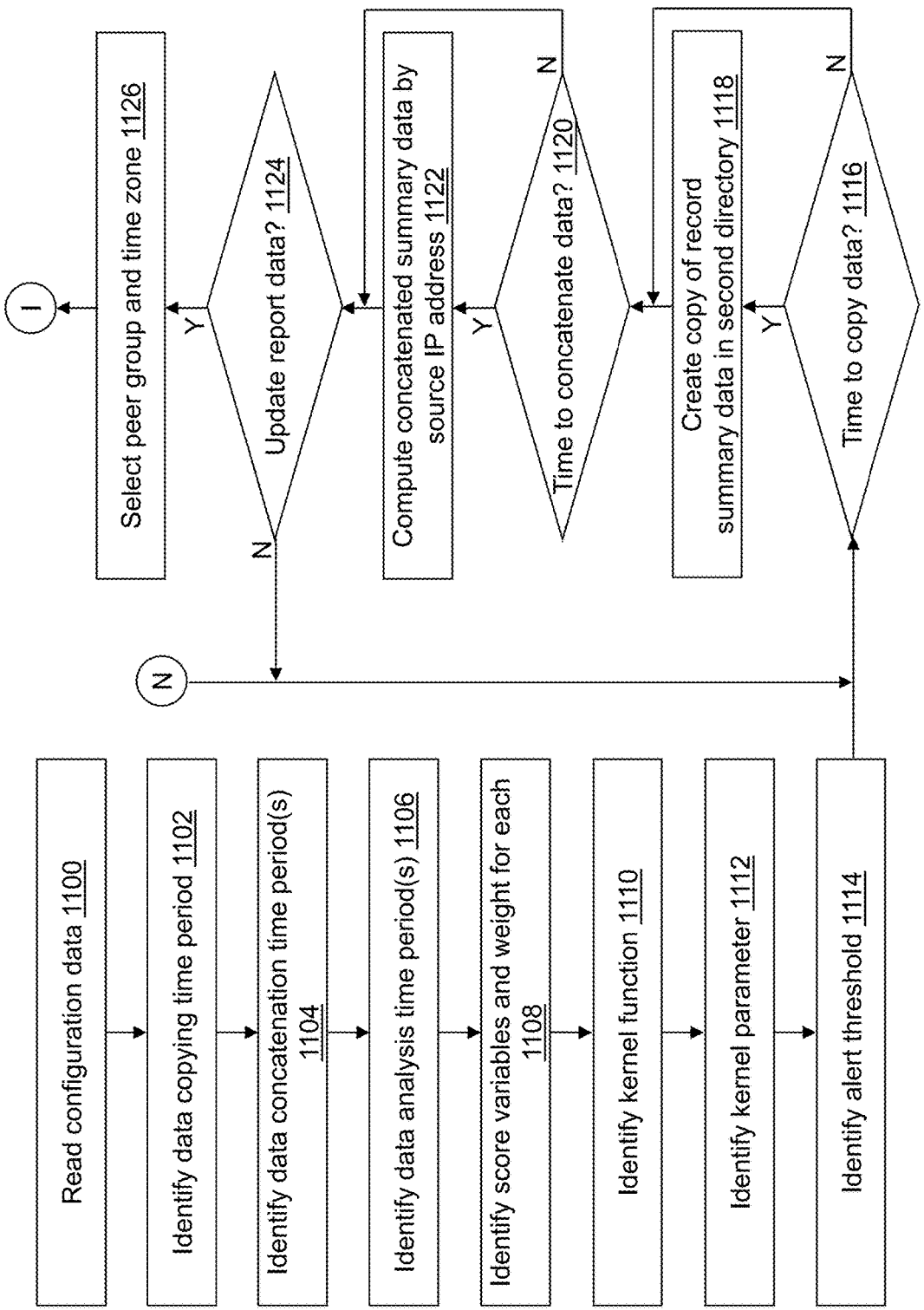
Figure 11B:
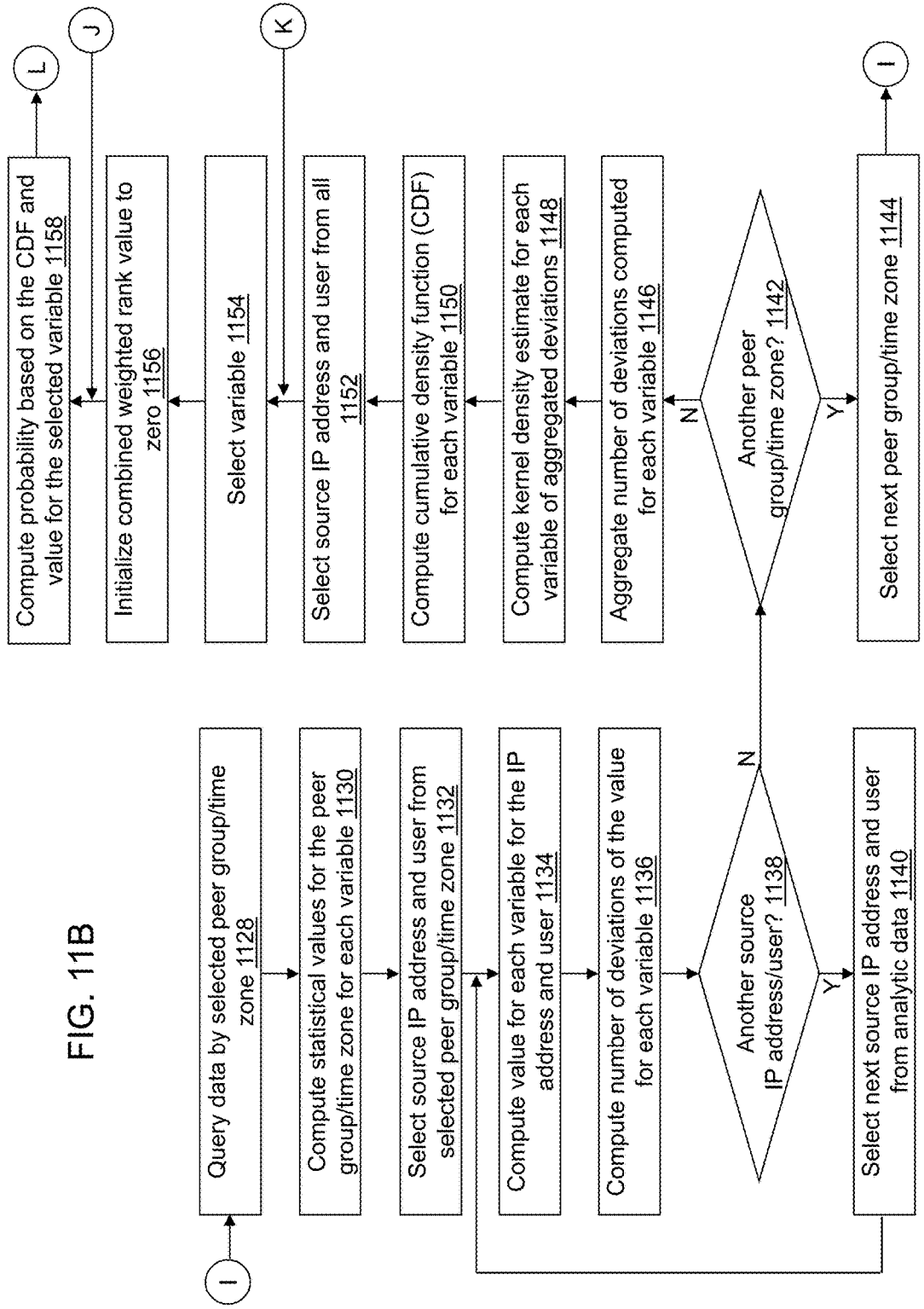

Referring to FIG. 11B, in an operation 1128, analytic data is created based on a query of the highest concatenation level data using the selected peer group and time zone. The analytic data includes records for which the peer group and time zone associated with the source IP address match. Netflow data is an important data source because it provides a "truth" regarding who is talking to who without any assumptions on behavior. As a result, many of the analytic components are based on behavioral analysis of the netflow record data though other analytic data may be used. For example, a web proxy destination IP address measure and a web proxy destination port measure determined from the web proxy data may be integrated into computation of analytic data. Authentication data is processed and exported for indexing to provide evidence of the user associated with a specific IP Address.

In an operation 1130, statistical values are computed for each variable indicated by the fourth indicator from the created analytic data that includes each record of report data 538 matching the peer group/time zone pair. Illustrative statistical values include a maximum, a minimum, a mean, a standard deviation, and a population size for the peer group for each variable.

In an operation 1132, a source IP address and a user pair are selected from the created analytic data.

In an operation 1134, a value for each variable indicated by the fourth indicator for the selected source IP address and user pair is computed.

In an operation 1136, a number of deviations of the computed value from the mean value is computed for each variable. For example, the computed mean value for each variable is subtracted from the computed value for each variable and the resulting value for each variable is divided by the standard deviation value for each variable to determine the number of deviations. For example, $N=V-\mu/\sigma$ is computed for each variable, where N is the number of deviations, V is the computed value, $\mu$ is the mean value, and $\sigma$ is the standard deviation value.

In an operation 1138, a determination is made concerning whether or not there is another source IP address and user pair included in the created analytic data that has not been evaluated. If there is another source IP address and user pair, processing continues in an operation 1140. If there is not another source IP address and user pair, processing continues in an operation 1142.

In operation 1140, a next source IP address and user pair is selected from the created analytic data, and processing continues in operation 1134.

In operation 1142, a determination is made concerning whether or not there is another peer group/time zone pair included in the highest concatenation level data that has not been evaluated. If there is another peer group/time zone combination, processing continues in an operation 1144. If there is not another peer group/time zone combination, processing continues in an operation 1146.

In operation 1144, a next peer group/time zone pair is selected from the highest concatenation level data, and processing continues in operation 1128.

In operation 1146, an aggregated number of deviations across all of the peer groups and time zones is computed for each variable indicated by the fourth indicator using the number of deviations computed for each variable and each source IP address and user pair in operation 1136. For example, the number of deviations is aggregated by defining a histogram of the number of deviations computed across all of the peer groups and time zones for each variable.

In an operation 1148, a kernel density estimate is computed for each variable indicated by the fourth indicator using the kernel function indicated by the fifth indicator any kernel parameter indicated by the sixth indicator and the computed aggregated number of deviations for each variable.

In an operation 1150, a cumulative density function is computed for each variable from the kernel density estimate computed for each variable.

In an operation 1152, a source IP address and user pair is selected from the highest concatenation level data.

In an operation 1154, a variable of the variables indicated by the fourth indicator is selected.

In an operation 1156, a combined weighted rank value is initialized to zero.

In an operation 1158, a probability is computed for the selected variable from the computed cumulative density function for the selected variable using the number of deviations computed for the source IP address and user pair in operation 1136.

Referring to FIG. 11C, in an operation 1160, a rank is computed from the computed probability, and processing continued in operation 1160. For example, the rank is computed using $rank=\ln(P_v/(1-P_v))$, where $P_v$ is the computed probability.

In an operation 1162, a weighted rank for each variable is computed by multiplying the computed rank by the weight defined for the selected variable.

In an operation 1164, the computed weighted rank is added to the combined weighted rank value.

In an operation 1166, a determination is made concerning whether or not there is another variable of the variables indicated by the fourth indicator to process. If there is another variable, processing continues in an operation 1168. If there is not another variable, processing continues in an operation 1170.

In operation 1168, a next variable of the variables indicated by the fourth indicator is selected, and processing continues in operation 1158.

In operation 1170, an average value of the combined weighted rank value is computed by dividing the combined weighted rank value by a number of the variables indicated by the fourth indicator.

In an operation 1172, an inverse value of the computed average is computed. For example, the inverse value is computed using $I=1/(1+e^{-A})$, where I is the inverse value and A is the average value.

In an operation 1174, the risk score value for the selected source IP address and user pair is computed by multiplying the inverse value by 100 to convert it to a percent value.

In an operation 1176, device summary data 614 of report data 538 is updated for the selected source IP address and user pair, and processing continues in operation 1178. For illustration, the computed risk score value and all of the supporting analytic results and user/business context information are exported to a new record of device summary data 614. Each record may include the source IP address, hostname, correlated user information such as the user ID, the division ID, the department ID, the peer group ID, the device type, the device ID, device location information (city, state/region, country, latitude, longitude), a network name, a network scope, a site ID, the risk score value, time data (start date, start day of week, start day of year, start hour of day, start year, stop date, stop hour of day, stop year, time zone offset time, etc.) and peer group comparative statistics that support the computed risk score value. The device ID may be a unique ID that is based on the IP address, the peer group, and/or the user ID. The IP address further may be subdivided into four octet values. The site ID uniquely identifies the site within the entity, for example, a reference to a building within the campus of the entity.

The peer group comparative statistics include a total counter value and the number of deviations value computed for the source IP address and user pair and a maximum value, a minimum value, a mean value, a standard deviation value, and a population size value for the peer group for each variable of the variables indicated by the fourth indicator. For example, the total counter value for the variable DistinctInternalDstIpmeasure is a number of unique internal destination IP addresses contacted by the source IP address and user pair during the last reporting time period. The total counter value for the variable DistinctExternalDstIpmeasure is a number of unique external destination IP addresses contacted. The total counter value for the variable Web- ProxyDstIpmeasure is a number of unique external destination IP addresses connected through a web proxy server.

The total counter value for the variable InternalBytesSentmeasure is a number of bytes transferred to a single internal IP address. The total counter value for the variable ExternalBytesSentmeasure is a number of bytes transferred to a single external IP address.

The total counter value for the variable DistinctInternalDstPortsmeasure is a number of unique internal destination ports contacted. The total counter value for the variable DistinctExternalDstPortsmeasure is a number of unique destination ports to a single external IP address contacted. The total counter value for the variable WebProxyDstPortsmeasure is a number of unique external destination IP addresses connected through a web proxy server contacted.

The total counter value for the variable SshHostScanningmeasure is a number of unique destination IP addresses with an attempted connection on a SSH port. The total counter value for the variable TelnetHostScanningmeasure is a number of unique destination IP addresses with an attempted connection on a Telnet port. The total counter value for the variable FtpHostScanningmeasure is a number of unique destination IP addresses with an attempted connection on an FTP port. The total counter value for the variable SqlServerHostScanningmeasure is a number of unique destination IP addresses with an attempted connection on a SQL server port. The total counter value for the variable MySQLServerHostScanningmeasure is a number of unique destination IP addresses with an attempted connection on a MySQL port. The total counter value for the variable OracleServerHostScanningmeasure is a number of unique destination IP addresses with an attempted connection on an Oracle database port. The total counter value for the variable ApplicationServerHostScanningmeasure is a number of unique destination IP addresses with an attempted connection on ports [80], [443], [8080], or [8443].

The total counter value for the variable DomainControllerEventsmeasure is a number of unique internal destination IP addresses with an attempted connection to AD domain controller ports. The total counter value for the variable DomainControllerScanningmeasure is a number of total packets sent to an AD domain controller.

The total counter value for the variable DnsUdpEventsmeasure is a number of total packets that are sent using the UDP protocol on a single port. The total counter value for the variable DistinctDstPeerGroupsmeasure is a number of unique destination peer groups contacted. The total counter value for the variable DistinctDstCountriesmeasure is a number of unique destination countries contacted. The total counter value for the variable IcmpScanningmeasure is a number of unique destination IP addresses with an attempted connection using the ICMP protocol. The total counter value for the variable UdpProtocolmeasure is a number of total packets that are sent using the UDP protocol.

Figure 11D:
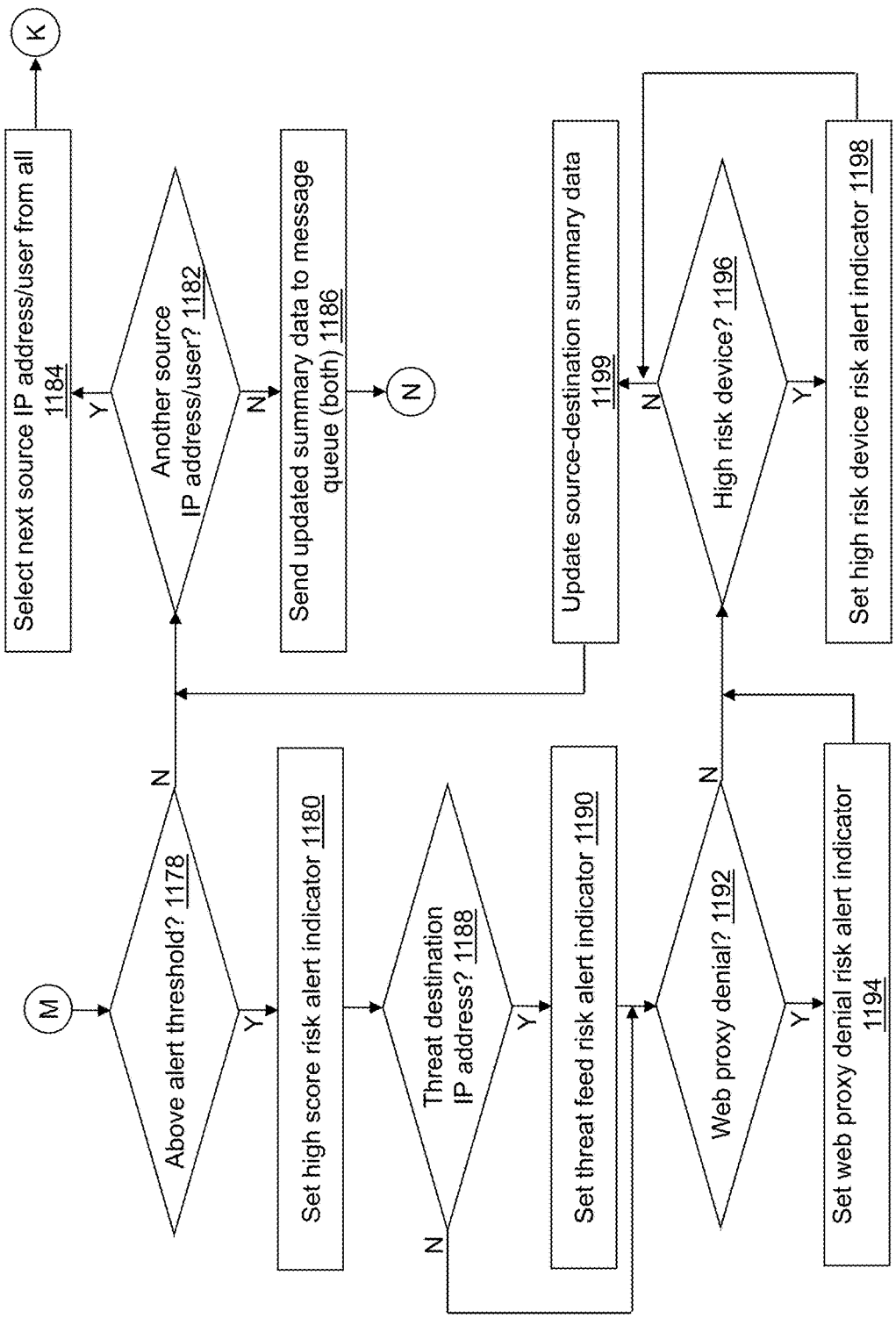

Referring to FIG. 11D, in an operation 1178, a determination is made concerning whether or not the risk score is greater than the alert threshold. If the risk score is greater than the alert threshold, processing continues in an operation 1180. If the risk score is not greater than the alert threshold, processing continues in an operation 1182.

In operation 1180, the risk alert indicator is set indicating that the risk alert value indicated by the risk score is greater than the alert threshold indicating that the source IP address is being used in an anomalous manner relative to other computing devices in its peer group.

In operation 1182, a determination is made concerning whether or not there is another source IP address and user pair included in the highest concatenation level data that has not been evaluated. If there is another source IP address and user pair, processing continues in an operation 1184. If there is not another source IP address and user pair, processing continues in an operation 1186.

In operation 1184, a next source IP address and user pair is selected from the highest concatenation level data that has not been evaluated, and processing continues in operation 1154.

In operation 1186, the updated report data 538 is sent to message queue 540, and processing continues in operation 1116. The updated report data 538 may be added to message queue 540 to support conversion of report data 538 into indexed queue data 542. Message queue 540 may be used as a buffering mechanism to ensure no data is lost between report data 538 and indexed queue data 542.

In an operation 1188, the destination IP address(es) of communications from the source IP address and user combination are compared to threat destination IP addresses and a determination is made concerning whether or not a match was found. If a match was found, processing continues in an operation 1190. If a match was not found, processing continues in an operation 1192. As another option, a comparison may have been performed in operation 816 shown referring to FIG. 8, by ESPE 700. In operation 816, the threat category ID, risk value, and geographic location included in the threat feed data for the matching IP address may have been joined to the network flow event record written to record summary data 532. In operation 1188, the match may be based on whether or not the threat category ID, the risk value, and/or the geographic location is non-zero for the destination IP address(es) of communications from the source IP address and user combination.

In operation 1190, a threat feed risk alert indicator is set indicating that the source IP address and user pair are communicating with known bad devices.

In operation 1192, a determination is made concerning whether or not a web proxy denial was identified for the source IP address and user combination. If there was a web proxy denial, processing continues in an operation 1194. If there was not a web proxy denial, processing continues in an operation 1196. For example, the destination IP address may be assigned 0.0.0.0 if the request is blocked.

In operation 1194, a web proxy denial risk alert indicator is set indicating that the source IP address and user combination were denied access to a requested destination IP address by a web proxy server.

In operation 1196, a determination is made concerning whether or not the source IP address is associated with a high risk device. If the source IP address is a high risk device, processing continues in an operation 1198. If the source IP address is not a high risk device, processing continues in an operation 1199. High risk devices may be identified as devices used by executives of the entity in configuration data 528. A list of IP address for high risk devices may be included in configuration data 528. As another example, high risk devices may be defined based on the peer group.

In operation 1198, a high risk device risk alert indicator is set indicating that the source IP address is associated with a high risk device such as a device typically used by executives of the entity.

In operation 1199, source/destination summary data 616 of report data 538 is updated for the selected source IP address and user pair for each unique destination IP address, and processing continues in operation 1182. For illustration, risk alert indicators and associated data may be saved to source/destination summary data 616. For example, a number of attempted connections that were blocked by the web proxy system, a web proxy block category, a destination IP address that was blocked by the web proxy server, and a destination hostname that was blocked by the web proxy server may be saved. Threat feed data further may be saved to source/destination summary data 616. For example, a threat feed destination IP address, a number of threat feed connections, and a list of the associated threat feed category of the destination IP address, such as Tor exit node, malware, or Botnet may be saved. Source/destination summary data 616 is a summarization of the netflow based on the following composite key: srcIpAddress (source IP address), dstIpAddress (destination IP address), dstPort (destination port), and protocol. For each unique composite key, the following numerical values are summed for a summarization duration: 1) a total number of bytes sent from srcIpAddress to dstIpAddress; 2) a total number of packets sent from srcIpAddress to dstIpAddress; and 3) a total time communications have been sent from srcIpAddress to dstIpAddress. For each unique composite key, a mean is computed for a number of bytes per packet sent from srcIpAddress to dstIpAddress for the summarization duration. For each unique composite key, the following contextual information is stored as is with the record: source device type ID, source hostname, source user ID, source division ID, source department ID, source peer group ID, destination device type ID, destination hostname, destination user ID, destination division ID, destination department ID, destination peer group ID, and destination scope.

Because cybersecurity system 110 runs continuously on incoming data, terabytes of data may be written. From a storage management and corporate policy perspective, the amount of each data type to retain may be defined in configuration data 528. For each folder, a number of days to retain data may be specified.

Figure 12:
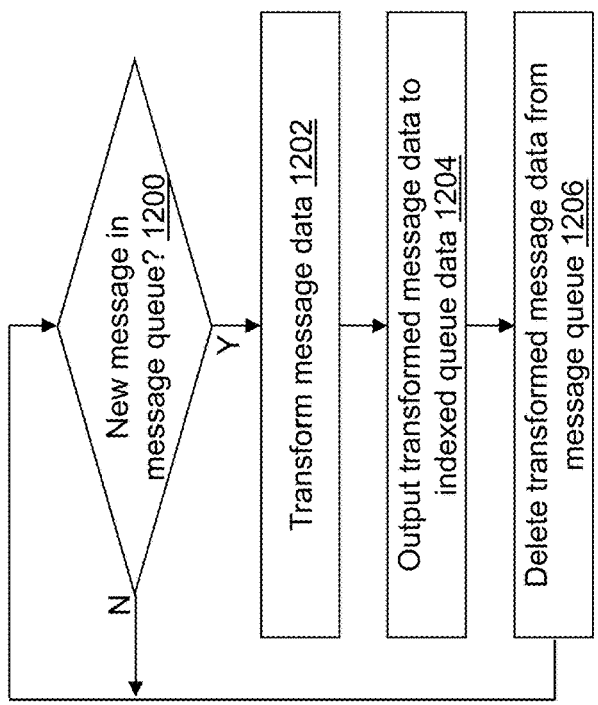
FIG. 12 depicts a flow diagram illustrating examples of operations performed by an index data application of the cybersecurity application of the cybersecurity system of FIG. 4 in accordance with an illustrative embodiment.

Referring to FIG. 12, example operations associated with index data application 516 are described. Additional, fewer, or different operations may be performed depending on the embodiment. The order of presentation of the operations of FIG. 12 is not intended to be limiting. Although some of the operational flows are presented in sequence, the various operations may be performed in various repetitions, concurrently, and/or in other orders than those that are illustrated. For example, various operations may be performed in parallel, for example, using a plurality of threads.

In an operation 1200, a determination is made concerning whether or not there is a new message in message queue 540. If there is a new message, processing continues in an operation 1202. If there is not a new message, processing continues in operation 1200 to continue to listen fora new message in message queue 540.

In operation 1202, message data in the new message is transformed for faster search processing.

In an operation 1204, the transformed message data is output to indexed queue data 542.

In an operation 1204, the new message and the transformed message data are deleted, and processing continues in operation 1200 to listen for a new message.

For illustration, index data application 516 may use Logstash®, developed and provided by Elasticsearch BV, as a data collection engine with real-time pipelining capabilities to process message queue 540. Logstash may be connected to Elasticsearch®, also developed and provided by Elasticsearch BV, and which is a distributed, JSON-based search and analytics engine designed for horizontal scalability, maximum reliability, and easy management. Multiple instances of Logstash may be executing to process the new message with each instance implemented with a plurality of separate read/write channels to output the transformed message data to indexed queue data 542. For example, there may be four instances of Logstash executing with each implemented with four separate read/write channels for a total of 16 read/write channels transforming data in message queue 540 into data in indexed queue data 542.

Indexed queue data 542 is stored for access using Elasticsearch. A query of indexed queue data 542, for example, from data enrichment application 518 or request processing application 522, may be performed using Elasticsearch, which provides a sophisticated, developer-friendly query language covering structured, unstructured, and time-series data. Search queries can be requested of Elasticsearch using a simple RESTful application programming interface (API) using JSON over HTTP.

Figure 13:
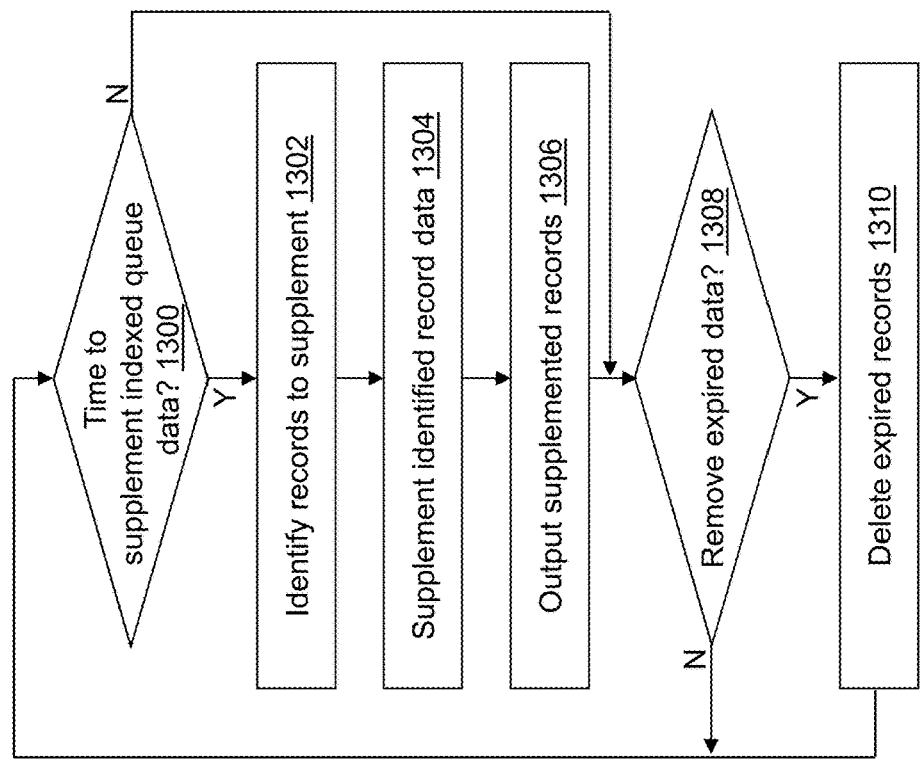
FIG. 13 depicts a flow diagram illustrating examples of operations performed by a data enrichment application of the cybersecurity application of the cybersecurity system of FIG. 4 in accordance with an illustrative embodiment.

Referring to FIG. 13, example operations associated with data enrichment application 518 are described. Additional, fewer, or different operations may be performed depending on the embodiment. The order of presentation of the operations of FIG. 13 is not intended to be limiting. Although some of the operational flows are presented in sequence, the various operations may be performed in various repetitions, concurrently, and/or in other orders than those that are illustrated. For example, various operations may be performed in parallel, for example, using a plurality of threads.

In an operation 1300, a determination is made concerning whether or not it is time to supplement data in indexed queue data 542. If it is time, processing continues in an operation 1302. If it is not time, processing continues in an operation 1308.

In operation 1302, records in indexed queue data 542 are examined to identify any that are missing data and need supplementing. For example, the records in indexed queue data 542 are reviewed to confirm that a hostname has been identified for each IP address. If the hostname has not been identified for an IP address, the hostname field contains a copy of the IP address. As another example, fields in indexed queue data 542 may contain a string value that is converted to a number to save space.

In an operation 1304, the identified records are supplemented. For example, a DNS resolution request is sent to hostname lookup application 510. As another example, the fields in indexed queue data 542 containing text are converted to a number.

In an operation 1306, the supplemented record is output to indexed queue data 542. For example, when a resolution response is received from hostname lookup application 510, the hostname is written to the hostname field to replace the IP address. As another example, the converted number is written to the field in indexed queue data 542.

In operation 1308, a determination is made concerning whether or not it is time to remove expired data from indexed queue data 542. If it is time, processing continues in an operation 1310. If it is not time, processing continues in operation 1300 to continue to supplement indexed queue data 542 as needed.

In operation 1310, expired data in indexed queue data 542 is deleted. For example, data in indexed queue data 542 may be deleted when it is a week old.

Figure 14:
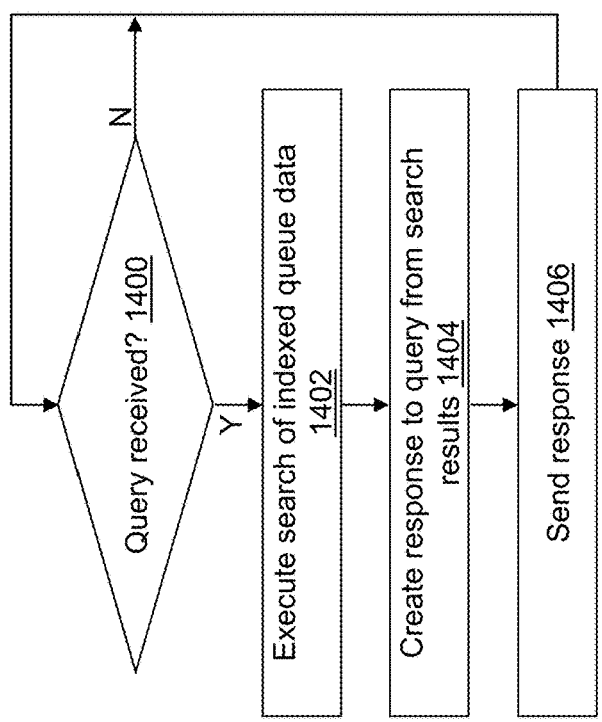
FIG. 14 depicts a flow diagram illustrating examples of operations performed by a request processing application of the cybersecurity application of the cybersecurity system of FIG. 4 in accordance with an illustrative embodiment.

Referring to FIG. 14, example operations associated with request processing application 522 are described. Additional, fewer, or different operations may be performed depending on the embodiment. The order of presentation of the operations of FIG. 14 is not intended to be limiting. Although some of the operational flows are presented in sequence, the various operations may be performed in various repetitions, concurrently, and/or in other orders than those that are illustrated. For example, various operations may be performed in parallel, for example, using a plurality of threads.

In operation 1400, a determination is made concerning whether or not a query is received from the instantiated Web server application 520. If a query is received, processing continues in an operation 1402. If a query is not received, processing continues in operation 1400 to continue to listen for a query.

In operation 1402, a search of indexed queue data 542 is executed based on the received query. For example, the received query is transformed into one or more queries to indexed queue data 542.

In an operation 1404, a response to the query is created from the search results by transforming an index response format to a normalized response format.

In an operation 1406, the response is sent to the instantiated Web server application 520, and processing continues in operation 1400 to listen for another query.

Figure 15:
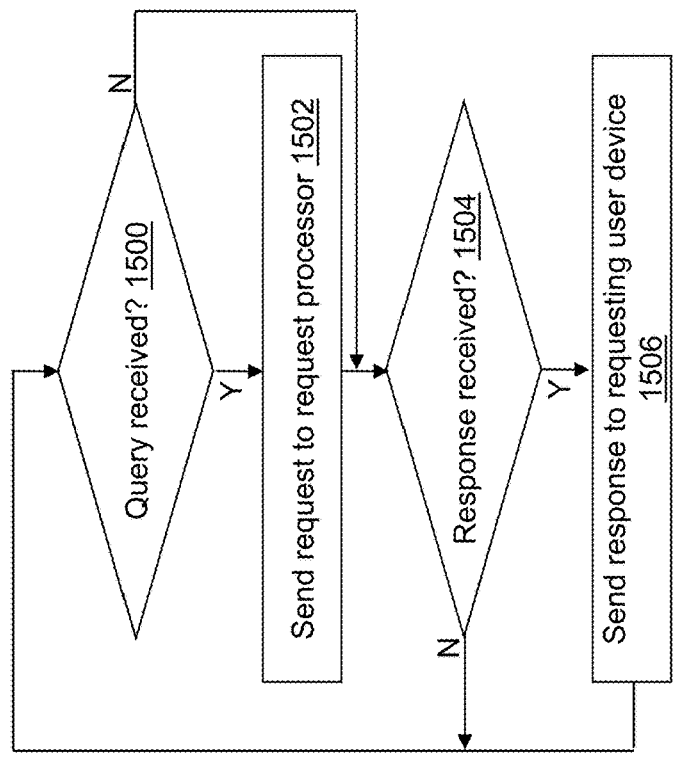
FIG. 15 depicts a flow diagram illustrating examples of operations performed by a web server application of the cybersecurity application of the cybersecurity system of FIG. 4 in accordance with an illustrative embodiment.

Referring to FIG. 15, example operations associated with Web server application 520 are described. Additional, fewer, or different operations may be performed depending on the embodiment. The order of presentation of the operations of FIG. 15 is not intended to be limiting. Although some of the operational flows are presented in sequence, the various operations may be performed in various repetitions, concurrently, and/or in other orders than those that are illustrated. For example, various operations may be performed in parallel, for example, using a plurality of threads.

In operation 1500, a determination is made concerning whether or not a query is received from system user device 300. If a query is received, processing continues in an operation 1502. If a query is not received, processing continues in an operation 1504.

In operation 1502, a query request is sent to the instantiation of request processing application 522. For example, the received query includes a set of http parameters that are transformed into a query request sent to the instantiation of request processing application 522.

In operation 1504, a determination is made concerning whether or not a response is received from the instantiated request processing application 522. If a response is received, processing continues in an operation 1506. If a response is not received, processing continues in operation 1500 to continue to listen for another query.

In operation 1506, the response is sent to the instantiated request processing application 522, and processing continues in operation 1500 to listen for another query or response. Request/response packets 500 include the query request and the response.

Figure 16:
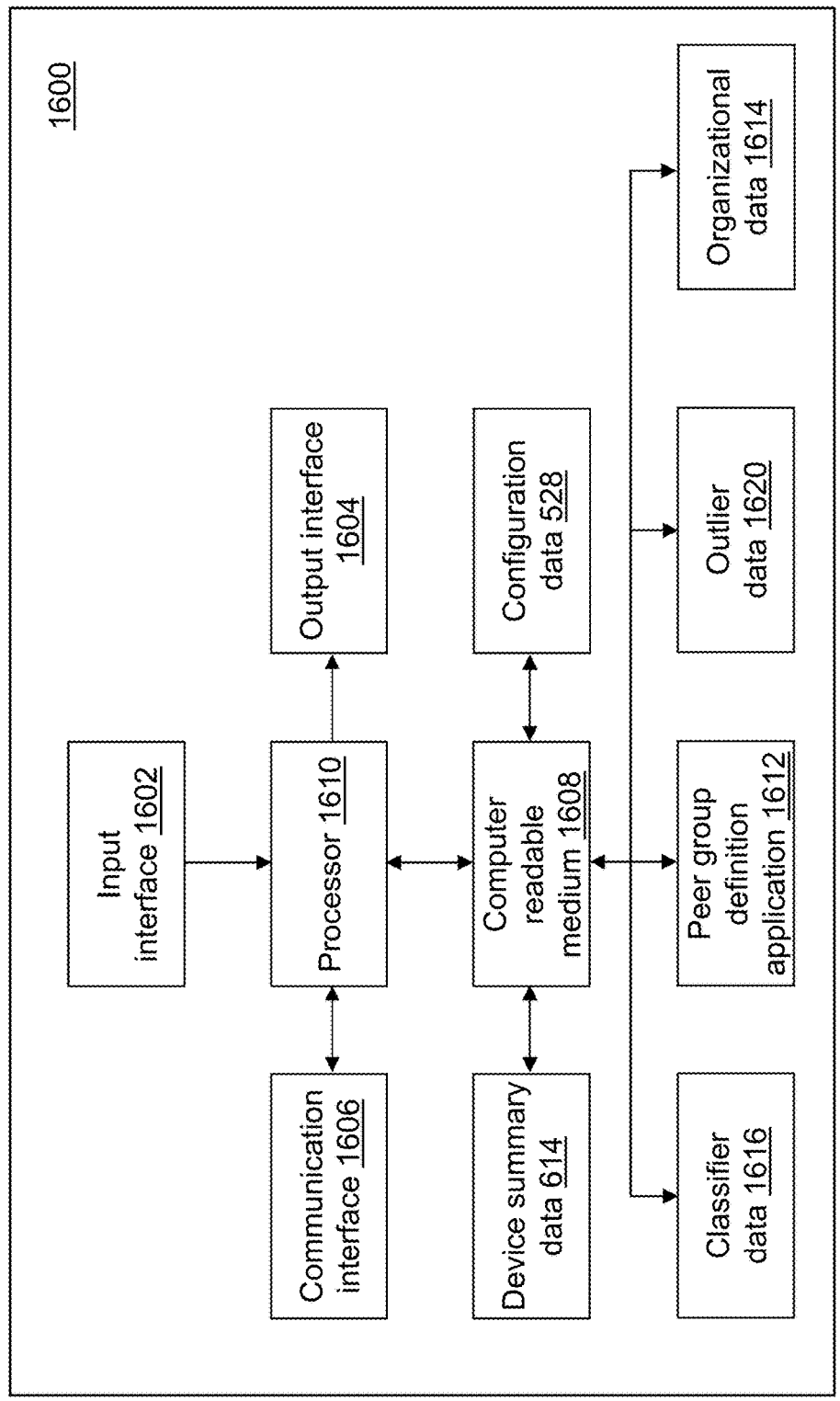
FIG. 16 depicts a peer group definition device in accordance with an illustrative embodiment.

Referring to FIG. 16, a block diagram of a peer group definition device 1600 is shown in accordance with an illustrative embodiment. Peer group definition device 1600 may include a fourth input interface 1602, a fourth output interface 1604, a fourth communication interface 1606, a fourth computer-readable medium 1608, a fourth processor 1610, a peer group definition application 1612, configuration data 528, device summary data 614, organizational data 1614, classifier data 1616, and outlier data 1620. Fewer, different, and additional components may be incorporated into peer group definition device 1600. Though not shown, peer group definition application 1612 may access any portion of cybersecurity data 414. Peer group definition device 1600 may be a computing device of the one or more computing devices of cybersecurity system 110.

Fourth input interface 1602 provides the same or similar functionality as that described with reference to input interface 302 of system user device 300 though referring to peer group definition device 1600. Fourth output interface 1604 provides the same or similar functionality as that described with reference to output interface 304 of system user device 300 though referring to peer group definition device 1600. Fourth communication interface 1606 provides the same or similar functionality as that described with reference to communication interface 306 of system user device 300 though referring to peer group definition device 1600. Fourth computer-readable medium 1608 provides the same or similar functionality as that described with reference to computer-readable medium 308 of system user device 300 though referring to peer group definition device 1600. Fourth processor 1610 provides the same or similar functionality as that described with reference to processor 310 of system user device 300 though referring to peer group definition device 1600.

Device summary data 614 may be stored on fourth computer-readable medium 1608 and/or stored on one or more computing devices of cybersecurity system 110 and accessed through either fourth input interface 1602 and/or fourth communication interface 1606. Device summary data 614 of peer group definition device 1600 may be the same as or a copy of device summary data 614 updated by analytic computation application 514.

Configuration data 528 may be stored on fourth computer-readable medium 1608 and/or stored on one or more computing devices of cybersecurity system 110 and accessed through either fourth input interface 1602 and/or fourth communication interface 1606. Configuration data 528 of peer group definition device 1600 may be the same as or a copy of configuration data 528.

Organizational data 1614 may be stored on fourth computer-readable medium 1608 and/or stored on one or more computing devices of cybersecurity system 110 and accessed through either fourth input interface 1602 and/or fourth communication interface 1606. Organizational data 1614 of peer group definition device 1600 may be the same as or a copy of the organizational data read from one or more files in operation 906. Organizational data 1614 provides a mapping between users of the plurality of monitored devices 102 and the peer group assigned to the user based on a similarity between the behaviors of users assigned to the same peer group. For illustration, organizational data 1614 may include the server file, the user organization mapping file, and/or the peer group mapping file described previously. Alternatively, organizational data 1614 may be received by a query to an AD or LDAP server identified in configuration data 528 to acquire division, department, and email information. The division and department information may be used to perform a query to resolve the division and department to the peer group. Organizational data 1614 may be part of configuration data 528.

Referring to the example embodiment of FIG. 16, peer group definition application 1612 is implemented in software (comprised of computer-readable and/or computer-executable instructions) stored in fourth computer-readable medium 1608 and accessible by fourth processor 1610 for execution of the instructions that embody the operations of peer group definition application 1612. Peer group definition application 1612 may be written using one or more programming languages, assembly languages, scripting languages, etc. Peer group definition application 1612 reads configuration data 528, device summary data 614, and/or organizational data 1614 and generates classifier data 1616 and/or outlier data 1620 and possibly updates organizational data 1614. Peer group definition application 1612 may be used to define and/or to evaluate and/or to update the peer group definitions stored in organizational data 1614. Peer groups gather internal network users and devices into small subgroups that exhibit similar behavior to better identify anomalous behavior that occurs on the internal network. Peer group definitions are an important input to cybersecurity system 110. Additionally, the peer group definitions are dynamic because they regularly change as the internal network composition changes. This can include changes due to the addition of new employees, removal of employees who leave the entity, change in roles of employees, addition of new hardware, etc. Peer group definitions can be user defined by abstracting the network structure, algorithmically defined (e.g., clustering), or a combination of user and algorithmically defined.

Abstracting the network structure benefits from easy human understanding and explanation, particularly during anomaly investigation. However, adhering only to this approach can result in a very complex peer group structure that can become difficult to manage and maintain over time. Clustering can provide the optimal number of peer groups, and make management over time simpler. However, the groupings are not always intuitive or easily explainable within the context of the entity network. Clustering can also be computationally expensive for large amounts of data (both number of features and records) resulting in a longer processing time to update peer groups. Because each peer grouping approach has distinct advantages, a hybrid peer grouping strategy may be used to define an optimal set of peer groups.

To begin the process, peer group elements available to assist in the peer group definitions are identified. Typically, these include LDAP organization data, AD permissions, a network device inventory, etc. LDAP and AD are useful when segmenting peer groups for client users. These users typically utilize devices in an office environment, such as laptops, desktops, phones, tablets, etc. LDAP and AD data may be used to collect information about a particular user's department, job function, and permissions needed to perform their job. Users with similar department assignments, job functions, and permissions may be aggregated into peer groups.

A second class of network devices includes specific device classes not typically used by any one user. These network devices include servers (such as AD, mail, web, and development machines) and network-connected devices such as cameras, card readers, printers, etc. These network devices may be grouped by device type. If further clarification is needed, such devices can also be assigned to a specific division, department, and/or location. Once these initial elements are gathered and separated, internal entity experts can capture peer group definitions initially in organizational data 1614 that may be part of configuration data 528.

Cybersecurity system 110 may be executed for a period of time to capture device summary data 614. Peer groups may be assigned to each unique row in device summary data 614 (source IP address/user ID combination) irrespective of the peer group assigned during the execution of cybersecurity system 110 that generated device summary data 614. The assignment may be based on a defined peer grouping strategy.

To verify a quality of the peer grouping, pairwise nonparametric comparisons of peer groups for each specified data capture time period may be computed. For illustration, SAS/STAT® 13.1 provides nonparametric procedures e.g., NPAR1WAY) to analyze a rank of a variable using a test such as a Wilcoxon Rank-Sum test available in PROC NPAR1WAY. The Wilcoxon Rank-Sum test compares a distribution taken from a population and determines whether it is statistically distinct from the overall population. Each peer group in a peer grouping strategy can be tested against a random sample taken from device summary data 614. The number of comparisons that show distinction is a rough measure of the success of the peer grouping strategy. A plurality of peer grouping strategies may be evaluated and compared to select from the plurality of peer grouping strategies. The selected peer grouping strategy can be used to generate a new version of organizational data 1614 subsequently used by cybersecurity system 110 to identify anomalous behavior.

Peer group definition application 1612 further may analyze device summary data 614 to evaluate the effectiveness of the peer group definitions and to identify modifications to the peer group definitions that can be used to update organizational data 1614. Peer group definition application 1612 further may define classifier data 1616 that can be used to define a peer group assignment dynamically as the internal network composition changes and/or to identify outlier data 1620 that can be used to define network devices and/or users that do not fit the peer group definitions. Peer grouping may not be based strictly on behavior or the organization hierarchy. Each informs the other and improves the quality and interpretability of the peer groups. A peer group ID identifies a peer group to which a user is assigned. Members of the peer group are identified based on an expected network activity behavior. Users within a peer group are expected to have similar behavior such that a normal or characteristic behavior can be described for the peer group based on this expectation and to identify abnormal or uncharacteristic behavior based on deviations from the "normal" behavior.

Figure 17B:
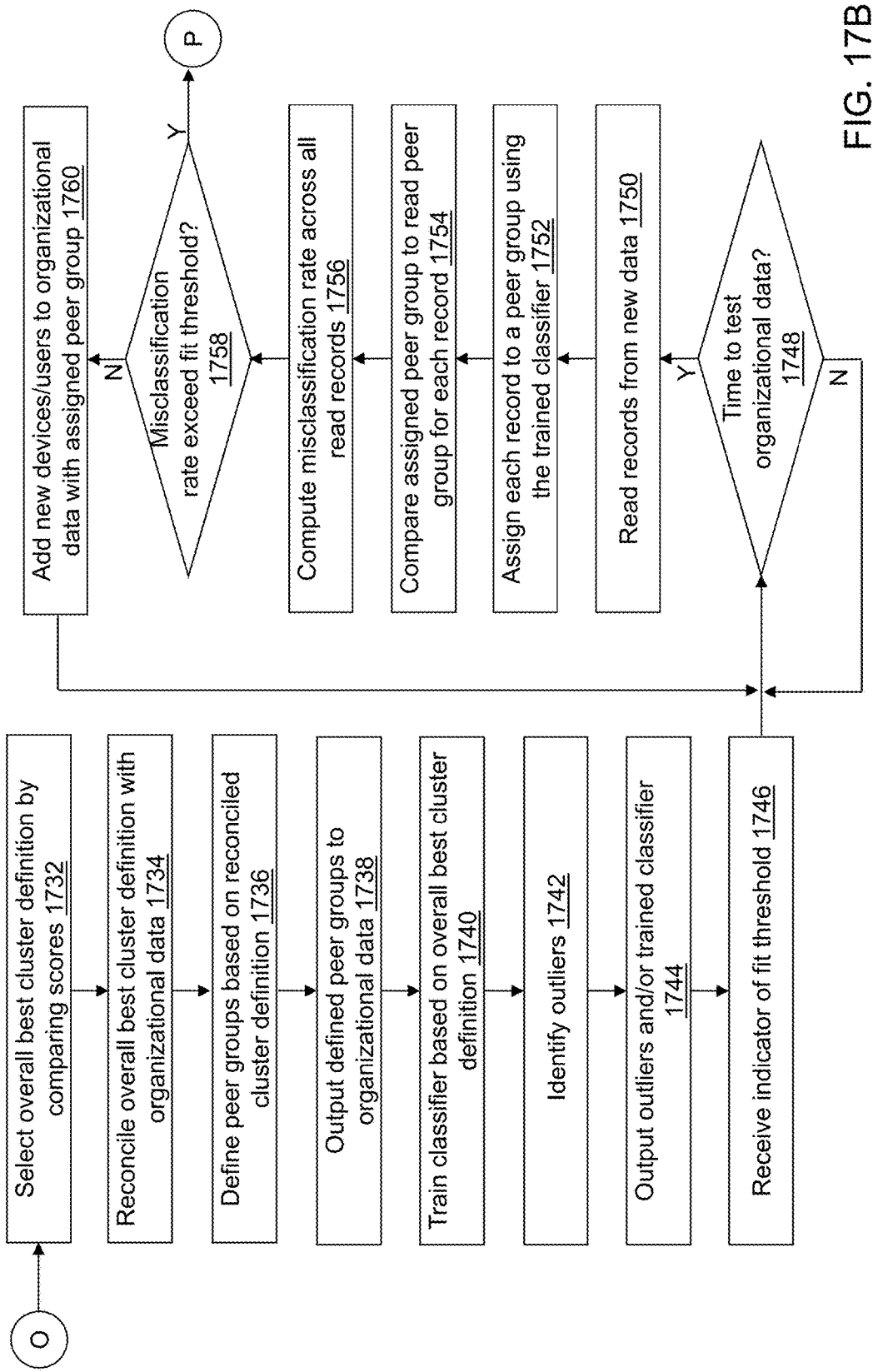

Referring to FIGS. 17A-17B, example operations associated with peer group definition application 1612 are described. Additional, fewer, or different operations may be performed depending on the embodiment. The order of presentation of the operations of FIGS. 17A-17B is not intended to be limiting. Although some of the operational flows are presented in sequence, the various operations may be performed in various repetitions, concurrently, and/or in other orders than those that are illustrated. For example, various operations may be performed in parallel, for example, using a plurality of threads. Peer group definition application 1612 further may include one or more applications that can be executed independently.

In operation 1700, an eighth indicator is received that indicates data to process. For example, the eighth indicator indicates a location of device summary data 614 and/or organizational data 1614. In an alternative embodiment, the data to process may not be selectable. For example, a most recently created data set(s) may be used automatically.

In an operation 1702, a ninth indicator of a range of numbers of clusters to evaluate is received. For example, the ninth indicator indicates a minimum number of clusters to evaluate and a maximum number of clusters to evaluate. The ninth indicator may further indicate an increment that is used to define an incremental value for incrementing from the minimum to the maximum number of clusters or vice versa. Of course, the incremental value may be or default to one. The ninth indicator may be received by peer group definition application 1612 after selection from a user interface window or after entry by a user into a user interface window. Default values for the range of numbers of clusters to evaluate may further be stored, for example, in fourth computer-readable medium 1608. In an alternative embodiment, the range of numbers of clusters to evaluate may not be selectable.

In an operation 1704, a tenth indicator of one or more clustering algorithms to evaluate is received. For example, the tenth indicator indicates one or more names of clustering algorithms. The tenth indicator may be received by peer group definition application 1612 after selection from a user interface window or after entry by a user into a user interface window. A default set of one or more clustering algorithms to evaluate may further be stored, for example, in fourth computer-readable medium 1608. In an alternative embodiment, the clustering algorithms may not be selectable. Example clustering algorithms include the k-means algorithm, Ward's minimum-variance algorithm, a hierarchical algorithm, a median algorithm, McQuitty's similarity analysis algorithm, etc. as understood by a person of skill in the art. For illustration, SAS/STAT® 13.1 provides clustering procedures (e.g., ACECLUS, CLUSTER, DISTANCE, FASTCLUS, MODECLUS, TREE, VARCLUS) to cluster device summary data 614 into groups or clusters, suggested by the data, not defined a priori, such that objects in a given cluster tend to be similar to each other in terms of the network behavior captured in device summary data 614. Different clustering methods may be used by the clustering procedures. Disjoint clusters place each object (network device and/or user) in one and only one cluster.

In an operation 1706, an eleventh indicator may be received that indicates one or more variables of device summary data 614 to use in evaluating the clusters. The eleventh indicator may indicate that all or only a subset of the variables stored in device summary data 614 be used to compute the risk score. For example, the eleventh indicator indicates a list of variables to use by name, column number, etc. In an alternative embodiment, the eleventh indicator may not be received. For example, all of the variables may be used automatically. As another example, the variables may be included in a list. In an illustrative embodiment, the variables selected to compute the risk score by analytic computation application 514 may be used to compute the clusters.

In an operation 1708, the data indicated by the eighth indicator is pre-processed, if any pre-processing is to be performed. For example, peer group definition application 1612 may provide user selectable options that perform pre-processing functions. As understood by a person of skill in the art, example pre-processing functions include removing variables with an excessive number of cardinality levels, removing variables with an excessive number of missing values, imputing numeric missing values using distributional methods, imputing class variables using decision tree methods, replacing numeric outliers that are an excessive number of standard deviations from a mean value, binning class variable outliers, standardizing interval variables, scaling or encoding class variables, etc. Another example pre-processing function may be to further summarize the data for each network device. For example, if device summary data 614 includes data captured hourly for 30 days, a summary of device summary data 614 may be created for each day instead of hourly by computing averages for the day for each variable.

The data at this level is already associated per DeviceId where the DeviceId is defined in two ways. If the IP Address is associated with a client user machine, the DeviceId=IPAddress+userId+peerGroupId. If the IP Address is associated with a dedicated business function (ATM, PoS, etc.), the DeviceId=IPAddress+peerGroupId. Analytic features can be reduced or derived as needed using standard analytic routines to optimize the clustering results.

Device summary data 614 further may be tested to confirm that the data is amenable to clustering. For illustration, a Hopkins statistic, for example, as described in A. Banerjee and R. N. Dave, "Validating clusters using the Hopkins statistic," 2004 *IEEE International Conference on Fuzzy Systems*, pp. 149-153, Vol. 1, 25-29 Jul. 2004, can be used to determine whether or not device summary data 614 has inherent structure and can be clustered. If pre-processing indicates that device summary data 614 is not amenable to clustering, processing may stop.

In an operation 1710, a number of clusters is initialized, and a clustering algorithm is selected. For example, the number of clusters may be initialized to the minimum number of clusters to evaluate or to the maximum number of clusters to evaluate as defined in operation 1702. The clustering algorithm is selected from the one or more clustering algorithms indicated using the tenth indicator. For each iteration of operation 1710, a clustering algorithm of the one or more clustering algorithms is selected that has not yet been evaluated by execution of operations 1712-1720.

In an operation 1712, the selected first clustering algorithm is executed to cluster the pre-processed data, or device summary data 614, if no pre-processing was performed in operation 1708, into the defined number of clusters. The number of clusters may be defined based on the initialized number of clusters defined in operation 1710 or in an operation 1716. The clustering algorithm performs a cluster analysis on the basis of distances that are computed for the selected one or more variables in operation 1706. The pre-processed data, or device summary data 614 if no pre-processing was performed, is divided into clusters such that each observation for a device or a user belongs to a single cluster. Additionally, the clustering algorithm defines a centroid location for each cluster based on the variables used to the define the centroid location. As understood by a person of skill in the art, execution of the clustering algorithm to determine the clusters may involve multiple Monte Carlo iterations and a convergence criteria and determination.

In an operation 1714, a determination is made concerning whether or not another cluster determination is to be performed with a next number of clusters. For example, the determination may compare the current defined number of clusters to the minimum number of clusters or the maximum number of clusters to determine if each cluster determination has been performed as understood by a person of skill in the art. If another cluster determination is to be performed, processing continues in an operation 1716. If each cluster determination has been performed, processing continues in an operation 1718.

In operation 1716, a next number of clusters is defined by incrementing or decrementing a counter of the number of clusters from the minimum number of clusters or the maximum number of clusters, respectively. Processing continues in operation 1712 to execute the selected clustering algorithm with the next number of clusters as the defined number of clusters. Of course, operations 1710-1718 may be performed concurrently.

In operation 1718, a best number of clusters is selected by comparing a variety of statistics computed for the clusters defined for each iteration of operation 1712. For illustration, between and/or within cluster validity metrics may be computed and compared, gap analysis may be performed, etc. to select the best number of clusters. As understood by a person of skill in the art, the best number of clusters may not be mathematically verifiable as an optimal value. For example methods for estimating a best number of clusters, algorithms described in U.S. Pat. No. 9,202,178, assigned to SAS Institute Inc., the assignee of the present application, may be used.

In an operation 1720, a determination is made concerning whether or not each clustering algorithm of the one or more clustering algorithms has been evaluated. If another clustering algorithm is to be evaluated, processing continues in operation 1710. If each clustering algorithm has been evaluated, processing continues in an operation 1722.

In operation 1722, sample data is selected randomly from device summary data 614.

In an operation 1724, a best cluster definition is selected form the best cluster definitions selected in operation 1718 for each clustering algorithm. For each iteration of operation 1724, a best cluster definition selected for a clustering algorithm of the one or more clustering algorithms is selected that has not yet been evaluated by execution of operations 1724-1730. For example, the best cluster definitions may be selected in the order they were defined in operation 1718. As understood by a person of skill in the art, each best cluster definition defines values of two or more variables that define a cluster centroid for each cluster in the respective best cluster definition. Each cluster may be associated with a unique peer group.

In an operation 1726, each non-sample record from device summary data 614 is assigned a cluster by determining to which centroid the record data is closest. The non-sample record further is assigned to the unique peer group associated with the assigned cluster.

In operation 1728, a distinction measure is computed for the best cluster definition. For example, as discussed previously, pairwise nonparametric comparisons between the peer groups assigned for the sample data and the non-sample data can be computed. The number of comparisons that show distinction is a rough measure of the success of the peer grouping strategy. The distinction measure is the nonparametric pairwise comparison computed, for example, using PROC NPAR1WAY as described previously.

In an operation 1730, a determination is made concerning whether or not each best cluster definition has been evaluated. If each best cluster definition has been evaluated, processing continues in an operation 1732. If each best cluster definition has not been evaluated, processing continues in operation 1724.

In operation 1732, an overall best cluster definition is selected by comparing the distinction measure computed for each best cluster definition.

In an operation 1734, the overall best cluster definition is reconciled with organizational data 1614 by evaluating the relationship between the organizational peer groups and the overall best cluster definition. For example, a number of times a peer group as defined by the organizational peer groups appears in a cluster may be determined.

In an operation 1736, the peer groups are defined based on the reconciled cluster definition. For example, two or more small peer groups appear completely within one cluster. In this case, the peer groups may be combined. In other cases, a single peer group is very distinctly split between two or more clusters. In this situation, it may make sense to split the peer group along the boundaries of the clusters defined by the overall best cluster definition.

In an operation 1738, the defined peer groups are output to organizational data 1614 for subsequent use by cybersecurity system 110 to identify anomalous behavior.

In an operation 1740, a classifier is trained based on the overall best cluster definition.

In an operation 1742, outliers are identified in device summary data 614, for example, based on a visualization of a distribution of the assigned clusters.

In an operation 1744, the identified outliers are output to outlier data 1620, and/or the trained classifier is output to classifier data 1616.

In an operation 1746, a twelfth indicator of a fit threshold is received. The twelfth indicator is used to define a fit threshold value. Default values for the fit threshold value may further be stored, for example, in fourth computer-readable medium 1608. In an alternative embodiment, the fit threshold may not be selectable.

In an operation 1748, a determination is made concerning whether or not it is time to test organizational data 1614. If it is time to test organizational data 1614, processing continues in an operation 1750. If it is not time to test organizational data 1614, processing continues in operation 1748 until it is time. Peer grouping definitions may be regularly reviewed and revised using peer group definition application 1612 with updated device summary data 614 and organizational data 1614. Outdated peer group definitions reduce the quality of the risk scores reported by cybersecurity system 110, generally creating more false positives.

In operation 1750, records are read from updated device summary data 614.

In an operation 1752, each record is assigned to a peer group using the trained classifier.

In an operation 1754, the peer group assigned in operation 1752 is compared to the peer group read in operation 1750.

In operation 1756, a misclassification rate is computed based on the comparison between all of the records read in operation 1750 and assigned in operation 1752.

In an operation 1758, a determination is made concerning whether or not the computed misclassification rate exceeds the fit threshold value. If the computed misclassification rate exceeds the fit threshold value, processing continues in operation 1708. Of course, processing may continue in any of operations 1700-1708. If the computed misclassification rate does not exceed the fit threshold value, processing continues in an operation 1760.

In operation 1760, new devices and/or users or other internal network composition changes may be automatically assigned to a peer group and included in organizational data 1614 using the trained classifier.

FIGS. 18-30 illustrate a graphical user interface (GUI) presented under control of web server application 520 on system user device 300 in accordance with an illustrative embodiment. Each GUI presents a response to a query created based on an interaction with the GUI by a user.

Referring to FIG. 18, a GUI 1800 presented under control of web server application 520 includes four tabs: a security overview tab 1802, a risk analysis tab 1804, a dashboard tab 1806, and an administrator console tab 1808. Selection of security overview tab 1802 provides the user of system user device 300 with quick access to views of the investigative status, organizational summaries, and behavior anomalies for devices and users. Selection of risk analysis tab 1804 provides the user of system user device 300 with detailed data, such as a composite risk score, an organizational context, a behavioral profile, correlations with existing security event logs, and network flow device interactions for investigating a single identified risk event. Selection of dashboard tab 1806 provides the user of system user device 300 with a place to create, share, and save customized reports and visualizations of data for different investigative strategies. Selection of administrator console tab 1808 may only be visible to individuals in an administrator group and provides the user of system user device 300 with the capability to add, update, and delete users of cybersecurity system 110 and to obtain a summary of a status of servers in the internal network.

GUI 1800 further includes a navigation pane 1810 and a summary pane 1812. Navigation pane 1810 provides the user of system user device 300 with the capability to select a specific view of indexed queue data 542. Summary pane 1812 provides the user of system user device 300 with a view of the indexed queue data 542 currently selected for review.

Figure 19:
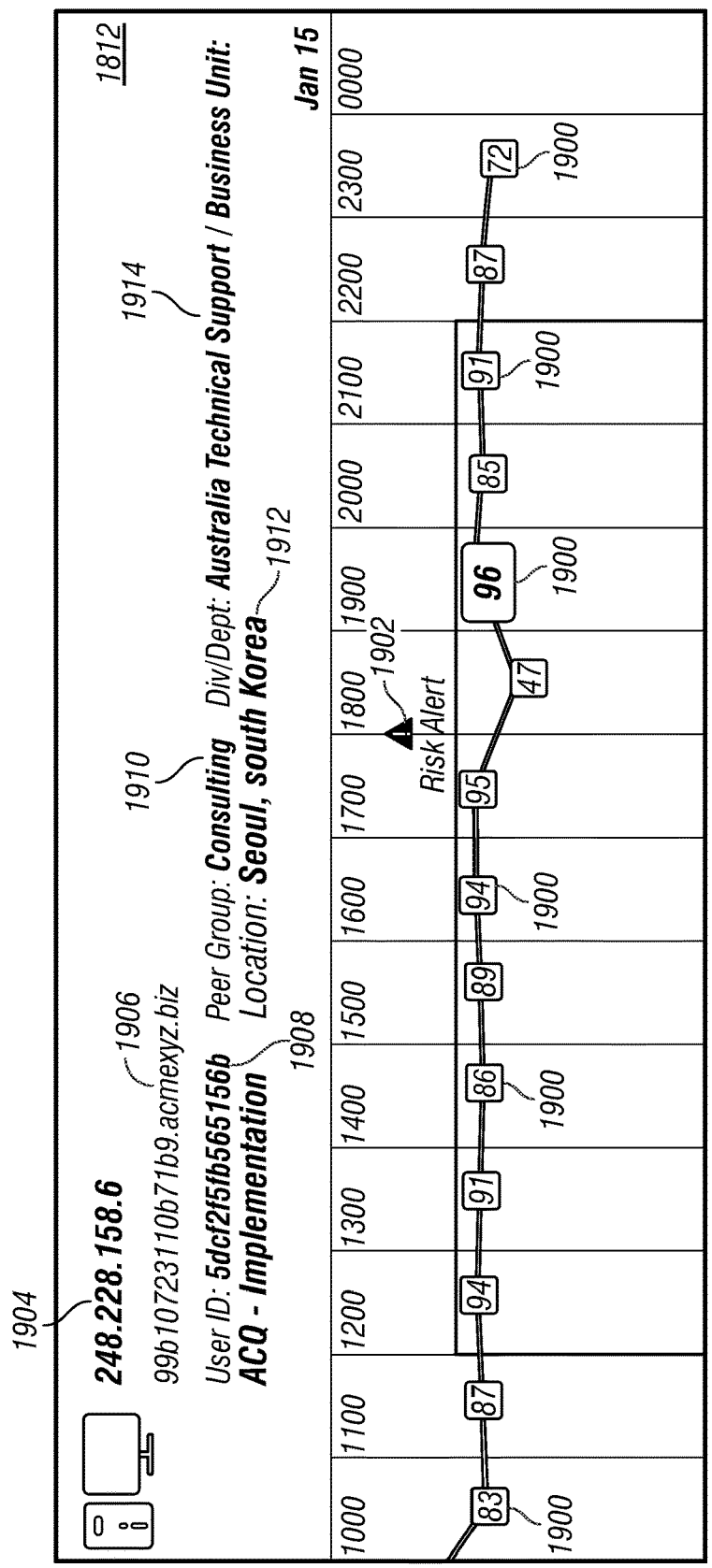

Referring to FIG. 19, summary pane 1812 shows risk scores 1900 for IP address 248.228.158.6 as a function of time for January 14 between 1000 coordinated universal time (UTC) and 2300 UTC. Summary pane 1812 may provide device organizational information that includes an IP address value indicator 1904, a FQDN value indicator 1906, a user ID value indicator 1908, a peer group value indicator 1910, a location value indicator 1912, and a division/department value indicator 1914. Values of the risk score computed for the device having IP address 248.228.158.6 and user ID 5dcf2f5fb565156b exceeded the alert threshold intermittently between 1200 UTC and 2100 UTC and set the high score risk alert indicator represented by an alert indicator 1902. To provide tolerance of sporadic activity, the timespan of risk alerts allows for intermediate risk scores below the defined threshold. The default tolerance is set to a user defined time period in configuration data 528. A default value may be 2 hours. In the example shown in FIG. 19, a risk score of 91 is detected for IP address 248.228.158.6 at 1300 UTC. The next two risk scores fall below the defined threshold, but the risk alert is maintained based on the user defined time period. At 1600 UTC, the risk alert timespan continues, because a risk score of 91 is computed the next time period.

Figure 20:
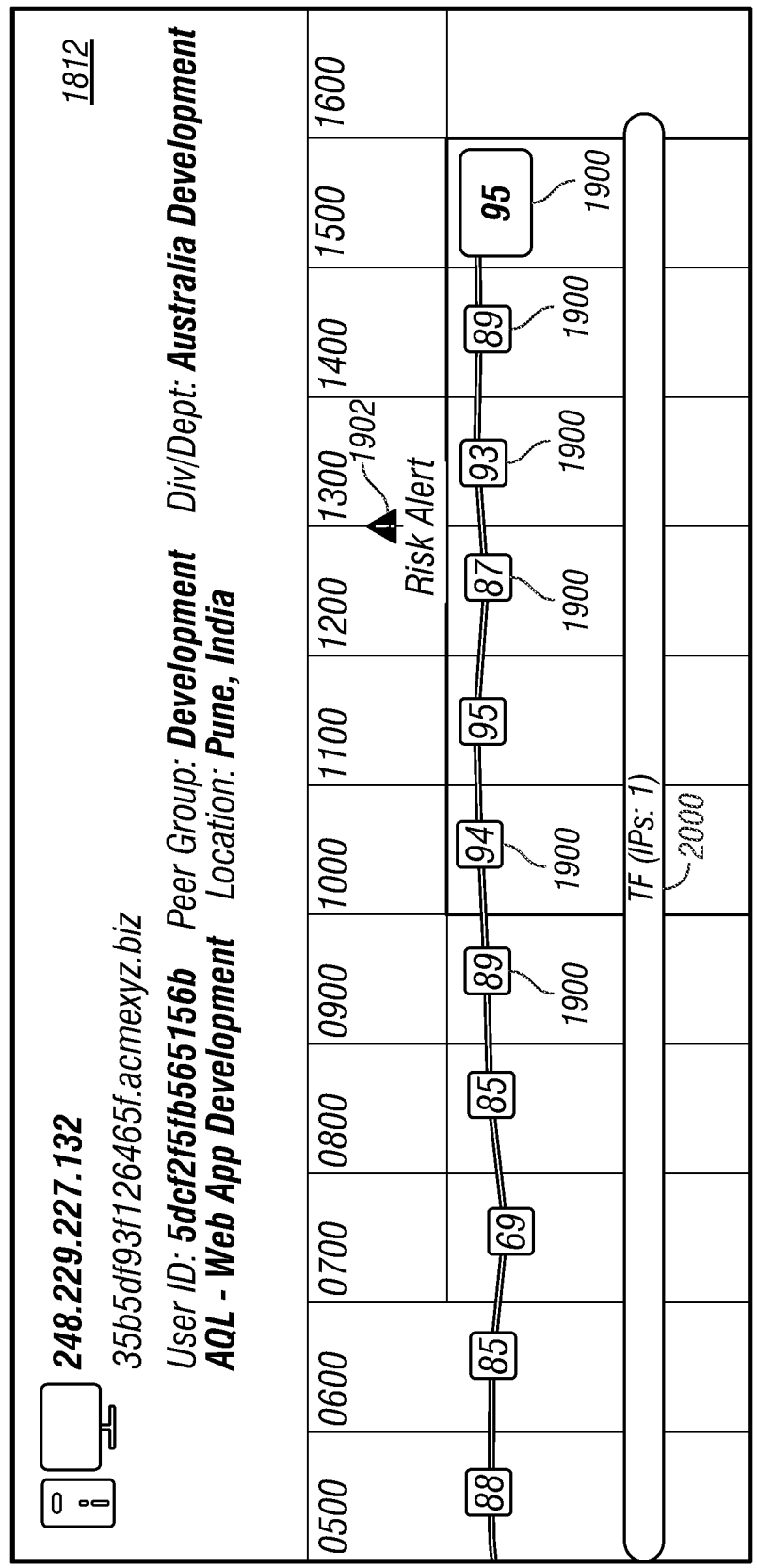

Referring to FIG. 20, summary pane 1812 shows risk scores 1900 for IP address 248.229.227.132 and user ID 5dcf2f5fb565156b as a function of time for January 14 between 0500 UTC and 1600 UTC. From 0500 UTC until 1600 UTC, cybersecurity system 110 detected that IP address 248.229.227.132 communicated with an IP address included as a threat destination IP address and as a result, set the threat feed risk alert indicator represented by threat feed indicator 2000 in operation 1190 and depicted using a red horizontal bar regardless of a risk score exceeding or not exceeding the alert threshold. Threat feed indicator 2000 indicates the hours of activity in which threat feed interactions occurred for the current device (IP address 248.229.227.132 and user ID 5dcf2f5fb565156b) and the number of unique destination IP addresses to which the current device attempted to connect.

Figure 21:
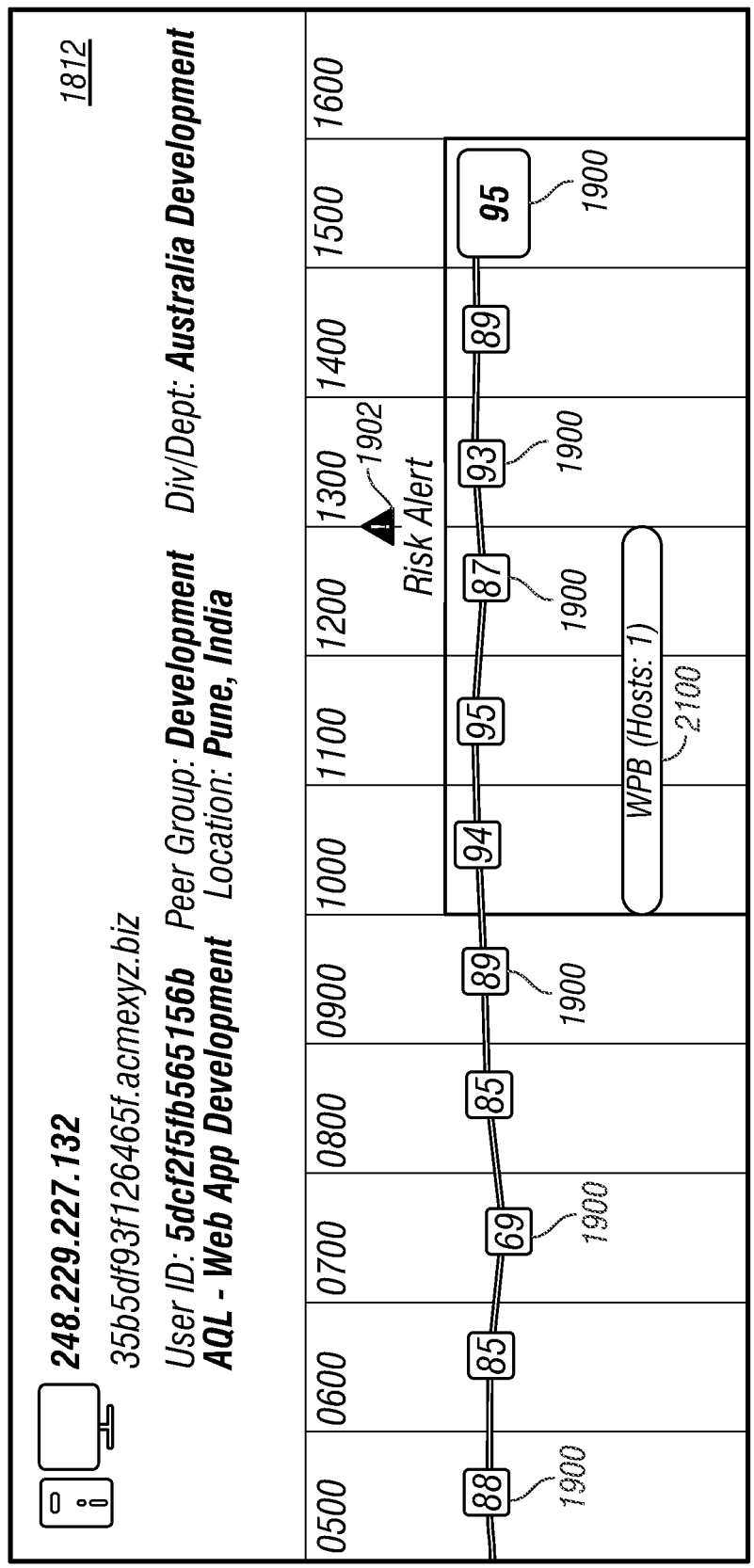

Referring to FIG. 21, summary pane 1812 shows risk scores 1900 for IP address 248.229.227.132 and user ID 5dcf2f5fb565156b as a function of time for January 14 between 0500 UTC and 1600 UTC. From 1000 UTC until 1300 UTC, cybersecurity system 110 detected that IP address 248.229.227.132 attempted to communicate with a destination hostname, but the connection attempt was denied by the web proxy system, and as a result, set the web proxy denial risk alert indicator in operation 1194 represented by web proxy denial indicator 2100 and depicted using an orange horizontal bar regardless of a risk score exceeding or not exceeding the alert threshold. Web proxy denial indicator 2100 indicates the hours of activity in which any web proxy denial occurred for the current device (IP address 248.229.227.132 and user ID 5dcf2f5fb565156b) and the number of unique destination hosts to which the current device attempted to connect.

Figure 22:
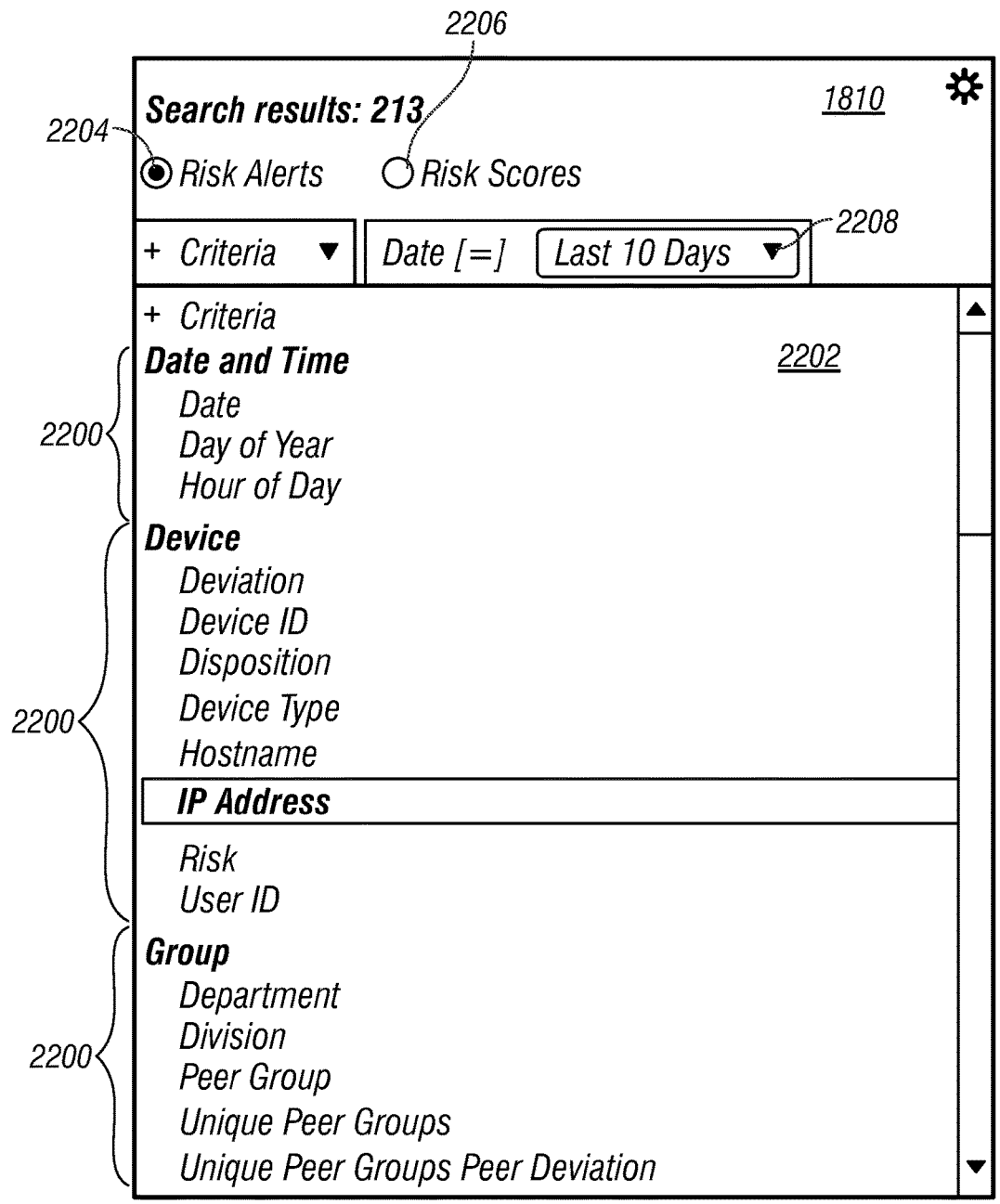

Referring to FIG. 22, navigation pane 1810 shows criteria lists 2200 that can be used to filter indexed queue data 542 for review in summary pane 1812 of risk analysis tab 1804 and of dashboard tab 1806. Criteria lists 2200 on these tabs contain filter options that are relevant to specific measures of risk. In the illustrative embodiment of FIG. 22, criteria lists for a "Risk Alerts" criteria are shown in a criteria selection pane 2202 based on selection of a risk alerts radio button 2204. Alternatively, a risk score radio button 2206 can be selected to present a different set of criteria lists in criteria selection pane 2202. A time window selector 2208 can be used to select a time window within which to filter indexed queue data 542 for review in summary pane 1812 of risk analysis tab 1804 and of dashboard tab 1806.

Figure 23:
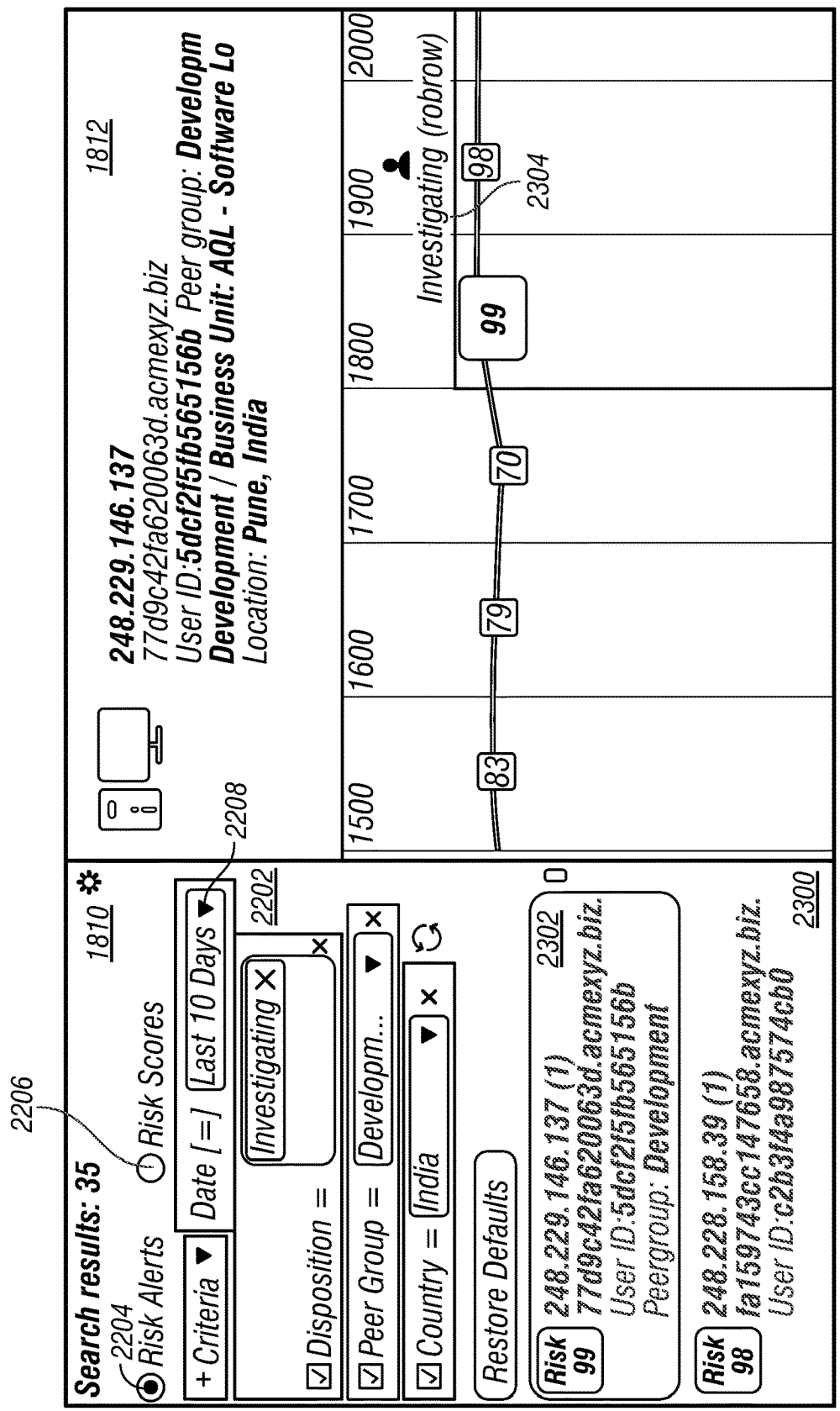

Referring to FIG. 23, navigation pane 1810 shows criteria selections in criteria selection pane 2202. The criteria selections include risk alerts filtered by applying date, disposition, peer group, and country filters. A search results pane 2300 includes a list of IP addresses/users that satisfy the criteria selections indicated in criteria selection pane 2202 and by time window selector 2208. Selection of a matching item indicator 2302 included in search results pane 2300 results in presentation of risk analysis information for the associated IP address/user in summary pane 1812. A status indicator 2304 indicates that the associated IP address/user is currently under investigation and that the investigator ("robrow") initiated the investigation.

Figure 24:
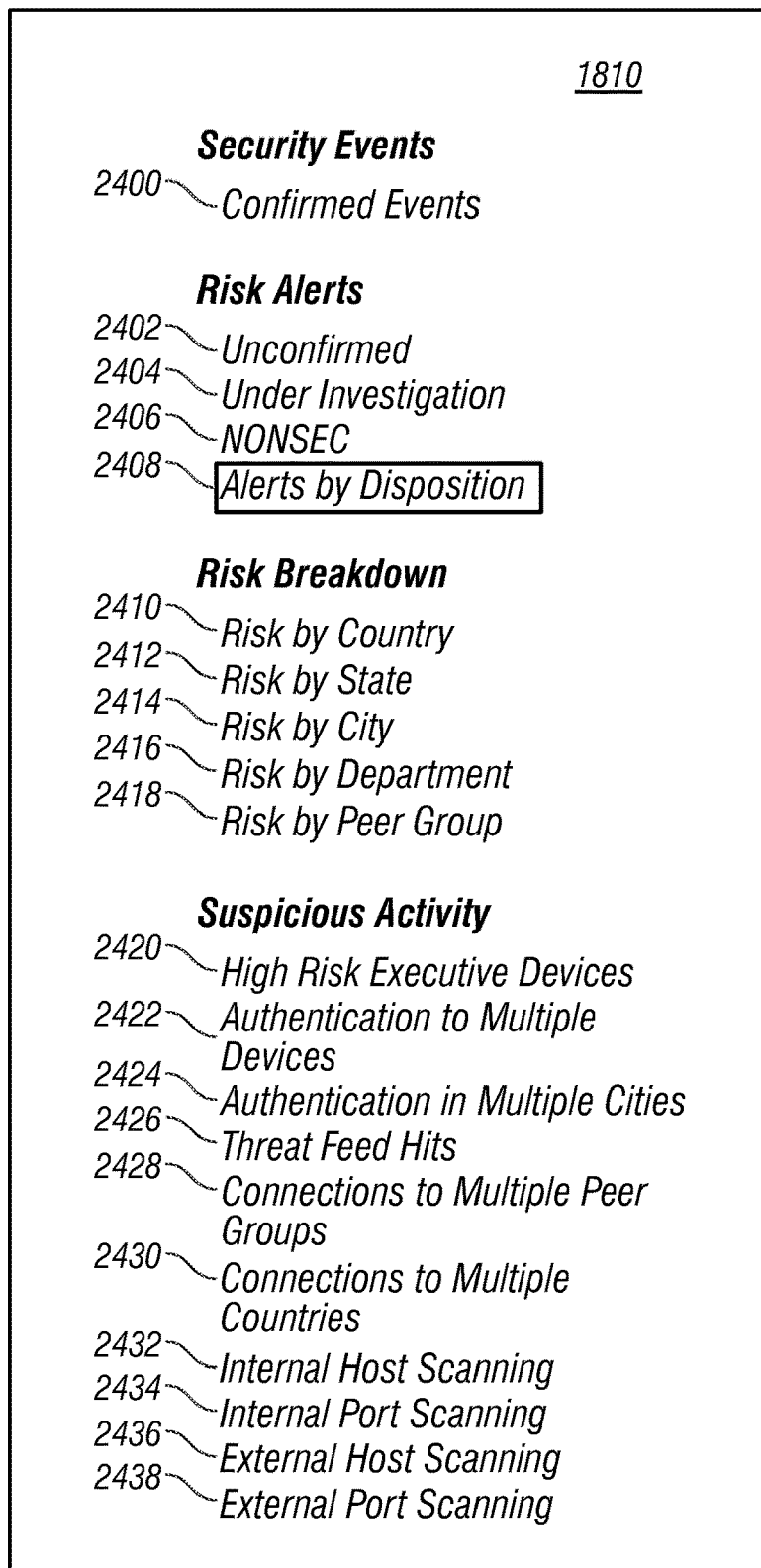

Referring to FIG. 24, when security overview tab 1802 is selected, navigation pane 1810 includes four categories of overviews. A security events overview, a risk alerts overview, a risk breakdown overview, and a suspicious activity overview.

The security events overview includes a confirmed events data view selector 2400. Selection of confirmed events data view selector 2400 may result in presentation of a confirmed events data view in summary pane 1812 that includes a listing of devices associated with high risk scores and in which behavioral anomalies have been confirmed as security events. The confirmed events data view may include a disposition column, a comment column, an IP address column, a user ID column, a peer group column, a date column, a division/department column, and a location column. Each row includes data in the associated column for a device matching the confirmed events criteria. The disposition column includes a category (e.g., Investigating, Exercise, Unauthorized Access, Denial of Service, Malicious Code, Improper Usage, Attempted Access, or NONSEC) that describes a status of a risk alert or a type of security incident that is attributed to the behavioral anomaly detected. The comments column includes notes from the user who is performing the investigation of the device. The IP address column includes the IPv4 address and host name of the device that is under investigation. The user ID column includes a last known authenticated user ID that is associated with the IP address. The peer group column includes the peer group to which the IP address and user ID are associated for comparative behavioral analysis. The date column includes the date the disposition was assigned the associated risk alert. The division/department column includes the division and department of the entity to which the given IP address and user ID are assigned. The location column includes the city and/or region associated with the IP address under investigation. A confirmed event displayed in summary pane 1812 may be investigated further by clicking an IP address or an "Analyze" button in any row. Doing so switches the user from the security overview tab 1802 to additional information about the event on risk analysis tab 1804.

The risk alerts overview includes selectors for presenting risk alerts based on a disposition of the risk alert. For illustration, the risk alerts overview includes an unconfirmed selector 2402, an under investigation selector 2404, a non-security event selector 2406, and a disposition selector 2408. Types of disposition may include unconfirmed, under investigation, and non-security event. Selection of disposition selector 2408 results in presentation of a visualization of a number of risk alerts for each type of disposition over a specified time period in summary pane 1812. Selection of unconfirmed selector 2402, under investigation selector 2404, or non-security event selector 2406 may result in presentation of a data view in summary pane 1812 that includes a listing of devices associated with high risk scores and the selected type of disposition. The data view may include the disposition column, the comments column, the IP address column, the user ID column, the peer group column, a risk alert counter column, a risk alert value column, the date column, the division/department column, and the location column. Each row includes data in the associated column for a device matching the selected type of disposition. The risk alert counter column includes a number of individual risk alert events that are associated with the device for the specified time period. The risk alert value column includes a maximum risk score value for the device during the specified time period.

The risk breakdown overview includes selectors for presenting risk alerts based on a selected characteristic of the risk alert. For illustration, the risk breakdown overview includes a country selector 2410, a state selector 2412, a city selector 2414, a department selector 2416, and a peer group selector 2418. Selection of any of country selector 2410, state selector 2412, city selector 2414, department selector 2416, or peer group selector 2418 results in presentation of a visualization in summary pane 1812 of devices for which the risk score exceeded the risk alert threshold over a specified time period.

Figure 25:
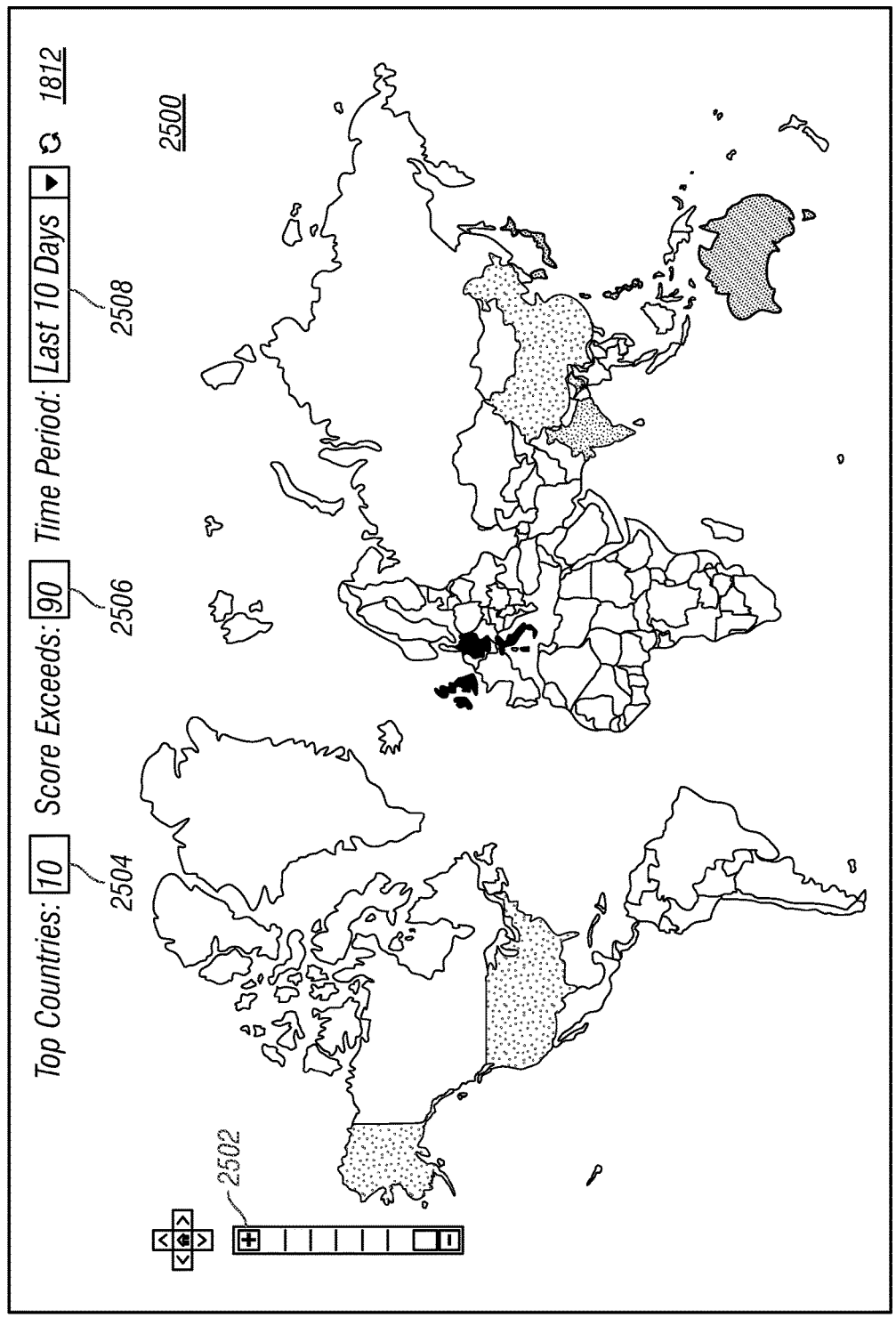

The visualization may be a map. For illustration, FIG. 25 shows a risk breakdown map 2500 presented after selection of country selector 2410. Color may be used to indicate a number of devices associated with each country. For example, a spectrum of colors may be proportional to the number of devices that exceed the defined threshold where darker colors indicate a higher number of devices, and lighter colors indicate a lower number of devices. A slider 2502 can be used to narrow the view of the countries that are displayed. A number of countries selector 2504 can be used to change a number of countries that are highlighted on risk breakdown map 2500. A score selector 2506 can be used to change the alert threshold used to identify risk alerts for each country highlighted on risk breakdown map 2500. A time period selector 2508 can be used to change the time period during which to identify risk alerts for each country highlighted on risk breakdown map 2500. Hovering a pointer over a country highlighted on risk breakdown map 2500 causes presentation of a number of devices at risk in that country. Selecting a country highlighted on risk breakdown map 2500 can be used to investigate the devices located in that country having a risk score greater than the value indicated by score selector 2506. The value indicated by score selector 2506 need not be the same as the value used in operation 1178 of FIG. 11D. Selecting the country causes presentation of risk analysis tab 1804 with a list of the devices associated with the country and which exceeded the risk alert threshold indicated by score selector 2506 over the time period indicated by time period selector 2508.

The visualization further may be a histogram with the x-axis showing the country, the state, the city, the department, or the peer group and the y-axis showing the number of devices. The histogram may sort the x-axis in descending order of the number of devices. Selecting a bar in the histogram causes presentation of risk analysis tab 1804 with a list of the devices associated with the country, the state, the city, the department, or the peer group that exceeded the risk alert threshold indicated by score selector 2506 over the time period indicated by time period selector 2508. The x-axis and the y-axis may be swapped. Slider 2502 and number of countries selector 2504 can be used to narrow or to change, respectively, a number of countries, a number of states, a number of cities, a number of departments, or a number of peer groups that are highlighted on risk breakdown map 2500 based on selection of country selector 2410, state selector 2412, city selector 2414, department selector 2416, or peer group selector 2418, respectively.

The suspicious activity overview includes selectors for creating listings of devices that are exhibiting a type of suspicious activity based on specified filter criteria. For illustration, the suspicious activity overview includes a high risk selector 2420, a multiple device authentication selector 2422, a multiple city authentication selector 2424, a threat feed hit selector 2426, a multiple peer group connection selector 2428, a multiple country connection selector 2430, an internal host scanning selector 2432, an internal port scanning selector 2434, an external host scanning selector 2436, and an external port scanning selector 2438. Selection of any of high risk selector 2420, multiple device authentication selector 2422, multiple city authentication selector 2424, threat feed hit selector 2426, multiple peer group connection selector 2428, multiple country connection selector 2430, internal host scanning selector 2432, internal port scanning selector 2434, external host scanning selector 2436, or external port scanning selector 2438 may result in presentation in summary pane 1812 with a list of devices for which the type of suspicious activity occurred during a specified time period.

For illustration, selection of high risk selector 2420 may result in presentation of a high risk device data view 2600 in summary pane 1812 as shown in FIG. 26 that includes a listing of devices associated with high risk scores, that are identified as devices used by executives of the entity in configuration data 528, and that have not yet been investigated or assigned a disposition. For example, the high risk device alert indicator may have been set in operation 1198. The high risk device data view 2600 may include a number of devices selector 2600, a time period selector 2602, an IP address column 2606, an alert counter column 2608, a user ID column 2610, a peer group column 2612, a maximum risk score column 2614, a division/department column 2616, and a location column 2618. Each row includes data in the associated column for a high risk device. Number of devices selector 2600 can be used to change a number of devices included in high risk device data view 2600. Time period selector 2602 can be used to change the time period during which to identify high risk devices included in high risk device data view 2600.

The high risk devices may be sorted by an alert counter value included in alert counter column 2608. A device included in high risk device data view 2600 can be investigated by selecting an IP address in IP address column 2606 or an analyze button 2620 included in any row. Selecting the IP address or the associated analyze button 2620 causes presentation of risk analysis tab 1804 with additional information describing the behavior of the selected device.

Figure 27:
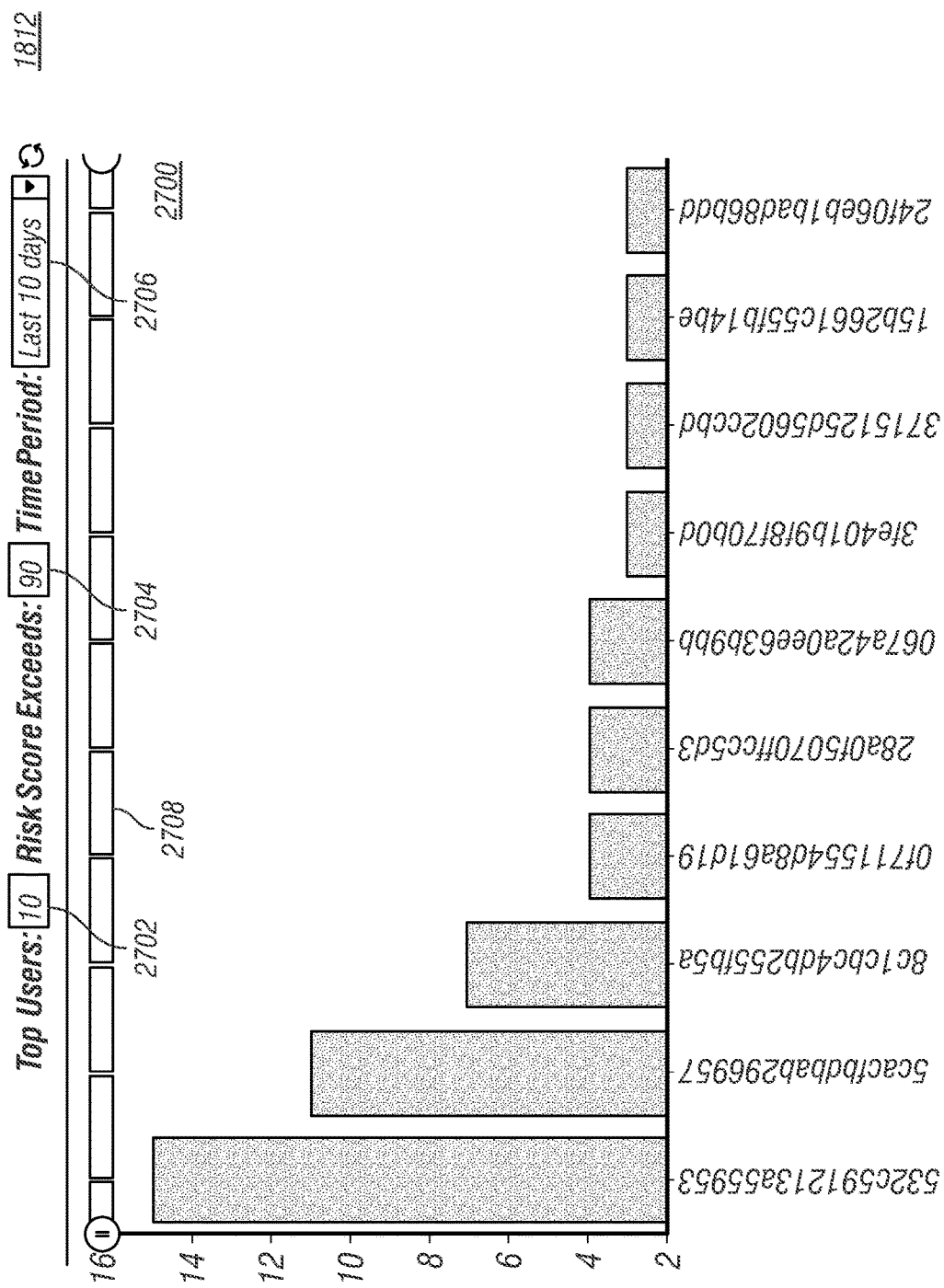

For illustration, referring to FIG. 27, selection of multiple device authentication selector 2422 may cause presentation of a histogram 2700 that shows a listing of users on the x-axis and a number of devices logged onto by the user on the y-axis. The x-axis and the y-axis may be swapped. The histogram may sort the x-axis in descending order of the number of devices. Selecting a bar in the histogram may cause presentation of risk analysis tab 1804 with additional information describing the behavior of the selected device. A number of users selector 2702 can be used to change a number of users that are included in histogram 2700. A score selector 2704 can be used to change the alert threshold used to identify devices included in histogram 2700. A time period selector 2706 can be used to change the time period during which to identify the devices included in histogram 2700. A slider 2708 can be used to narrow the number of users included in histogram 2700.

Similarly, selection of multiple city authentication selector 2424 may cause presentation of a histogram that shows a listing of users on the x-axis and a total number of cities in which devices are located to which the user communicated on the y-axis.

Selection of threat feed hit selector 2426 may result in presentation of a threat feed hit data view in summary pane 1812 that includes a listing of devices that had one or more threat feed hits during the specified time period. The threat feed hit data view may include the IP address column, the user ID column, the peer group column, a number of destination IPs counter column, the risk alert value column, the date column, the division/department column, and the location column. Each row includes data in the associated column for a device that had one or more threat feed hits during the specified time period. The number of destination IPs counter column may include a total number of unique destination IP addresses that are associated with known threat feeds to which the IP address indicated in the IP address column connected during the specified time period. Selecting the IP address or an associated analyze button causes presentation of risk analysis tab 1804 with additional information describing the behavior of the selected device.

Selection of multiple peer group connection selector 2428 may result in presentation of a multiple peer group data view in summary pane 1812 that includes a listing of devices that connected to more than one peer group during the specified time period. The multiple peer group data view may include the IP address column, the user ID column, the peer group column, a maximum deviation value column, the risk alert value column, the date column, the division/department column, and the location column. Each row includes data in the associated column for a device that connected to more than one peer group during the specified time period. The maximum deviation value column may include a maximum standard deviation value from the mean of unique peer groups contacted during the specified time period for the IP address indicated in the IP address column. Selecting the IP address or an associated analyze button causes presentation of risk analysis tab 1804 with additional information describing the behavior of the selected device.

Selection of multiple country connection selector 2430 may result in presentation of a multiple country data view in summary pane 1812 that includes a listing of devices that connected to devices in more than one country during the specified time period. The multiple country data view may include the IP address column, the user ID column, the peer group column, a maximum deviation value column, the risk alert value column, the date column, the division/department column, and the location column. Each row includes data in the associated column for a device that connected to more than one country during the specified time period. The maximum deviation value column may include a maximum standard deviation value from the mean of unique countries contacted during the specified time period for the IP address indicated in the IP address column. Selecting the IP address or an associated analyze button causes presentation of risk analysis tab 1804 with additional information describing the behavior of the selected device.

Selection of internal host scanning selector 2432 may result in presentation of an internal host scanning data view in summary pane 1812 that includes a listing of user and non-user devices that have connected to greater than or equal to a specified number of internal destination IP addresses in a single hour during the specified time period. A selector may be used to select a value for the specified number of internal destination IP addresses. The internal host scanning data view may include the IP address column, the user ID column, the peer group column, a maximum IP addresses column, a maximum deviation column, the date column, the division/department column, and the location column. Each row includes data in the associated column for a device that connected to greater than or equal to the specified number of internal destination IP addresses in a single hour during the specified time period. The time span of a single hour may be user configurable. The maximum IP addresses column may include a total number of unique internal destination IP addresses to which the internal IP address attempted to connect (non-web proxy) during the time span. The maximum deviation column may include a maximum standard deviation value from the mean of unique internal hosts contacted during the specified time period for the IP address indicated in the IP address column. Selecting the IP address or an associated analyze button causes presentation of risk analysis tab 1804 with additional information describing the behavior of the selected device.

Selection of internal port scanning selector 2434 may result in presentation of an internal port scanning data view in summary pane 1812 that includes a listing of user and non-user devices that have connected to greater than or equal to a specified number of internal ports in a single hour during the specified time period. A selector may be used to select a value for the specified number of internal ports. The internal port scanning data view may include the IP address column, the user ID column, the peer group column, a maximum ports column, a maximum deviation column, the date column, the division/department column, and the location column. Each row includes data in the associated column for a device that connected to greater than or equal to the specified number of internal ports in a single hour during the specified time period. The time span of a single hour may be user configurable. The maximum ports column may include a total number of unique internal ports to which the internal IP address attempted to connect (non-web proxy) during the time span. The maximum deviation column may include a maximum standard deviation value from the mean of unique internal ports contacted during the specified time period for the IP address indicated in the IP address column. Selecting the IP address or an associated analyze button causes presentation of risk analysis tab 1804 with additional information describing the behavior of the selected device.

Selection of external host scanning selector 2436 may result in presentation of an external host scanning data view in summary pane 1812 that includes a listing of user and non-user devices that have connected to greater than or equal to a specified number of external destination IP addresses in a single hour during the specified time period. A selector may be used to select a value for the specified number of external destination IP addresses. The external host scanning data view may include the IP address column, the user ID column, the peer group column, a maximum IP addresses column, a maximum deviation column, the date column, the division/department column, and the location column. Each row includes data in the associated column for a device that connected to greater than or equal to the specified number of external destination IP addresses in a single hour during the specified time period. The time span of a single hour may be user configurable. The maximum IP addresses column may include a total number of unique external destination IP addresses to which the internal IP address attempted to connect (non-web proxy) during the time span. The maximum deviation column may include a maximum standard deviation value from the mean of unique external hosts contacted during the specified time period for the IP address indicated in the IP address column. Selecting the IP address or an associated analyze button causes presentation of risk analysis tab 1804 with additional information describing the behavior of the selected device.

Selection of external port scanning selector 2438 may result in presentation of an external port scanning data view in summary pane 1812 that includes a listing of user and non-user devices that have connected to greater than or equal to a specified number of external ports in a single hour during the specified time period. A selector may be used to select a value for the specified number of external ports. The external port scanning data view may include the IP address column, the user ID column, the peer group column, a maximum ports column, a maximum deviation column, the date column, the division/department column, and the location column. Each row includes data in the associated column for a device that connected to greater than or equal to the specified number of external ports in a single hour during the specified time period. The time span of a single hour may be user configurable. The maximum ports column may include a total number of unique external ports to which the internal IP address attempted to connect (non-web proxy) during the time span. The maximum deviation column may include a maximum standard deviation value from the mean of unique external ports contacted during the specified time period for the IP address indicated in the IP address column. Selecting the IP address or an associated analyze button causes presentation of risk analysis tab 1804 with additional information describing the behavior of the selected device.

Referring to FIG. 28, GUI 1800 further includes a detail pane 2800. Detail pane 2800 may include detailed data associated with analysis and review of a selected device. For example, detail pane 2800 may be presented below summary pane 1812 when a specific device is selected and may present detailed information associated with the device associated with IP address value indicator 1904 included in summary pane 1812. Detail pane 2800 may include a risk breakdown tab 2802, a device interactions tab 2804, a web proxy tab 2806, and a user authentication tab 2808. The detailed information presented in detail pane 2800 varies based on the selection of risk breakdown tab 2802, device interactions tab 2804, web proxy tab 2806, or user authentication tab 2808. Device interactions tab 2804, web proxy tab 2806, and user authentication tab 2808 provide detailed information about the devices with which the device associated with IP address value indicator 1904 is interacting. Using web proxy tab 2806, information about the websites visited by the device is presented. Using user authentications tab 2808, information about the users with which the device is communicating is presented.

Referring to FIG. 28, risk breakdown tab 2802 is selected and includes an activity column 2810, a total number column 2812, a peer mean column 2814, a peer deviation column 2816, and a peer population column 2818. Activity column 2810 shows each monitored activity. For example, activity column 2810 may include a list of variables 2820 used to compute the risk score in operation 1174. Total number column 2812 may include the total counter value for the associated variable for the device included in device summary data 614. Peer mean column 2814 may include the mean value computed in operation 1130 and included in device summary data 614 for the associated variable and the peer group/time zone to which the device is assigned. Peer deviation column 2816 may include the standard deviation value computed in operation 1130 and included in device summary data 614 for the associated variable and the peer group/time zone to which the device is assigned. Peer population column 2818 may include the population size value computed in operation 1130 and included in device summary data 614 for the associated variable and the peer group/time zone to which the device is assigned.

Figure 29:
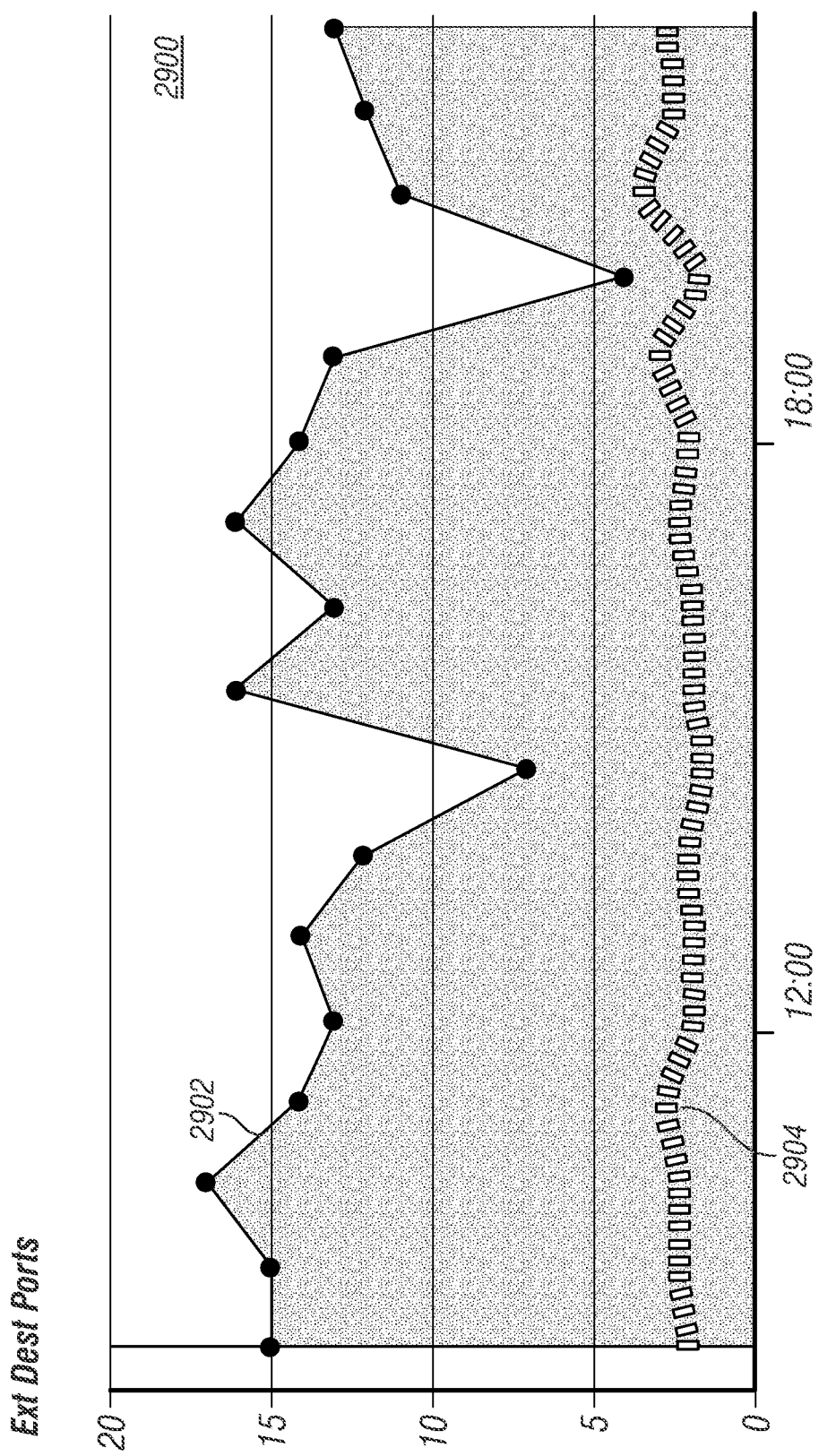

Referring to FIG. 29, GUI 1800 further includes a graph pane 2900. Graph pane 2900 may show a graph of a variable selected from the list of variables 2820 and associated with the device shown in summary pane 1812 and in detail pane 2800. For example, graph pane 2900 may be presented to the right or the left of detail pane 2800. Graph pane 2900 presents a device graph line 2902 that shows values for the selected variable for the selected device as a function of time. Graph pane 2900 further presents a peer graph line 2904 that shows values for the peer group mean of the selected variable as a function of time so that a user can visualize the variation as a function of time.

Referring to FIG. 30, device interactions tab 2804 is selected and includes a selector area 3000 and a view area 3002. For example, selector area 3000 includes a summary selector 3004 and a view selector 3006. Use of view selector 3006 changes the presentation in view area 3002. For example, when "Table" is selected, view area 3002 shows tabular result. "Destination City" is the summary parameter selected by summary selector 3004 in the illustrative embodiment of FIG. 30. As a result, communications between the device and devices in different cities is summarized in data table 3002. City list indicators 3008 list the unique cities contacted by the device for the specified date and time window. For example, the device communicated with three different cities: Cary, Sydney, and Pune on Jan. 14, 2016, between 6 pm and 7 pm. As further indicated by city list indicators 3008, 10 different devices located in Cary were contacted, 4 different devices located in Sydney were contacted, and 2 different devices located in Pune were contacted. Data table 3002 includes data extracted from indexed queue data 542 indexed from source-destination summary data 616.

When "Chart" is selected, view area 3002 shows a chart such as a histogram that presents a breakdown of the summary criteria. As a result, a chart with three bars, Cary, Sydney, and Pune would have values of 10, 4 and 2, respectively. When "Export" is selected, the data presented in the tabular results is exported to an Excel spreadsheet.

Data and/or graphs presented in detail pane 2800 and graph pane 2900 may be updated each time a risk score is selected from summary pane 1812 to show details related to the computation of the risk score at the selected time. Graph pane 2900 further may be updated when a different variable is selected from the list of variables 2820.

Cybersecurity system 110 detects anomalies in enriched network flow record data, web proxy data, syslog data, and authentication data and issues alerts when suspicious activity is identified. Cybersecurity system 110 provides a rapid detection of anomalies by distributing functionality across a plurality of integrated computing devices to seamlessly evaluate hundreds of thousands of network activity events per second. Cybersecurity system 110 further allows a system user to investigate and track identified anomalous activity all within the same system. The received data is contextualized with peer group, user, domain resolution, and other contextualization data as the data flows from ingest application 506 to data enrichment application 518 and index data application 516 so that the data presented by GUI 1800 is relevant to the user of cybersecurity system 110.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a processor cause a first computing device to:
   read a plurality of records, wherein each record includes a user identifier, an Internet protocol (IP) address associated with the user identifier, a peer group identifier determined based on the user identifier, and a plurality of network activity measures, wherein the user identifier identifies a user of a second computing device being monitored by the first computing device, wherein the peer group identifier is predefined and identifies a peer group to which the user is assigned and which is associated with the user identifier, wherein members of the peer group are identified based on an expected common network activity behavior, wherein the IP address identifies the second computing device, and wherein the plurality of network activity measures characterize use of the second computing device by the user determined from a received netflow record;
   for each unique peer group identifier included in the read plurality of records, compute a mean value of each of the plurality of network activity measures;
   for each unique peer group identifier included in the read plurality of records, compute a standard deviation value of each of the plurality of network activity measures;
   for each unique IP address and user identifier combination included in the read plurality of records,
   select the computed mean value of each of the plurality of network activity measures for the peer group identifier associated with the user identifier;
   select the computed standard deviation value of each of the plurality of network activity measures for the peer group identifier associated with the user identifier;
   compute a risk score by computing a number of deviations for the respective network activity measure using the selected mean value and the selected standard deviation value for the respective network activity measure; and
   when the computed risk score exceeds a predefined alert threshold,
   set a high risk alert indicator indicating that the second computing device is being used in an anomalous manner relative to other computing devices being monitored by the first computing device; and
   output the set high risk alert indicator to a display.

2. The non-transitory computer-readable medium of claim 1, wherein the network activity measures characterize a communication between the second computing device and a third computing device.

3. The non-transitory computer-readable medium of claim 2, wherein the third computing device is part of an external network relative to the second computing device.

4. The non-transitory computer-readable medium of claim 2, wherein the third computing device is part of an internal network relative to the second computing device.

5. The non-transitory computer-readable medium of claim 1, wherein each record further includes a time zone indicator.

6. The non-transitory computer-readable medium of claim 5, wherein the unique peer group identifier is a combination of the peer group identifier and the time zone indicator.

7. The non-transitory computer-readable medium of claim 1, wherein the computer-readable instructions further cause the first computing device to compute an activity measure value for each of the plurality of network activity measures for the unique IP address and user identifier combination using the read plurality of records associated with the unique IP address and user identifier combination.

8. The non-transitory computer-readable medium of claim 7, wherein the number of deviations is computed using $N=V-\mu/\sigma$, where N is the number of deviations, V is the activity measure for the respective network activity measure, $\mu$ is the selected mean value for the respective network activity measure, and $\sigma$ is the selected standard deviation value for the respective network activity measure.

9. The non-transitory computer-readable medium of claim 1, wherein the computer-readable instructions further cause the first computing device to aggregate the number of deviations computed for each network activity measure of the plurality of network activity measures from the plurality of records as part of computing the risk score.

10. The non-transitory computer-readable medium of claim 9, wherein the computer-readable instructions further cause the first computing device to compute a cumulative density function for each network activity measure of the plurality of network activity measures from the aggregated number of deviations as part of computing the risk score.

11. The non-transitory computer-readable medium of claim 10, wherein the risk score is computed using the cumulative density function for each network activity measure of the plurality of network activity measures.

12. The non-transitory computer-readable medium of claim 10, wherein the risk score is computed using a probability value selected from the cumulative density function for each network activity measure of the plurality of network activity measures for each unique IP address and user identifier combination.

13. The non-transitory computer-readable medium of claim 10, wherein the risk score is computed by summing a probability value selected from the cumulative density function for each network activity measure of the plurality of network activity measures for each unique IP address and user identifier combination.

14. The non-transitory computer-readable medium of claim 13, wherein the risk score is further computed by computing an average of the summed probability values for each unique IP address and user identifier combination.

15. The non-transitory computer-readable medium of claim 14, wherein the risk score is further computed by computing an inverse of the average of the summed probability values for each unique IP address and user identifier combination.

16. The non-transitory computer-readable medium of claim 10, wherein the risk score is computed by summing and weighting a probability value selected from the cumulative density function for each network activity measure of the plurality of network activity measures for each unique IP address and user identifier combination.

17. A computing device comprising:
a processor; and
a non-transitory computer-readable medium operably coupled to the processor, the computer-readable medium having computer-readable instructions stored thereon that, when executed by the processor, cause the computing device to
read a plurality of records, wherein each record includes a user identifier, an Internet protocol (IP) address associated with the user identifier, a peer group identifier determined based on the user identifier, and a plurality of network activity measures, wherein the user identifier identifies a user of a second computing device being monitored by the first computing device, wherein the peer group identifier is predefined and identifies a peer group to which the user is assigned and which is associated with the user identifier, wherein members of the peer group are identified based on an expected common network activity behavior, wherein the IP address identifies the second computing device, and wherein the plurality of network activity measures characterize use of the second computing device by the user determined from a received netflow record;
for each unique peer group identifier included in the read plurality of records, compute a mean value of each of the plurality of network activity measures;
for each unique peer group identifier included in the read plurality of records, compute a standard deviation value of each of the plurality of network activity measures;
for each unique IP address and user identifier combination included in the read plurality of records,
select the computed mean value of each of the plurality of network activity measures for the peer group identifier associated with the user identifier;
select the computed standard deviation value of each of the plurality of network activity measures for the peer group identifier associated with the user identifier;
compute a risk score by computing a number of deviations for the respective network activity measure using the selected mean value and the selected standard deviation value for the respective network activity measure; and
when the computed risk score exceeds a predefined alert threshold,
set a high risk alert indicator indicating that the second computing device is being used in an anomalous manner relative to other computing devices being monitored by the first computing device; and
output the set high risk alert indicator to a display.

18. A method of computing a risk score for a user using a device based on a peer group identifier for the user, the method comprising:
reading, by a computing device, a plurality of records, wherein each record includes a user identifier, an Internet protocol (IP) address associated with the user identifier, a peer group identifier determined based on the user identifier, and a plurality of network activity measures, wherein the user identifier identifies a user of a second computing device being monitored by the first computing device, wherein the peer group identifier is predefined and identifies a peer group to which the user is assigned and which is associated with the user identifier, wherein members of the peer group are identified based on an expected common network activity behavior, wherein the IP address identifies the second computing device, and wherein the plurality of network activity measures characterize use of the second computing device by the user determined from a received netflow record;
for each unique peer group identifier included in the read plurality of records, computing, by the computing device, a mean value of each of the plurality of network activity measures;
for each unique peer group identifier included in the read plurality of records, computing, by the computing device, a standard deviation value of each of the plurality of network activity measures;
for each unique IP address and user identifier combination included in the read plurality of records,
selecting, by the computing device, the computed mean value of each of the plurality of network activity measures for the peer group identifier associated with the user identifier;
selecting, by the computing device, the computed standard deviation value of each of the plurality of network activity measures for the peer group identifier associated with the user identifier;
computing, by the computing device, a risk score by computing a number of deviations for the respective network activity measure using the selected mean value and the selected standard deviation value for the respective network activity measure; and
when the computed risk score exceeds a predefined alert threshold,
setting, by the computing device, a high risk alert indicator indicating that the second computing device is being used in an anomalous manner relative to other computing devices being monitored by the first computing device; and
outputting, by the computing device, the set high risk alert indicator to a display.

19. The method of claim 18, further comprising computing, by the computing device, an activity measure value for each of the plurality of network activity measures for the unique IP address and user identifier combination using the read plurality of records associated with the unique IP address and user identifier combination.

20. The method of claim 19, wherein the number of deviations is computed using $N=V-\mu/\sigma$, where N is the number of deviations, V is the activity measure for the respective network activity measure, $\mu$ is the selected mean value for the respective network activity measure, and $\sigma$ is the selected standard deviation value for the respective network activity measure.

21. The method of claim 18, further comprising aggregating, by the computing device, the number of deviations computed for each network activity measure of the plurality of network activity measures from the plurality of records as part of computing the risk score.

22. The method of claim 21, further comprising computing, by the computing device, a cumulative density function for each network activity measure of the plurality of network activity measures from the aggregated number of deviations as part of computing the risk score.

23. The method of claim 22, wherein the risk score is computed using the cumulative density function for each network activity measure of the plurality of network activity measures.

24. The method of claim 22, wherein the risk score is computed using a probability value selected from the cumulative density function for each network activity measure of the plurality of network activity measures for each unique IP address and user identifier combination.

25. The method of claim 22, wherein the risk score is computed by summing a probability value selected from the cumulative density function for each network activity measure of the plurality of network activity measures for each unique IP address and user identifier combination.

26. The method of claim 25, wherein the risk score is further computed by computing an average of the summed probability values for each unique IP address and user identifier combination.

27. The method of claim 26, wherein the risk score is further computed by computing an inverse of the average of the summed probability values for each unique IP address and user identifier combination.

28. The method of claim 22, wherein the risk score is computed by summing and weighting a probability value selected from the cumulative density function for each network activity measure of the plurality of network activity measures for each unique IP address and user identifier combination.

* * * * *

UNITED STATES PATENT AND TRADEMARK OFFICE
CERTIFICATE OF CORRECTION

PATENT NO. : 10,498,755 B2  Page 1 of 1
APPLICATION NO. : 16/020282
DATED : December 3, 2019
INVENTOR(S) : Bryan C. Harris et al.

It is certified that error appears in the above-identified patent and that said Letters Patent is hereby corrected as shown below:

In the Specification

Column 26, Lines 57-58:
Delete the phrase
""urlCategory": "_MatchGroup('(\\surlcategory)([\\w\\p{javaWhitespace}]+(?=\\t)) ', 2")," and replace with --"urlCategory": "_MatchGroup('(\\surlcategory =)([\\w\\p{javaWhitespace}]+(?=\\t)) ', 2",--.

Column 26, Line 64:
Delete the phrase ")([\\w\\p{javaWhitespace}]+(?=\\t))', 2"," and replace with --=)([\\w\\p{javaWhitespace}]+(?=\\t))', 2",--.

Column 41, Line 21:
Delete the phrase "GET http://WEB01/lookupkType>" and replace with --GET http://WEB01/lookup/<Type>--.

Column 41, Line 27:
Delete the phrase "GET http://WEB01/lookupkType>/<LookupExpression>" and replace with --GET http://WEB01/lookup/<Type>/<LookupExpression>--.

Column 45, Lines 3-4:
Delete the phrase "For example, a value fors, the Gaussian bandwidth parameter," and replace with --For example, a value for $s$, the Gaussian bandwidth parameter,--.

Column 51, Lines 50-51:
Delete the phrase "to continue to listen fora new message" and replace with --to continue to listen for a new message--.

Signed and Sealed this
Twenty-first Day of January, 2020

Andrei Iancu
*Director of the United States Patent and Trademark Office*